US012466080B2

(12) United States Patent
McCall et al.

(10) Patent No.: US 12,466,080 B2
(45) Date of Patent: *Nov. 11, 2025

(54) HEAD AND NECK ASSEMBLY OF A HUMANOID ROBOT

(71) Applicant: Figure AI Inc., San Jose, CA (US)

(72) Inventors: David McCall, San Jose, CA (US);
Sydney Hardy, San Jose, CA (US);
Katarina Rodak, San Jose, CA (US)

(73) Assignee: Figure AI Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/252,392

(22) Filed: Jun. 27, 2025

(65) Prior Publication Data

US 2025/0326131 A1      Oct. 23, 2025

Related U.S. Application Data

(63) Continuation of application No. 18/919,263, filed on Oct. 17, 2024, now Pat. No. 12,365,094, which is a
(Continued)

(51) Int. Cl.
*B25J 9/00* (2006.01)
*B25J 11/00* (2006.01)
*B25J 19/00* (2006.01)

(52) U.S. Cl.
CPC ......... *B25J 11/0015* (2013.01); *B25J 9/0009* (2013.01); *B25J 19/00* (2013.01)

(58) Field of Classification Search
CPC ...... B25J 11/0015; B25J 9/0009; B25J 19/00; B25J 19/02; B25J 19/04; B25J 19/023;
(Continued)

(56) References Cited

U.S. PATENT DOCUMENTS 5,394,766 A      3/1995    Johnson
6,980,889 B2 *  12/2005    Ito ........................... G06N 3/08
                                                                901/1
(Continued)

FOREIGN PATENT DOCUMENTS

CN      308637925      5/2014
CN      209615545      11/2019
(Continued)

OTHER PUBLICATIONS

Cheng et al., Human Posture Estimation Using Voxel Data for "Smart" Airbag Systems: Issues and Framework, 2004, IEEE, p. 84-89 (Year: 2004).*
(Continued)

*Primary Examiner* — Mcdieunel Marc

(57) ABSTRACT

A humanoid robot includes an upper region includes a head and neck assembly having a neck portion and a head portion coupled to the neck portion. Said head portion includes: a frontal shell having a rear edge, a rear shell having a frontal edge, and an illumination assembly. The illumination assembly is configured to illuminate a region that: (i) extends between a rear edge of the frontal shell and an extent of the frontal edge of the rear shell, (ii) is positioned adjacent to the extent of the rear edge of the frontal shell, and (iii) is positioned adjacent to the extent of the frontal edge of the rear shell.

25 Claims, 56 Drawing Sheets

Related U.S. Application Data continuation-in-part of application No. 18/914,800, filed on Oct. 14, 2024, which is a continuation-in-part of application No. 18/904,332, filed on Oct. 2, 2024, said application No. 18/919,263 is a continuation-in-part of application No. 29/935,680, filed on Apr. 3, 2024, which is a continuation-in-part of application No. 29/928,748, filed on Feb. 15, 2024, which is a continuation-in-part of application No. 29/889,764, filed on Apr. 17, 2023.

(60) Provisional application No. 63/707,897, filed on Oct. 16, 2024, provisional application No. 63/708,003, filed on Oct. 16, 2024, provisional application No. 63/707,949, filed on Oct. 16, 2024, provisional application No. 63/707,547, filed on Oct. 15, 2024, provisional application No. 63/626,037, filed on May 28, 2024, provisional application No. 63/634,697, filed on Apr. 16, 2024, provisional application No. 63/573,528, filed on Apr. 3, 2024, provisional application No. 63/573,226, filed on Apr. 2, 2024, provisional application No. 63/566,595, filed on Mar. 18, 2024, provisional application No. 63/564,741, filed on Mar. 13, 2024, provisional application No. 63/626,034, filed on Mar. 13, 2024, provisional application No. 63/561,316, filed on Mar. 5, 2024, provisional application No. 63/626,035, filed on Feb. 27, 2024, provisional application No. 63/626,028, filed on Feb. 27, 2024, provisional application No. 63/626,030, filed on Feb. 21, 2024.

(58) Field of Classification Search
CPC ... B25J 13/00; B25J 13/06; G02B 2027/0178; G02B 2027/0138; G02B 2219/39001; G02B 2219/32128; G05B 19/41865
See application file for complete search history.

(56) References Cited

U.S. PATENT DOCUMENTS

| | | | |
|---|---|---|---|
| 7,024,276 B2 * | 4/2006 | Ito | G06N 3/008 318/568.15 |
| 7,099,747 B2 * | 8/2006 | Mikami | G05D 1/0891 180/8.1 |
| 7,308,336 B2 * | 12/2007 | Takenaka | B62D 57/02 901/1 |
| 7,319,918 B2 * | 1/2008 | Takenaka | B62D 57/032 901/1 |
| 7,386,364 B2 * | 6/2008 | Mikami | B62D 57/02 318/568.22 |
| D641,808 S | 7/2011 | Matsuda | |
| D677,743 S | 3/2013 | Koshiishi | |
| D687,908 S | 8/2013 | Hoang | |
| 8,511,964 B2 | 8/2013 | Linn | |
| D689,566 S | 9/2013 | Wong | |
| 8,942,849 B2 * | 1/2015 | Maisonnier | B25J 13/003 700/250 |
| D794,692 S | 8/2017 | Haranaka | |
| D795,320 S | 8/2017 | Liu | |
| D795,321 S | 8/2017 | Liu | |
| D835,214 S | 12/2018 | Xiong | |
| D838,759 S | 1/2019 | Kowalski | |
| D841,708 S | 2/2019 | Koshiishi | |
| D866,684 S | 11/2019 | Michael | |
| D868,866 S | 12/2019 | Gable | |
| D872,152 S | 1/2020 | Xiong | |
| D873,320 S | 1/2020 | Clerc | |
| 10,545,497 B1 | 1/2020 | Cui | |
| D885,451 S | 5/2020 | Chen | |
| D888,120 S | 6/2020 | Hurst | |
| D892,886 S | 8/2020 | Klassen | |
| D892,887 S | 8/2020 | Klassen | |
| D893,573 S | 8/2020 | Yan | |
| D898,789 S | 10/2020 | Nazarikhorram | |
| D911,459 S | 2/2021 | Xiong | |
| D932,531 S | 10/2021 | Xu | |
| 11,247,738 B2 | 2/2022 | Lavalley | |
| D985,643 S | 5/2023 | Li | |
| D1,051,193 S | 11/2024 | Mahoor | |
| D1,069,875 S | 4/2025 | Belon | |
| 12,290,940 B1 | 5/2025 | Abate | |
| D1,082,881 S | 7/2025 | Wang | |
| 12,365,094 B2 * | 7/2025 | McCall | B25J 11/0005 |
| 12,403,611 B2 | 9/2025 | Mccall | |
| 2006/0217838 A1 | 9/2006 | Sugino | |
| 2009/0059033 A1 | 3/2009 | Shimada | |
| 2011/0058800 A1 | 3/2011 | Lee | |
| 2011/0067517 A1 | 3/2011 | Ihrke | |
| 2011/0071671 A1 | 3/2011 | Ihrke | |
| 2012/0078419 A1 | 3/2012 | Kim | |
| 2012/0310412 A1 | 12/2012 | Seo | |
| 2013/0175816 A1 | 7/2013 | Kawasaki | |
| 2014/0039675 A1 * | 2/2014 | Ead | G06N 3/008 700/245 |
| 2015/0192399 A1 | 7/2015 | Raab | |
| 2016/0008988 A1 | 1/2016 | Kennedy | |
| 2016/0064263 A1 | 3/2016 | Hosek | |
| 2017/0080582 A1 | 3/2017 | Mugnier | |
| 2017/0326736 A1 | 11/2017 | Nagatsuka | |
| 2018/0104823 A1 | 4/2018 | Kaku | |
| 2018/0182260 A1 | 6/2018 | Ciniello | |
| 2018/0357552 A1 | 12/2018 | Campos | |
| 2019/0100263 A1 | 4/2019 | Amino | |
| 2020/0086479 A1 | 3/2020 | Messier | |
| 2021/0221004 A1 | 7/2021 | Gupta | |
| 2022/0226996 A1 | 7/2022 | Ishizuka | |
| 2022/0294062 A1 | 9/2022 | Kamon | |
| 2023/0048725 A1 | 2/2023 | Barbour | |
| 2023/0390948 A1 | 12/2023 | Hsu | |
| 2024/0091964 A1 | 3/2024 | Smith | |
| 2025/0196326 A1 | 6/2025 | Katz | |
| 2025/0196327 A1 | 6/2025 | Geating | |

FOREIGN PATENT DOCUMENTS

| | | |
|---|---|---|
| CN | 210998685 | 7/2020 |
| CN | 115649316 | 1/2023 |
| CN | 218802294 | 4/2023 |
| CN | 116714698 | 9/2023 |
| CN | 117301022 | 12/2023 |
| CN | 117462367 | 1/2024 |
| CN | 309012925 | 12/2024 |
| JP | 1301180 | 5/2007 |
| JP | D1638014 | 7/2019 |
| JP | 1698172 | 10/2021 |
| KR | 300994127 | 2/2021 |
| KR | 3020240036125 | 9/2024 |
| SU | 1734994 | 5/1992 |
| WO | 2023107501 | 6/2023 |
| WO | 2023110778 | 6/2023 |
| WO | 2023246994 | 12/2023 |
| WO | 2023246995 | 12/2023 |
| WO | D243074010 | 10/2024 |

OTHER PUBLICATIONS

Droeschel et al., Learning to Interpret Pointing Gestures with a Time-of-Flight Camera, , IEEE, p. 481-488 (Year: 2025).*
Frohlich et al., Design and implementation of a spherical joint for mobile manipulators, 2025, IEEE, p., (Year: 2025).*
Netzev et al., Design and implementation of a spherical joint for mobile manipulators, 2019, IEEE, p. 342-348 (Year: 2019).*
International Search Report for PCT/US2025/023064 dated Jul. 14, 2025.
Englsberger et al., "Overview of the Torque-Controlled Humanoid Robot TORO," 2014 14th IEEE-RAS International Conference on Humanoid Robots (Humanoids), Nov. 18-20, 2014. Madrid, Spain.

(56) References Cited

OTHER PUBLICATIONS

Mikayla Tetteh-Martey, (date posted Nov. 3, 2024), Blurring Lines: Resurgence of 'I, Robot', Cornellsun.com, URL: (https://www.cornellsun.com/article/2024/11/blurring-lines-resurgence-of-i-robot), (Year: 2024).
Mike Oitzman, (date posted Aug. 6, 2024), Figure 02 humanoid robot is ready to get to work, therobotreport.com, URL: (https://www.therobotreport.com/figure-02-humanoid-robot-is-ready-to-get-to-work/), (Year: 2024).
Hebi Robotics, "T-Series Actuator," Jan. 29, 2024.
International Search Report for PCT/US2025/019793.
International Search Report for PCT/US2025/025005.
International Search Report for PCT/US2025/016930 dated Jun. 10, 2025.
International Search Report for PCT/US25/23325.
Haddadin et al., "The "DLR Crash Report": Towards a Standard Crash-Testing Protocol for Robot Safety—Part II Discussions," IEEE, p. 280-287 (2009).
Mokhtari et al., "Taban: A Retro-Projected Social Robotic—Head for Human-Robot Interation," IEEE, p. 46-51 (2019).
Yaghoubi et al., "Region-Based CNNs for Pedestrian Gender Recognition in Visual Surveillance Einvironments," IEEE, p. 1-5 (2019).
Pateromichelakis et al., "Head-Eyes System and Gaze Analysis of the Humanoid Robot Romeo," IEEE p. 1374-1379 (2014).
International Search Report for PCT/US2025/024817.

\* cited by examiner

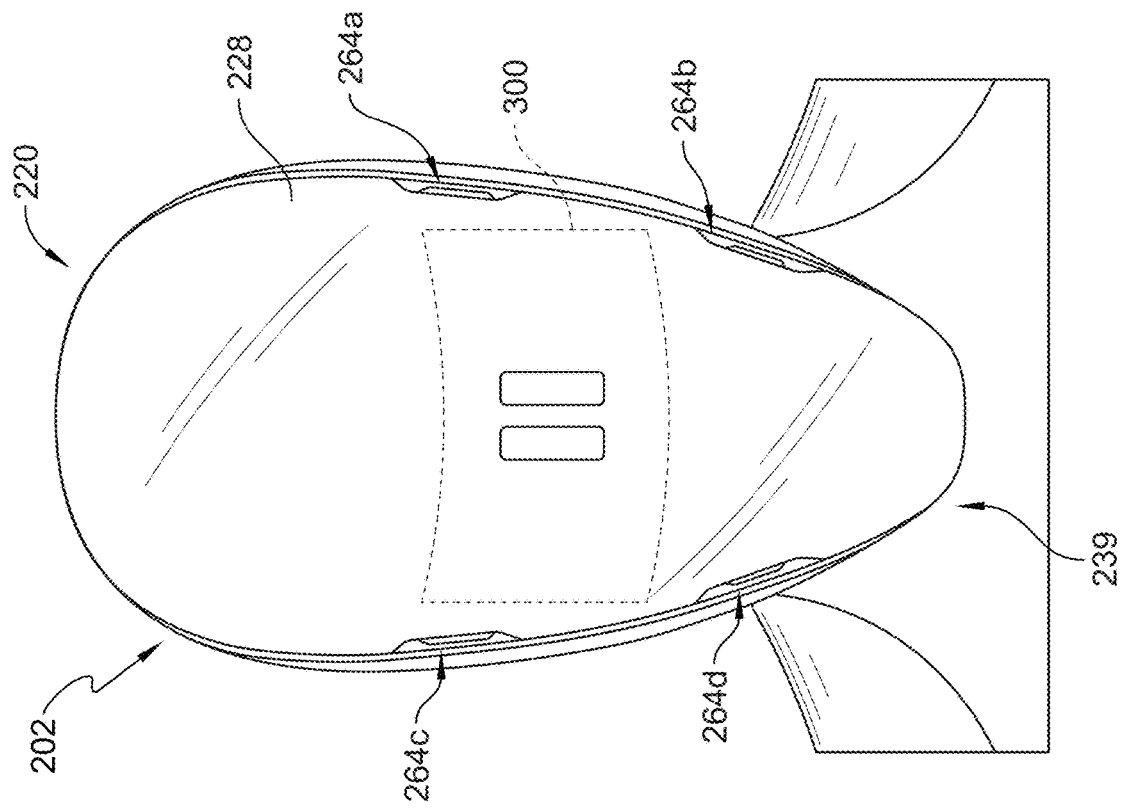
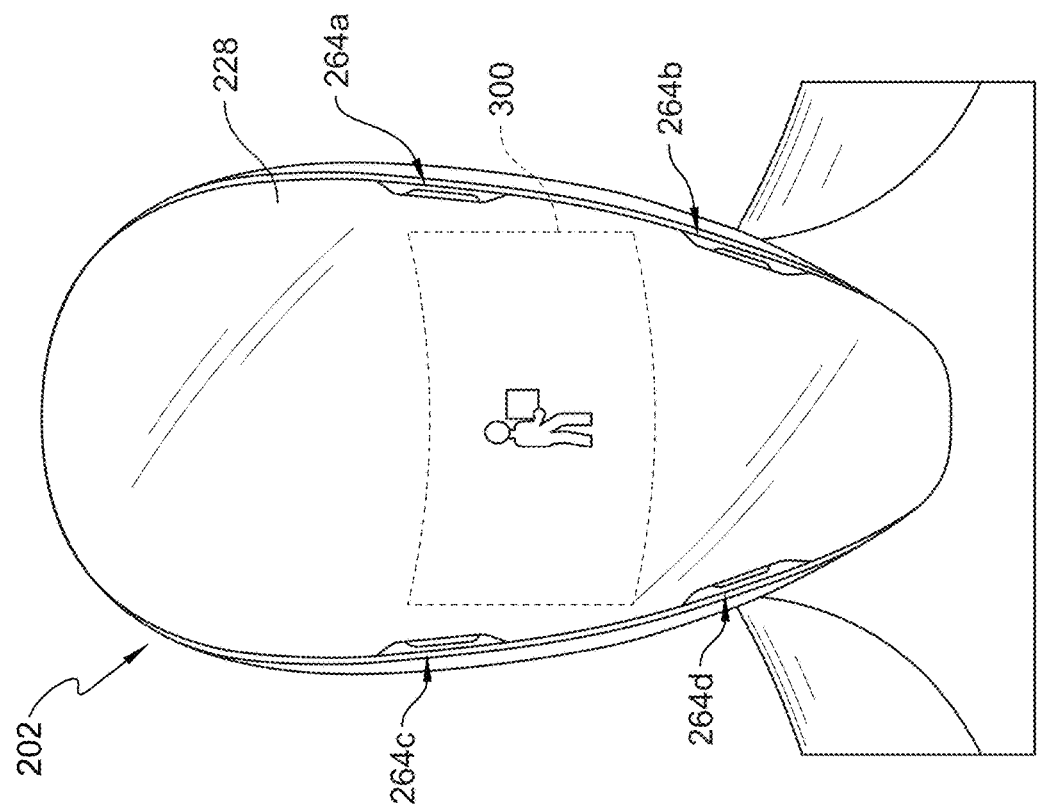

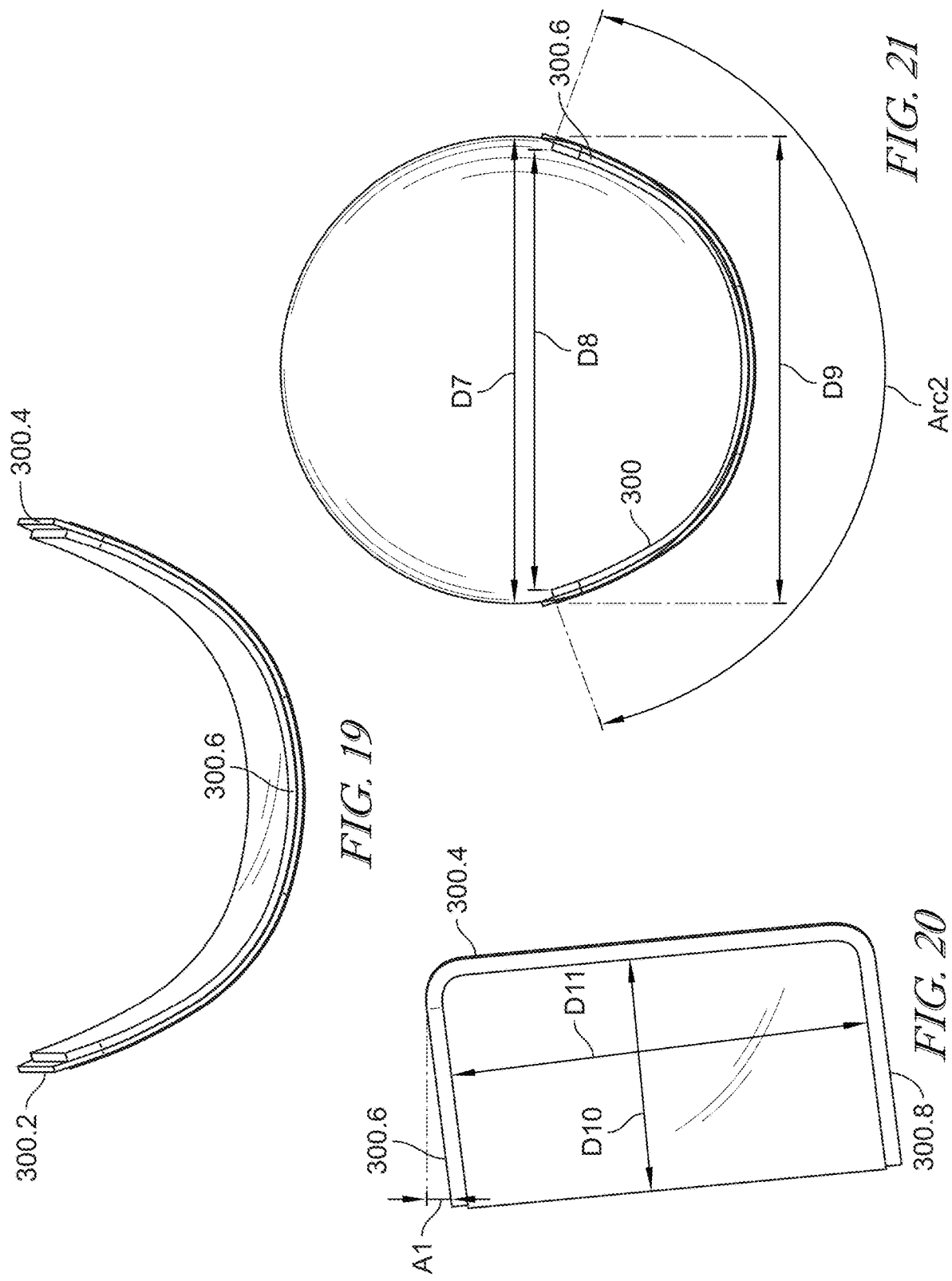

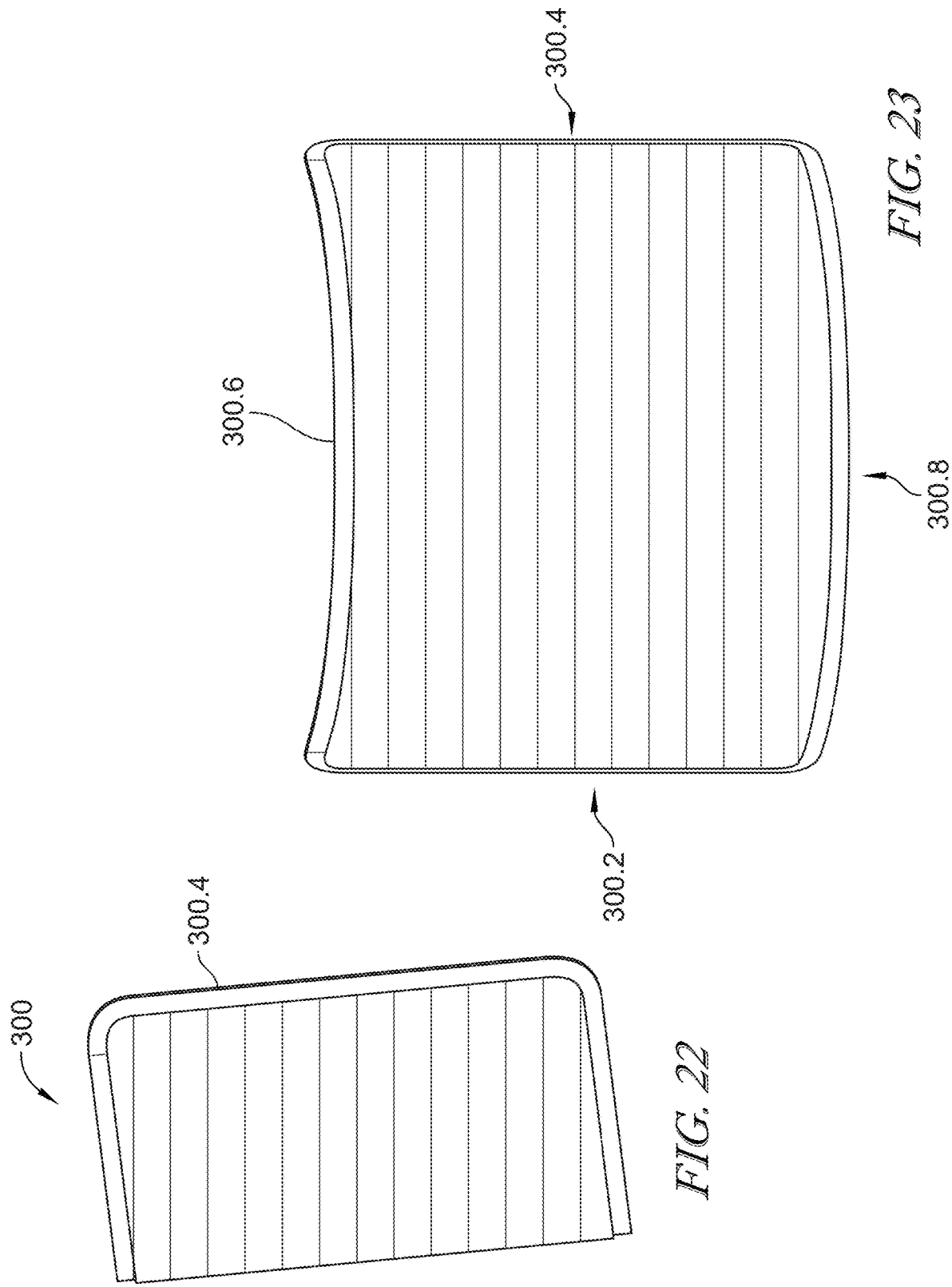

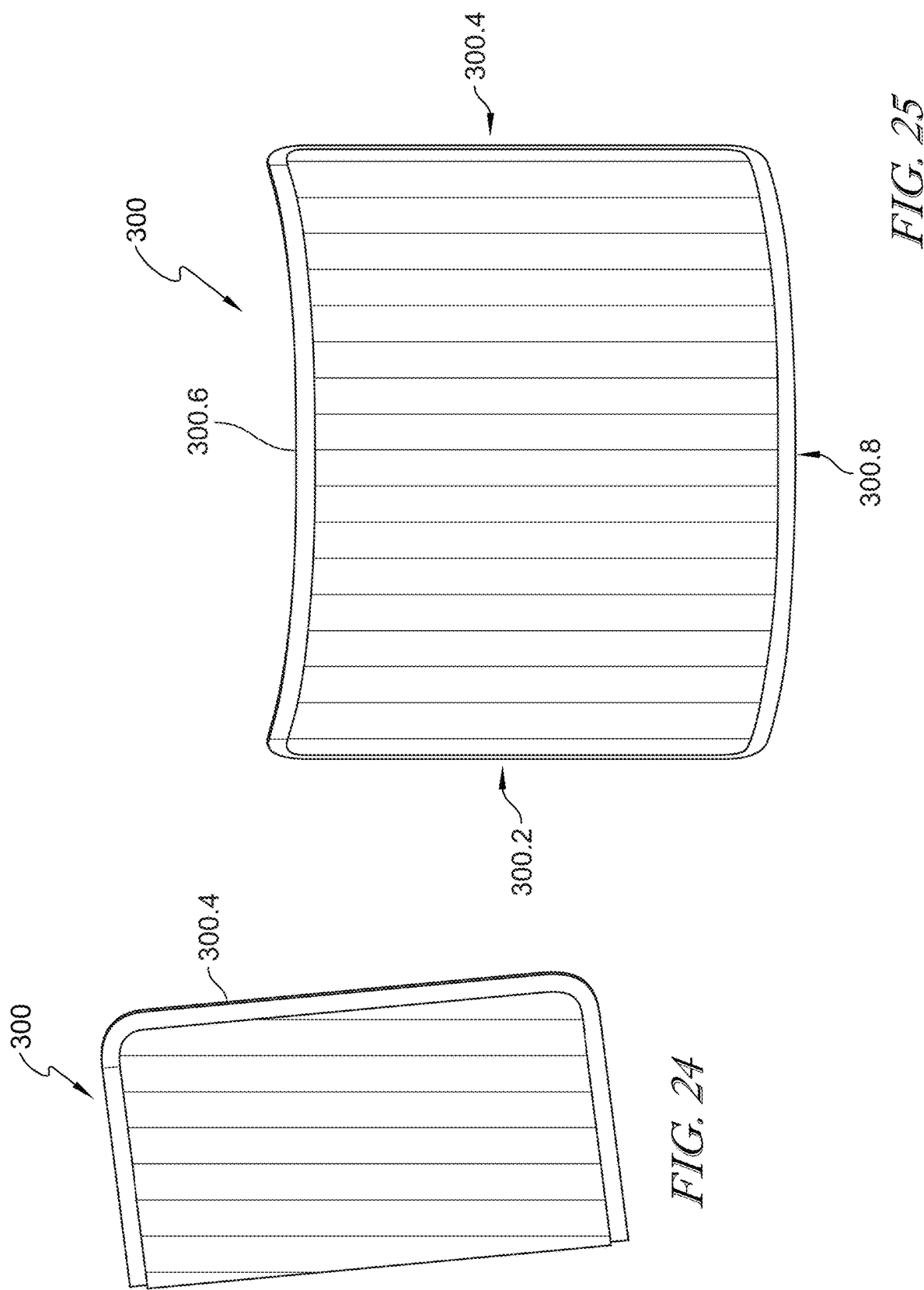

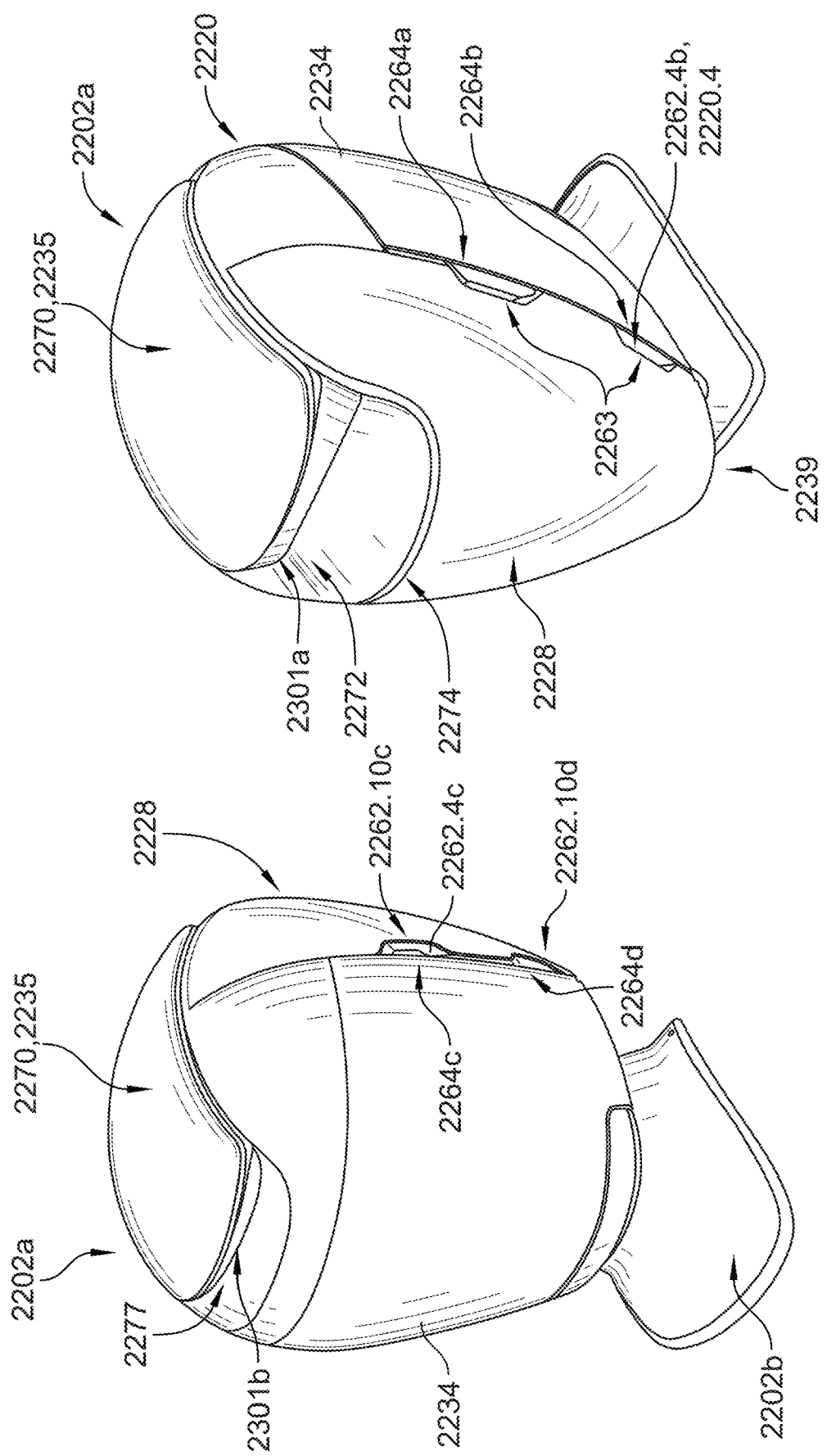

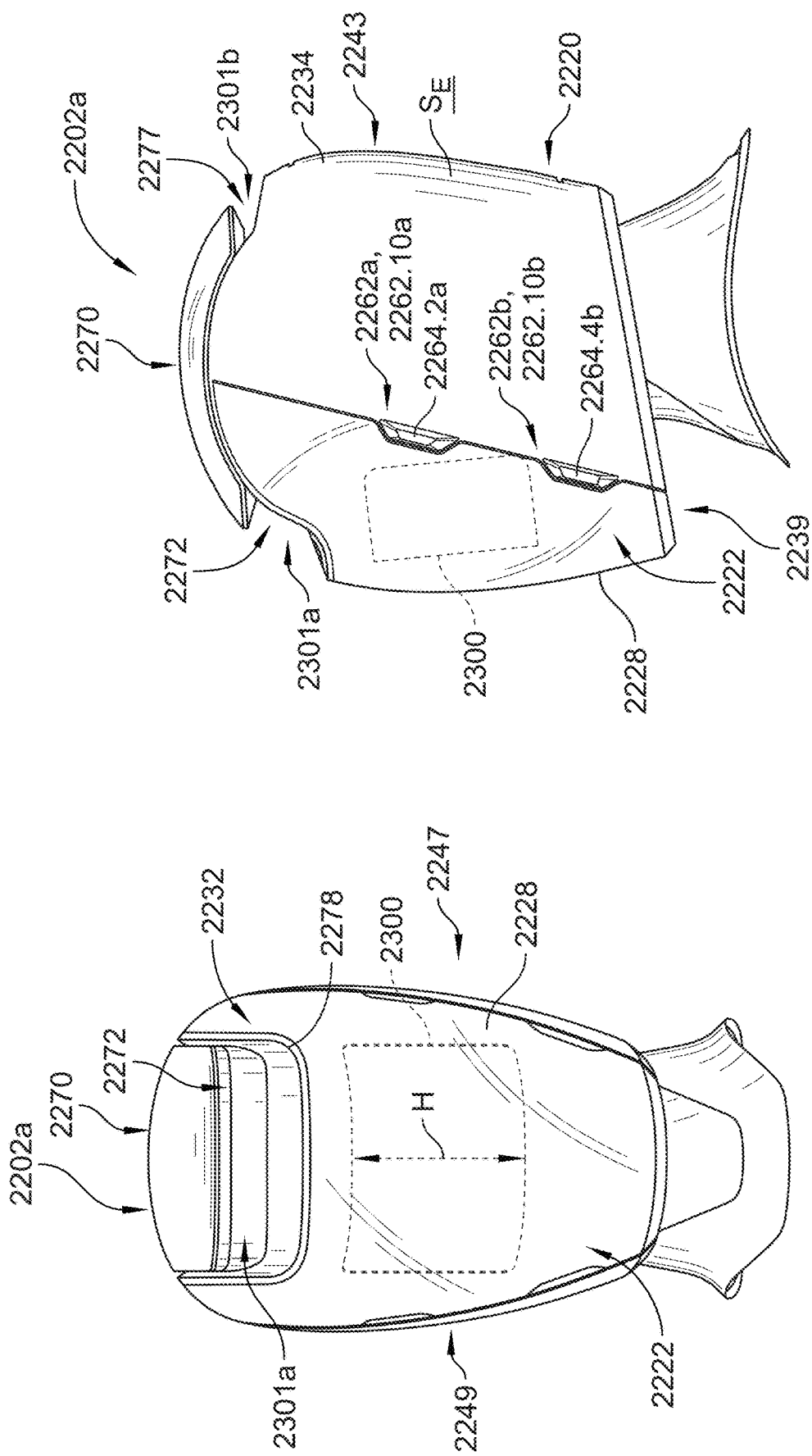

HEAD AND NECK ASSEMBLY OF A HUMANOID ROBOT

PRIORITY CLAIM AND CROSS-REFERENCE TO RELATED APPLICATIONS

This application is a continuation of U.S. patent application Ser. No. 18/919,263, filed Oct. 17, 2024, which is: (i) a continuation in part of U.S. patent application Ser. No. 18/914,800, filed Oct. 14, 2024, which is a continuation in part of U.S. patent application Ser. No. 18/904,332, filed Oct. 2, 2024, (ii) a continuation in part of U.S. Design patent application Ser. No. 29/935,680, filed Apr. 3, 2024, which is a continuation in part of U.S. Design patent application Ser. No. 29/928,748, filed Feb. 15, 2024, which is a continuation in part of U.S. Design patent application Ser. No. 29/889,764, filed Apr. 17, 2023, and (iii) claims priority under 35 U.S.C. § 119(e) to U.S. Provisional Patent Application No. 63/626,035, filed Feb. 27, 2024, U.S. Provisional Patent Application No. 63/564,741, filed Mar. 13, 2024, U.S. Provisional Patent Application No. 63/626,034, filed Mar. 13, 2024, and U.S. Provisional Patent Application No. 63/626,037, filed May 28, 2024, U.S. Provisional Patent Application No. 63/626,030, filed Feb. 21, 2024, U.S. Provisional Patent Application No. 63/566,595, filed Mar. 18, 2024, U.S. Provisional Patent Application No. 63/626,028, filed Feb. 27, 2024, U.S. Provisional Patent Application No. 63/573,528, filed Apr. 3, 2024, U.S. Provisional Patent Application No. 63/561,316, filed Mar. 5, 2024, U.S. Provisional Patent Application No. 63/634,697, filed Apr. 16, 2024, U.S. Provisional Patent Application No. 63/573,226, filed Apr. 2, 2024, U.S. Provisional Patent Application No. 63/707,949, filed Oct. 16, 2024, U.S. Provisional Patent Application No. 63/707,897, filed Oct. 16, 2024, U.S. Provisional Patent Application No. 63/707,547, filed Oct. 16, 2024, U.S. Provisional Patent Application No. 63/708,003, filed Oct. 16, 2024, each of which is expressly incorporated by reference herein in its entirety.

Reference is hereby made to U.S. Provisional Patent Application No. 63/557,874, filed Feb. 26, 2024, U.S. Provisional Patent Application No. 63/626,040, filed Jan. 28, 2024, U.S. Provisional Patent Application No. 63/626,105, filed Jan. 29, 2024, U.S. Provisional Patent Application No. 63/625,362, filed Jan. 26, 2024, U.S. Provisional Patent Application No. 63/625,370, filed Jan. 26, 2024, U.S. Provisional Patent Application No. 63/625,381, filed Jan. 26, 2024, U.S. Provisional Patent Application No. 63/625,384, filed Jan. 26, 2024, U.S. Provisional Patent Application No. 63/625,389, filed Jan. 26, 2024, U.S. Provisional Patent Application No. 63/625,405, filed Jan. 26, 2024, U.S. Provisional Patent Application No. 63/625,423, filed Jan. 26, 2024, U.S. Provisional Patent Application No. 63/625,431, filed Jan. 26, 2024, U.S. Provisional Patent Application No. 63/685,856, filed Aug. 22, 2024, U.S. Provisional Patent Application No. 63/696,507, filed Sep. 19, 2024, U.S. Provisional Patent Application No. 63/696,533, filed Sep. 19, 2024, and U.S. Provisional Patent Application No. 63/706,768, filed Oct. 14, 2024, each of which is expressly incorporated by reference herein in its entirety.

TECHNICAL FIELD

This disclosure relates to a head of a robot, specifically a head of a humanoid robot. The head of the humanoid robot includes a plurality of components configured to provide the robot with the ability to communicate with nearby humans using a display that is protected by a frontal shell.

BACKGROUND

The current labor market within the United States is confronting an unprecedented labor shortage, characterized by over 10 million unfilled positions. A significant proportion of these vacancies pertain to occupations that are deemed unsafe, undesirable, or involve hazardous working conditions. This persistent and escalating shortage of available labor has created an urgent imperative for the development and deployment of advanced robotic systems capable of performing tasks that are unattractive or pose risks to human workers. To effectively address this widening gap in the workforce, it has become critical to design and engineer robots that can operate with high efficiency and reliability within human-centric environments. These environments often demand capabilities such as physical dexterity, sustained endurance, precise manipulation, and the ability to navigate complex spaces designed for humans.

Advanced general-purpose humanoid robots have emerged as a promising solution to meet these challenges. These robots are meticulously engineered to replicate the human form and emulate human functionality, typically featuring bipedal locomotion with two legs, bilateral manipulation abilities with two arms, and a display to facilitate interaction with human users. The anthropomorphic design enables these robots to seamlessly integrate into environments originally designed for humans, thereby minimizing the need for extensive modifications to existing infrastructures. As these robots endeavor to mimic the human body, it becomes essential to equip them with a head design that not only meets functional requirements but also enhances aesthetic appeal and durability. The head is a critical component for human-robot interaction, serving as the primary interface through which the robot communicates and engages with nearby humans. A well-designed head can significantly improve the robot's ability to convey information, express intentions, and respond to human cues, thereby fostering a more intuitive and natural interaction experience.

To meet these requirements, the present disclosure introduces an innovative head design that incorporates a versatile display system. This display is capable of adapting its visual output to suit a wide range of operational tasks by rendering icons, graphics, expressive animations, and informative text. The adaptability of the display allows the robot to present contextually relevant information and provide visual feedback, all of which enhance the robot's ability to interact effectively with human users. By making the robot's appearance more relatable and intuitive, the display fosters improved engagement and facilitates smoother human-robot collaboration.

Considering the sensitive and fragile nature of display technologies, and acknowledging the often challenging and harsh environments in which humanoid robots are deployed, it is advantageous to position the display behind a protective shield. This strategic placement serves multiple purposes. Firstly, the shield safeguards the display from potential contaminants such as dust, moisture, chemicals, and particulate matter that could adversely affect its performance and longevity. Secondly, the shield provides protection against physical impacts, vibrations, and mechanical stresses that may occur during operation, especially in industrial or outdoor settings. By mitigating the risks of damage to the display, the shield contributes to the overall robustness and reliability of the robot. Moreover, the integration of the display behind a shield contributes to a sleek and futuristic aesthetic, enhancing the robot's visual appeal.

In summary, the disclosed head design addresses the critical need for a durable, adaptable, and aesthetically pleasing interface for a general-purpose humanoid robot. By combining a versatile display with the frontal shell, the design ensures that the robot can effectively communicate and interact with humans while withstanding the rigors of diverse operational environments. This innovation not only enhances the functionality and user experience but also extends the operational lifespan of the robot, thereby providing a more sustainable and cost-effective solution for addressing the current labor market challenges.

SUMMARY

A need exists for a humanoid robot with an upper region including: (i) a torso, (ii) a pair of arm assemblies coupled to the torso, and (iii) a head and neck assembly coupled to the torso and having a neck portion and a head portion coupled to the neck portion. Said head portion includes: a frontal shell having a rear edge, a rear shell having a frontal edge, and an illumination assembly. The illumination assembly is configured to illuminate a region that: (i) extends between a rear edge of the frontal shell and an extent of the frontal edge of the rear shell, (ii) is positioned adjacent to the extent of the rear edge of the frontal shell, and (iii) is positioned adjacent to the extent of the frontal edge of the rear shell. The humanoid robot also includes: (i) a central region coupled to the upper region, and (ii) a lower region coupled to the central region and spaced apart from the upper region, the lower region including a pair of legs.

There is also a need for a humanoid robot with an upper region including: (i) a torso, (ii) a pair of arm assemblies coupled to the torso, and (iii) a head and neck assembly coupled to the torso and having a neck portion and a head portion coupled to the neck portion. Said head portion includes a frontal shell having a curvilinear periphery, and an outer surface having a nasal region and an orbital region that is not recessed in comparison to said nasal region. The head portion also includes an illumination assembly configured to emit light in a location that is adjacent to the periphery of the frontal shell. Finally, the humanoid robot also includes: (i) a central region coupled to the upper region, and (ii) a lower region coupled to the central region and spaced apart from the upper region, the lower region including a pair of legs.

BRIEF DESCRIPTION OF THE DRAWINGS

The drawing figures depict one or more implementations in accord with the present teachings, by way of example only, not by way of limitation. In the figures, like reference numerals refer to the same or similar elements shown across various other figures.

FIG. 9F is a front view of the head of the robot showing an icon indicating a particular task being performed by the robot on an/or through the frontal shell;

FIG. 9G is a front view of the head of the robot showing an additional robot status icon on an/or through the frontal shell;

FIG. 19 is a top view of the display of FIG. 12;

FIG. 20 is a side view of the display of FIG. 12;

FIG. 21 is a top view of the display of FIG. 12, wherein a circle is disposed on the inside of the display in order to show its curvilinear configuration;

FIG. 22 is a side view of the display showing a plurality of zones in a horizontal arrangement relative to one another;

FIG. 23 is a front view of the display of FIG. 22;

FIG. 24 is a side view of the display showing a plurality of zones in a vertical arrangement relative to one another;

FIG. 25 is a front view of the display of FIG. 24;

FIG. 28 is a rear perspective view of a second embodiment of a head and neck assembly of the humanoid robot of FIG. 1;

FIG. 29 is a front perspective view of the head and neck assembly of FIG. 28, wherein the head assembly further includes an upper shell with an upper recessed sensor zone;

FIG. 30 is a front view of the head and neck assembly of FIG. 28;

FIG. 31A is a side view of the head and neck assembly of FIG. 28;

DETAILED DESCRIPTION

Figure 1:
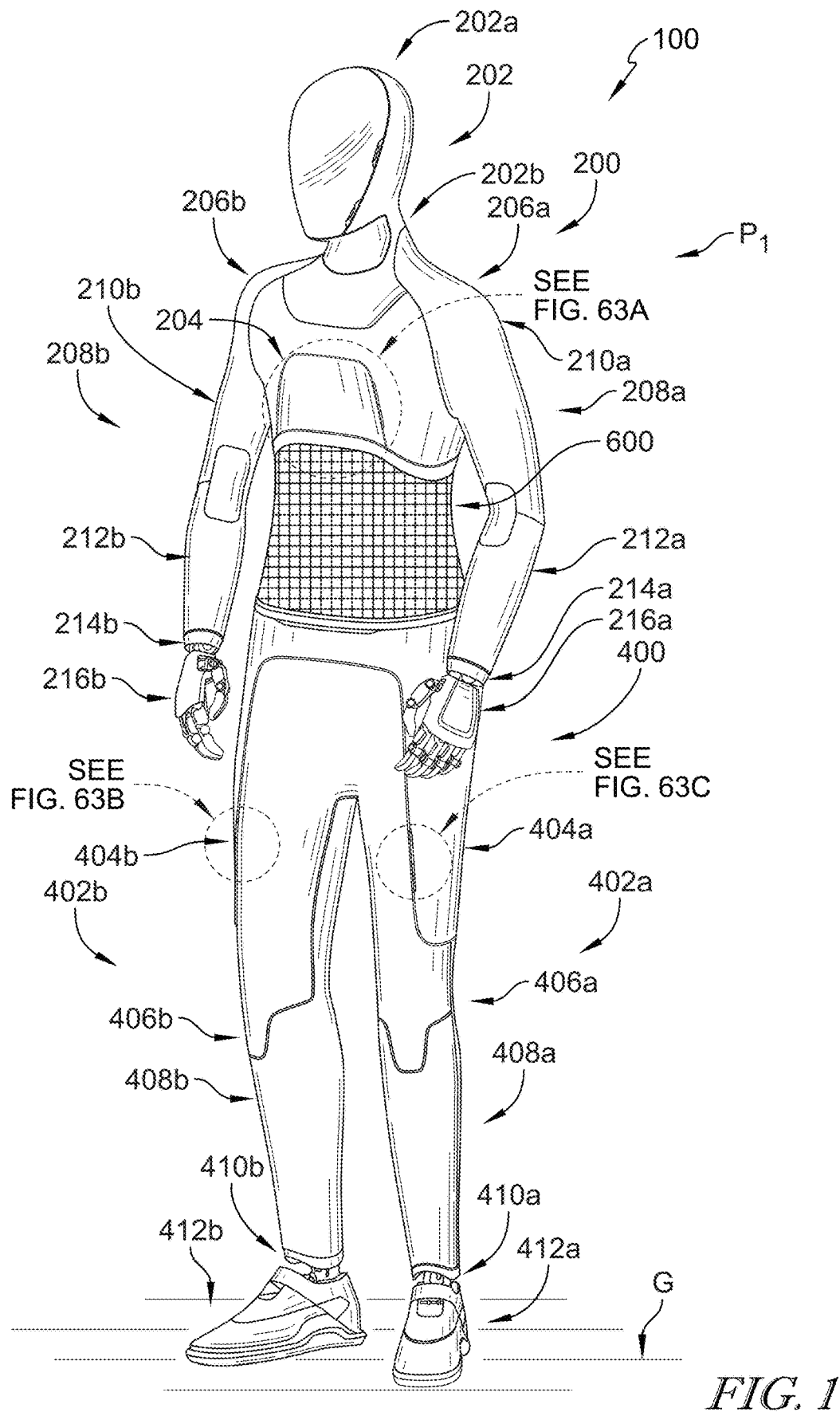
FIG. 1 is a front perspective view of a humanoid robot in an upright, standing position P1 and including: (i) an upper region having the following parts: (a) a head and neck assembly, (b) a torso, (c) left and right shoulders, (d) and left and right arm assemblies each including: (e) a humerus, (f) a forearm, (g) a wrist, and (h) a hand; (ii) a lower region having left and right leg assemblies each including: (a) a thigh, (b) a knee, (c) a shin, (d) an ankle, and (e) a foot; and (iii) a central region connecting the upper portion and the lower portion to one another and configured to allow movement of the upper and lower regions relative to one another.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present disclosure.

While this disclosure includes several embodiments in many different forms, there is shown in the drawings and will herein be described in detail embodiments with the understanding that the present disclosure is to be considered as an exemplification of the principles of the disclosed methods and systems, and is not intended to limit the broad aspects of the disclosed concepts to the embodiments illustrated. As will be realized, the disclosed methods and systems are capable of other and different configurations and several details are capable of being modified all without departing from the scope of the disclosed methods and systems. For example, one or more of the following embodiments, in part or whole, may be combined consistent with the disclosed methods and systems. As such, one or more steps from the flow charts or components in the Figures may be selectively omitted and/or combined consistent with the disclosed methods and systems. Additionally, one or more steps from the flow charts or the method of assembling the shoulder and upper arm may be performed in a different order. Accordingly, the drawings, flow charts and detailed description are to be regarded as illustrative in nature, not restrictive or limiting.

A. Introduction

Unlike conventional robots and as described in greater detail below, the disclosed humanoid robot 100 includes an upper region 200 having a head and neck assembly 202. The head and neck assembly 202 is coupled to a torso 204 and has an overall shape that generally resembles a human head. As such, the head and neck assembly 202 includes a head portion 202a, 2202a, 3202a, 4202a, 5202a, 6202a, 7202a that does not include large flat surfaces (e.g., opposed sides of a head, or is not in the shape of: (a) a cube, (b) a hexagonal prism, or (c) a pentagonal prism). Instead, almost all the surfaces of the head portion 202a are curvilinear or have substantial curvilinear aspects or segments. However, as shown in the Figures, some embodiments of the head portion 202a do include a recess with a small flat sensor cover or lens, which is recessed in a top portion of the head portion 202a and is designed to decrease sensor signal distortion that may be caused if the sensor signals are required to travel through a curvilinear shell, cover, shield, or lens. Additionally, while the overall head shape is designed to be human-like, the disclosed head portion 202a lacks pronounced human facial structures (cheeks, eye peripheral protrusions, a mouth, or other moving structures).

The frontal region of the head portion 202a is covered by a large freeform frontal shell, frontal head shell, or frontal shield 228, 2228, 3228, 4228, 5228, 6228, 7228 wherein the curvature of the frontal shell 228 varies both horizontally and laterally across the head portion 202a. The freeform nature of the frontal shell 228 causes it to be a separate and distinct component from the display(s) 300, 2300, 3300, 4300, 5300, 6300, 7300 that is positioned behind the frontal shell 228. This positional relationship allows the frontal shell 228 to protect the display 300 and other electronics contained within the head portion 202a from potential damage, a feature which provides a substantial benefit over conventional robot heads that lack this protective element. For example, certain tasks, that the humanoid robot 100 may perform on a factory floor such as moving and cutting sheet metal, may damage or break a display 300 that is not adequately protected behind such a frontal shell 228. As shown in the Figures, the frontal shell 228 does not extend over the entirety of an upper head shell, nor behind an ear region, nor does it extend into the rear region of the head portion 202a. However, the frontal shell 228 extends to the chin region of the head portion 202a and, in some embodiments, includes a substantial opening or recess formed along the upper extent of the shield 228. The opening or recess, which is formed along the upper edge of the frontal shell 228, allows for the inclusion of a small flat sensor cover or a secondary lens. Due to the formation of this opening or recess, the frontal shell 228 includes two wing-shaped structures that extend upwards from a main body of the shell and effectively surround lateral extents of the sensors that are positioned behind the aforementioned small flat sensor cover.

Unlike conventional robot heads, the disclosed head portion 202a includes a display 300, 2300, 3300, 4300, 5300, 6300, 7300 that is preferably curved in a single direction, or at least one direction, and is positioned on an angle relative to the coronal plane and a horizontal reference plane. The curved nature of the display 300 allows for the inclusion of a larger display with a larger surface area within the head portion 202a; this, in turn, increases the amount of information that can be displayed on the display 300. The larger display 300 provides a benefit over conventional robot heads that lack this feature because those conventional robots must either forgo displaying as much information (while not altering the size of the information) or undesirably increase the size of their head (which consequently causes a number of other issues, including increased material costs and assembly costs). Additionally, being able to display more information on the disclosed display 300 is beneficial because the disclosed humanoid robot 100 does not include any other internal displays. Further, including only a single display 300 within the humanoid robot 100 is beneficial because it: (i) reduces the space needed for displays, (ii) reduces the battery usage attributable to displays, and (iii) at least reduces, and typically eliminates, the inclusion of fragile components within the robot. The display may be configured to display robot status, sensor data, and/or other relevant information to nearby human beings. However, the display is not configured to display human-like facial features (eyes, nose, mouth, etc.) or expressions, but instead is designed to use generic blocks or shapes.

Unlike conventional robot heads, in some embodiments, the disclosed head portion 202a may include two separate sensor assemblies 301a, 2301c, 2301c, 3301a, 3301b, 4301a, 5301a. The first camera(s) 302, 303, 304, 2302, 3303, 3304, 4302, 5302 may be positioned within the upper shell or the robot's forehead region, while the second camera 3305 may be positioned within the neck portion 202b or the robot's chin region. The strategic position of the first camera(s) 302, 303, 304, 2302, 3303, 3304, 4302, 5302 offers two advantages: (i) it enables a larger display 300 to be utilized within the head portion 202a, and (ii) it allows the humanoid robot 100 to see into a bin that is placed on a high shelf or rack. Including the second camera 3305 enables the humanoid robot 100 to look downward (e.g., to see what it is carrying or to look into a storage bin) without needing to use the first camera(s) 302, 303, 304, 2302, 3303, 3304, 4302, 5302. These features are significantly beneficial over conventional robots that lack a second camera 3305, because such conventional robots must bend and articulate their neck to a greater degree to obtain the data that would otherwise be captured by the second camera 3305. Also, neither camera(s) 302, 303, 304, 2302, 3303, 3304, 4302, 5302 in the disclosed head portion 202a is positioned where a human's eyes would typically be located, nor above the crown of the head, nor on either side of the robot's head 202a. It should be understood that various configurations are possible: (i) both the first and second camera(s) 302, 303, 304, 2302, 3303, 3304, 3305, 4302, 5302 may be omitted, (ii) the first or upper camera(s) 302, 303, 304, 2302, 3303, 3304, 4302, 5302 may be omitted, while the second or lower camera 3305 is retained, or (iii) the second or lower camera 3305 may be omitted, while the first or upper camera(s) 302, 303, 304, 2302, 3303, 3304, 4302, 5302 is retained.

The electronics assembly of the disclosed head portion 202a may include an illumination assembly 263 having at least one light emitter, and preferably a plurality of light emitting assemblies 264a-264d, 2264a-2264d, 3264a-3264d, 4264a-4264d, 5264, 6264, 7264 are positioned adjacent to a rear edge of the frontal shell 228. These light emitters 264.2a-264.2d enable the humanoid robot 100 to communicate with humans without using the display 300 that is disposed behind the frontal shell 228, wherein said light emitters act as, or are configured to act as, indicator lights. Typically, the light emitters (and in this configuration, these indicator lights) can communicate information about the humanoid robot 100 to nearby humans by: (i) emitting light having different wavelengths, wherein said emitted light may be perceived by a nearby human as having different colors of light, and/or (ii) utilizing various illumination sequences, durations, and/or brightness levels. For example, the indicator lights may be used to communicate the working state (e.g., yellow light—600 nm), idle state (e.g., green light 550 nm), charging state (e.g., blinking light or white light), error state (e.g., red light 665 nm), thinking or processing state (e.g., blue light 470 nm), or other general operational states. This capability is beneficial because it can limit the amount of information that needs to be displayed on the main display 300 and allows a human, another robot, or a machine to receive information from the humanoid robot 100, even when the human, robot, or machine is positioned directly to one side of the humanoid robot 100 (a position from which the human, robot, or machine could not see the main display 300). Also, the light emitters 264.2a-264.2d use less battery power than the display 300 and may be able to relay information more quickly to the human, robot, or machine. Alternatively, the indicator lights can signal an operator to immediately take note of a more complex condition or set of information that is comprehensively displayed on the display 300, thereby ensuring that an operator properly assesses that complex condition or information pertaining to the humanoid robot 100. It should be understood that in other embodiments, the illumination assembly may: (i) emit a light that surrounds the periphery of the frontal shell 228, (ii) emit a light that surrounds the rear edge of the frontal shell 228, or (iii) include one or more emitters positioned in other parts of the humanoid robot 100 (e.g., torso 204, knee 406a/406b, leg assembly 402a/402b, arm assembly 208a/208b, hand 216a/216b, etc.).

B. Robot Architecture

The humanoid robot 100 is designed to possess substantial similarities in form factor and anatomy to human beings, including many of the same major appendages that human beings have. The humanoid robot 100 includes an upper region 200, a lower region 400 spaced apart from the upper region 200, and a central region 600 that interconnects the upper region 200 and the lower region 400. The humanoid robot 100 is depicted in FIGS. 1 and 2 in an upright, standing position P1, where a pair of feet 412a, 412b of the lower region 400 are standing on a floor or ground surface G, such that the lower region 400 supports the upper region 200 and the central region 600 above the floor or ground surface G.

The upper region 200 includes the following principal parts: (a) the previously mentioned head and neck assembly 202, (b) a torso 204, (c) left and right shoulders 206a, 206b, and (d) left and right arm assemblies 208a, 208b, each of which includes: (e) a humerus 210a, 210b, (f) a forearm 212a, 212b, (g) a wrist 214a, 214b, and (h) a hand 216a, 216b. The lower region 400 includes left and right leg assemblies 402a, 402b, each of which includes: (a) a thigh 404a, 404b, (b) a knee 406a, 406b, (c) a shin 408a, 408b, (d) an ankle 410a, 410b, and (e) a foot 412a, 412b. The central region 600 is located generally in, or effectively provides, a pelvis region for the humanoid robot 100. Each of the components of the upper region 200 and the lower region 400 noted above includes at least one actuator, which is configured to move these components relative to one another. The central region 600 is also configured to allow movement of the upper and lower regions 200, 400 relative to one another in a three-dimensional manner.

C. Head and Neck Assembly

Figure 2:
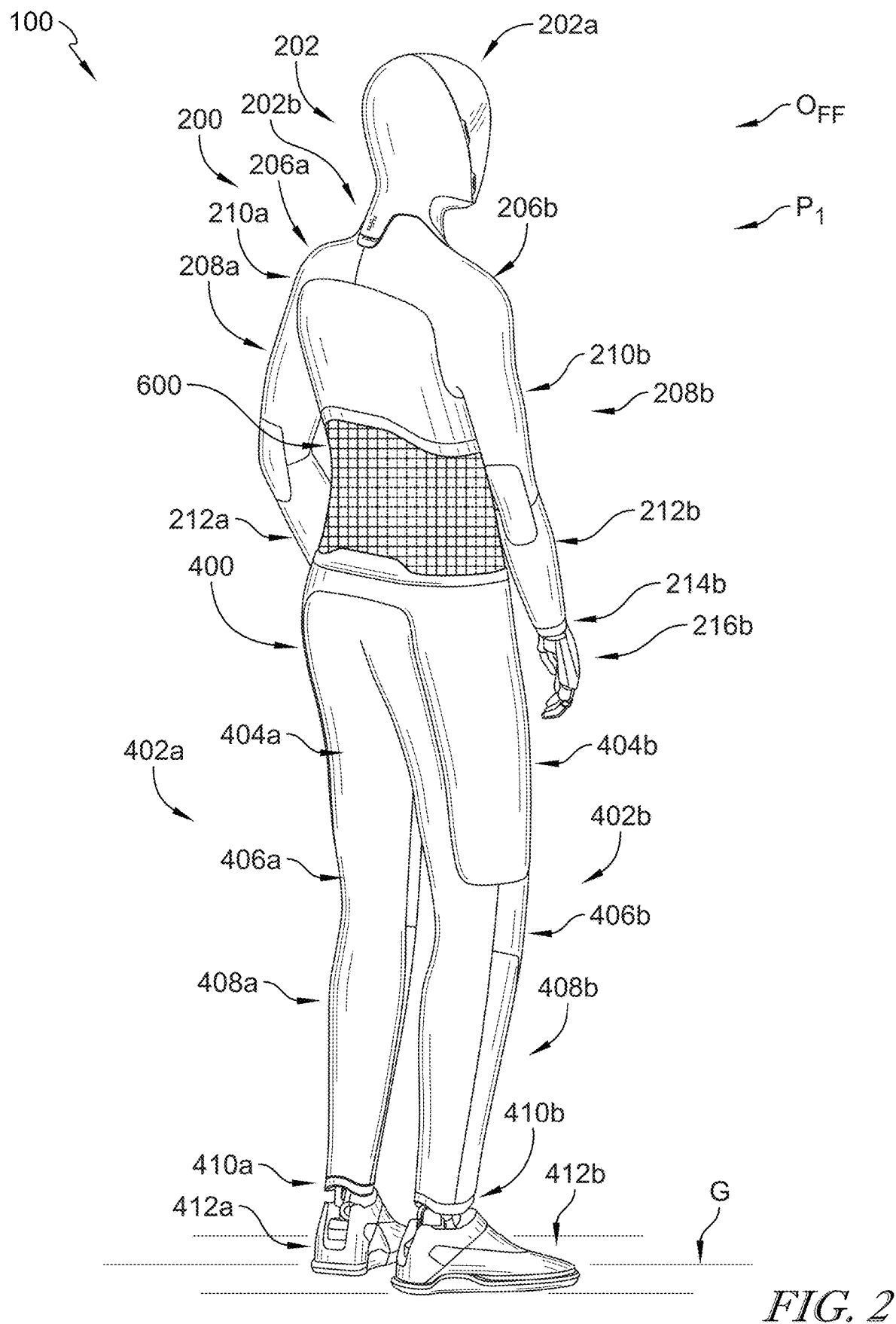
FIG. 2 is a rear perspective view of the humanoid robot of FIG. 1 in the upright, standing position P1.

As shown in FIG. 1, it can be observed that the head and neck assembly 202 of the humanoid robot 100 extends from the torso 204 and is designed to: (i) provide the humanoid robot 100 with a recognizably humanoid shape, (ii) house and protect one or more electronic components (e.g., the display 300, light emitting assemblies 264a-264d, sensors, and/or head actuators), and (iii) provide information to a nearby human using the display 300 and/or the light emitting assemblies 264a-264d. As detailed in FIGS. 7-30, the head and neck assembly 202 comprises: (i) a head portion 202a, and (ii) a neck portion 202b that is coupled to a lower end or extent of said head portion 202a.

1. Exterior Head Shape

Figure 3:
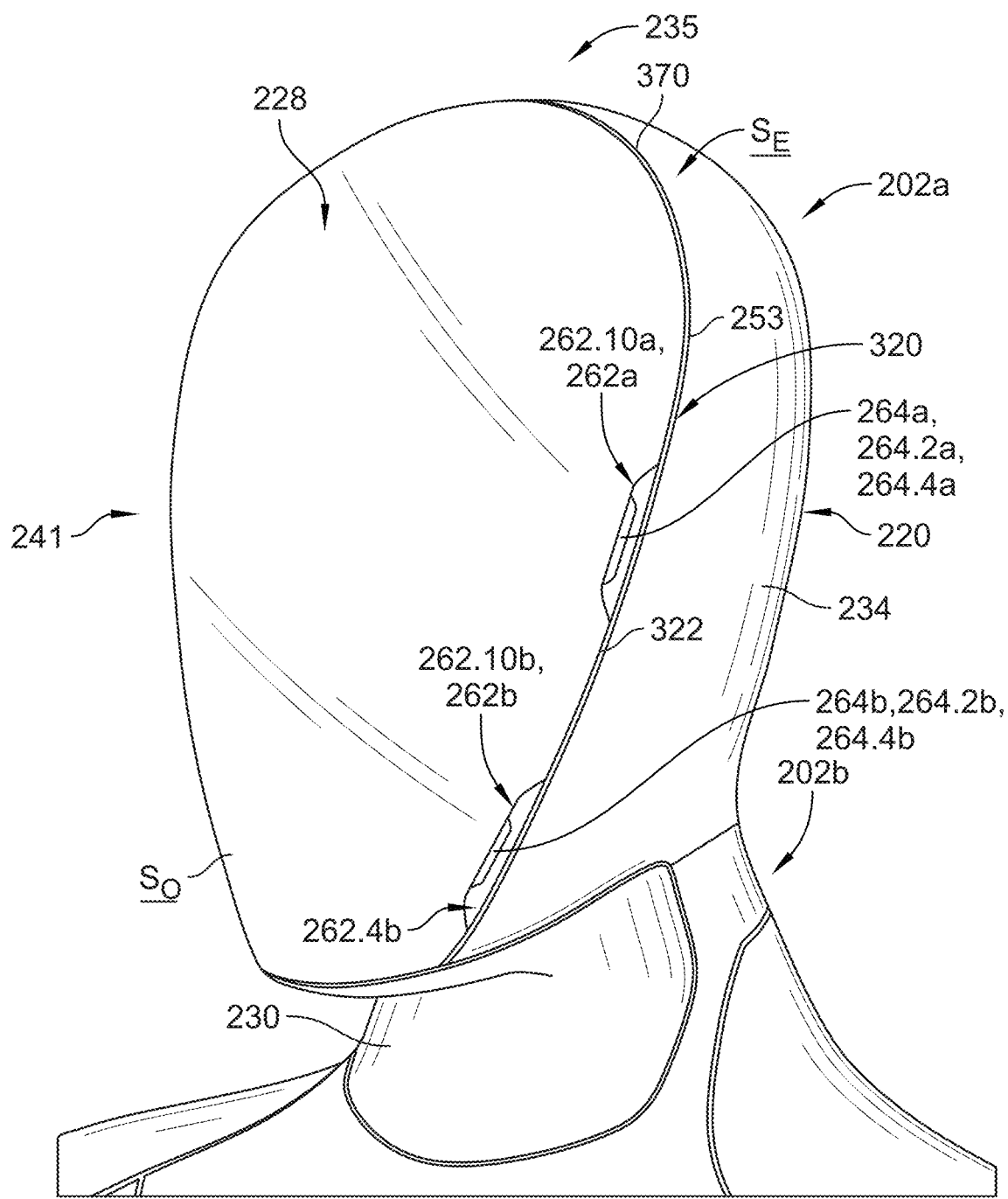
FIG. 3 is a perspective view of the head and neck assembly of the humanoid robot of FIG. 1 showing the head and neck assembly including: (i) a head portion having: (a) a head housing assembly with a frontal shell and a rear shell, (b) a head electronics assembly with an illumination assembly having at least one light emitter configured to emit light between an extent of the frontal shell and rear shell, and (ii) a neck portion having: (a) a neck housing assembly with a cover, and (b) a neck electronics assembly.
Figure 4:
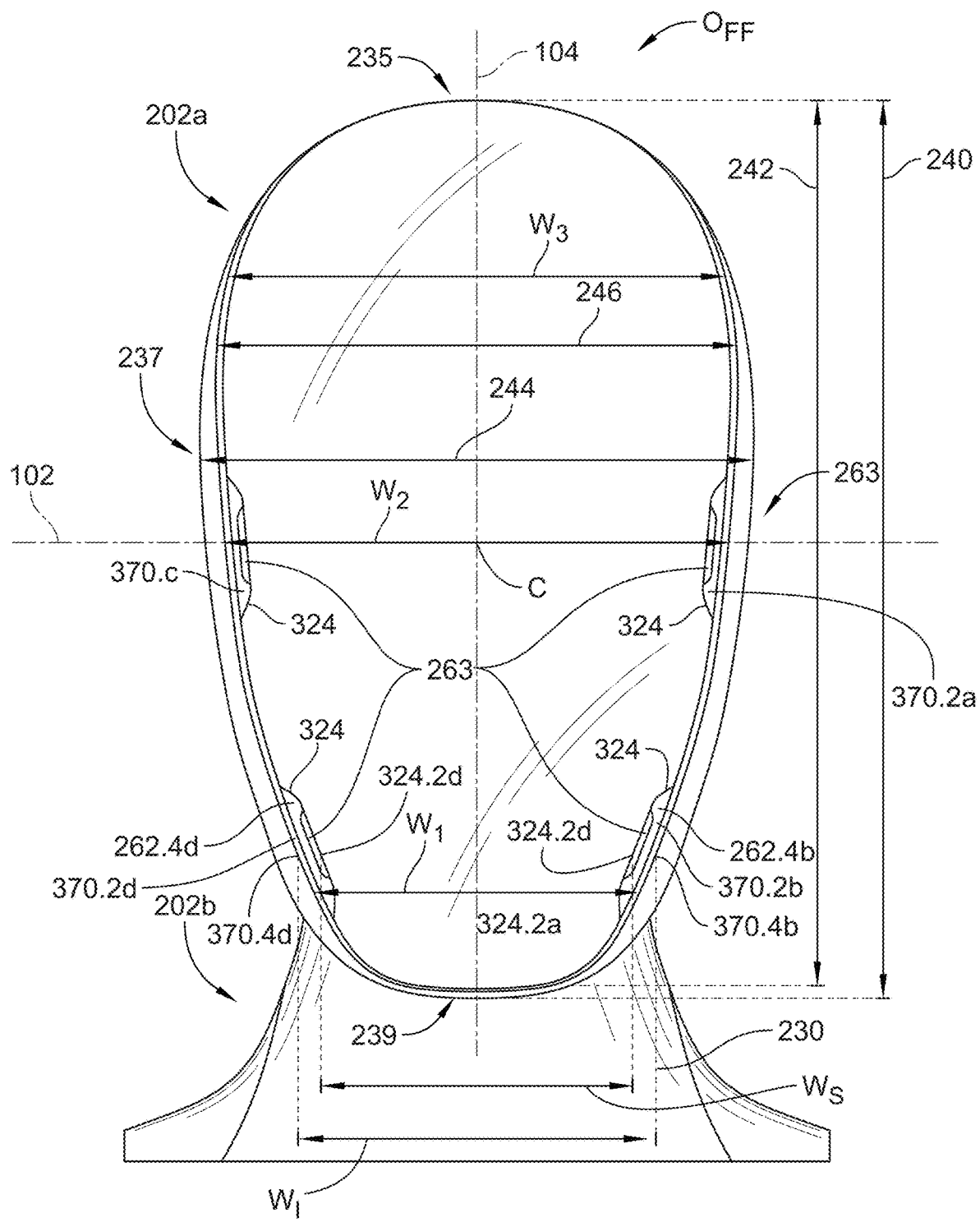
FIG. 4 is a front view of the head and neck assembly of FIG. 3 showing: (i) the frontal shell coupled to the rear shell, and (ii) a plurality of light emitters of the illumination assembly located at a junction between the frontal shell and the rear shell.
Figure 7:
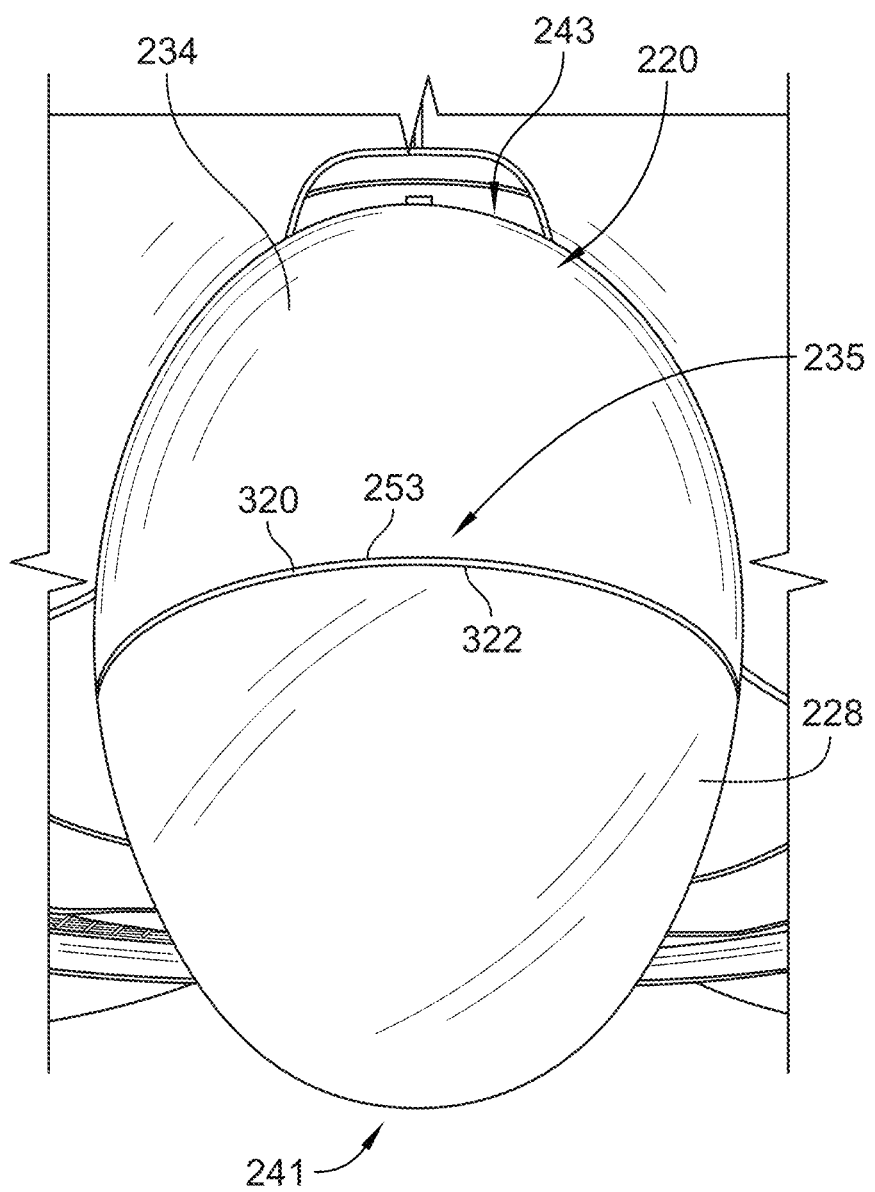
FIG. 7 is a top view of the head and neck assembly of FIG. 3.

As shown in FIGS. 1-9, the head portion 202a of the humanoid robot 100 has an exterior surface $S_E$ that provides said head portion 202a with an overall shape that is similar to the shape of a human head. This overall shape of the head portion 202a is primarily defined by a housing assembly 220, which includes: (i) a rear shell, rear head covering, second shell, or rear cover 234, and (ii) the frontal shell, frontal shield, frontal head covering, first shell, or frontal cover 228. In some embodiments, the head portion 202a is formed with no flat surfaces and is generally egg-shaped when viewed from the front, as shown in FIG. 4, and the top, as shown in FIG. 7. The head portion 202a of the humanoid robot 100 changes constantly in width from its top to its bottom, wherein the width of the head portion 202a increases from a top or scalp end 235 to a temple region 350, where the head portion 202a is at its widest. The temple region 350 generally corresponds to the eye level of a human, or is situated at a location that is approximately 30-50% of a height 240 of the head portion 202a as measured from the top end 235. The width of the head portion 202a then decreases from the temple region 350 to a lower or chin end 239. In this manner, the head portion 202a of the humanoid robot 100 is asymmetrical about a first plane 102 that passes through a center or centroid C of the head portion 202a and is parallel with the transverse plane, equidistant from the top end 235 and the lower end 239. The head portion 202a of the humanoid robot 100 is, however, symmetrical about a second plane 104 that is perpendicular to the first plane 102 passes through the center or centroid C of the head portion 202a, and is parallel with the sagittal plane. In other embodiments, it is conceivable that the head portion 202a may be symmetrical about the first plane 102 and asymmetrical about the second plane 104.

As shown in FIG. 4, the rear shell 234 of the housing assembly 220 has a maximum height 240, and the frontal shell 228 of the housing assembly 220 has a second height 242 that is less than the first height 240. The rear shell 234 also has a first maximum width 244, and the frontal shell 228 has a second width 246 that is less than the maximum width 244. The head portion 202a of the humanoid robot 100 has the overall maximum height 240 that is greater than the maximum width 244. The maximum height 240 and maximum width 244 of the head portion 202a are both provided by the rear shell 234. The maximum width 246 of the frontal shell 228 is located at a position that is above the location of the maximum width 244 of the head portion 202a.

As illustrated in FIG. 5, a depth of the head portion 202a of the humanoid robot 100 is defined by a combination of both the rear shell 234 and the frontal shell 228. This depth includes a maximum depth 250 at a location that is approximately equal to the temple region 350, and this maximum depth 250 extends between a front or facial region 241 of the head portion 202a to an occipital region 359 of the head portion 202a. The front end 241 of the head portion 202a is provided by the frontal shell 228, and the rear end 243 is provided by the rear shell 234. The depth of the head portion 202a changes constantly from the top end 235 to the lower end 239. Specifically, the depth increases from the top end 235 to the maximum depth 250 and then decreases from the maximum depth 250 to the lower end 239. The head portion 202a of the humanoid robot 100 is asymmetrical about a third plane 106 that extends through the center or centroid C of the head portion 202a, is perpendicular to the first plane 102, and is parallel with the coronal plane. The head portion 202a of the humanoid robot 100 is also asymmetrical about first plane 102. In other words, in this described embodiment, the head portion 202a of the humanoid robot 100 is only symmetrical about the second plane 104. The center C is defined as being spaced at equal distances from: (i) the top end 235 and the bottom end 239, (ii) the front end 241 and the rear end 243, and (iii) lateral sides 247, 249 of the head portion 202a. In other embodiments, the head portion 202a may be symmetrical about the first plane 102 and/or symmetrical about the third plane 106. Stated another way, other embodiments of the head portion 202a may be symmetrical about: (i) all planes 102, 104, and 106, (ii) two of the four planes 102, 104, and 106, (iii) one of the four planes 102, 104, and 106, or (iv) none of the planes 102, 104, and 106.

Exterior surfaces $S_E$ of the rear shell 234 and the frontal shell 228 are concave relative to: (i) the center C of the head portion 202a and/or (ii) the rear shell 234. The head portion 202a of the humanoid robot 100 may include a nape region 245 formed in the rear extent of the head portion 202a, positioned below the occipital region 359 and above the neck portion 202b. The nape region 245 may include an exterior surface that is convex relative to the center C of the head portion 202a. In some embodiments, the nape region 245 is the only region of the head portion 202a that has a convex surface relative to the center or centroid C of the head portion 202a.

Figure 14:
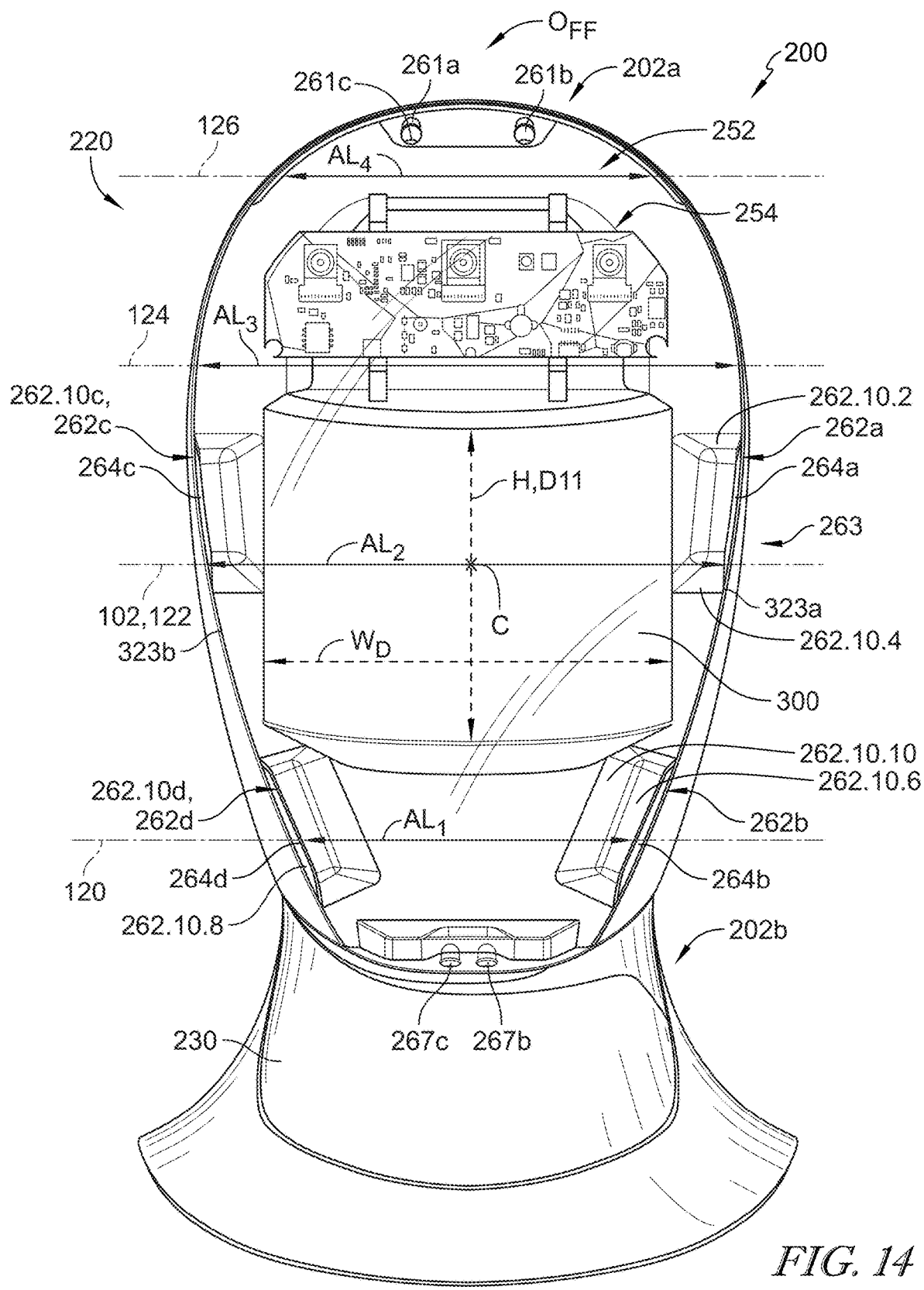
FIG. 14 is a front view of the head and neck assembly of FIG. 12 showing the head and neck assembly including: (i) the display, and (ii) a plurality of light emitters of the illumination assembly that are positioned to emit light on the lateral sides of the head and adjacent to a rear edge of the frontal shell.

When viewed from the front, as shown in FIGS. 4 and 14, (i) the lateral sides of the head portion 202a exhibit a first vertical curvature or middle curvature generally extending about the center or centroid C and from a third point 221.2 to a second point 221.4; (ii) the top extent 235 of the head portion 202a has a second vertical curvature or an upper curvature generally extending about the center or centroid C and from a second point 221.4 to a first point 221.6; and (iii) the bottom end 239 has a third curvature or lower curvature generally extending about the center or centroid C and from third point 221.2 to fourth point 221.8. The second curvature is less than, or has a lesser degree than, the first curvature. The second curvature or upper curvature is greater than, or has a greater degree than, the third curvature or the lower curvature. The first curvature or middle curvature is defined between third point 221.2 located at an upper extent of the buccal region 352 and the second point 221.4 located at a lower extent of the crown region 270 of the head portion 202a. The second curvature is primarily defined by the crown region 270, wherein said curvature extends from the second point 221.4 located at a lower extent of the crown region 270 and the first or top point 221.6 located at the apex of the housing assembly 220. The third curvature is defined between the third point 221.2 at the uppermost extent of the buccal region 352 and fourth point 221.8 at the lowermost extent of the buccal region 352. The head portion 202a has a substantially oval shape when viewed from above, as shown in FIG. 7, but may taper inwardly slightly in the frontal shell 228 towards the facial region 241 provided by this frontal shell 228.

2. Head Housing Assembly

The head housing assembly 220 of the head and neck assembly 202 is configured to contain and protect other assemblies that are housed within the head portion 202a. As discussed above, the housing assembly 220 is configured to have a form resembling the general shape of a human head and includes: (i) a frontal shell, frontal shield, frontal head covering, or frontal cover 228, (ii) a rear shell, rear head covering, or rear cover 234, (iii) an intermediate cover, intermediate support, or intermediate member 252, and (iv) an electronics support or frame 254. As discussed below, the intermediate cover 252 and the electronics support 254 may be combined into a single integrated structure. Additionally, in other embodiments, the intermediate cover 252 may be omitted, and the electronics support 254 may then be directly coupled to an extent of the rear shell 234. In further alternative embodiments, the electronics support 254 may be omitted, while the intermediate cover 252 is retained. Also, the rear shell 234 may be omitted or substantially omitted and effectively replaced by a substantially larger frontal shell 228. Finally, conversely, the frontal shell 228 may be omitted or substantially omitted and replaced by a substantially larger rear shell 234.

The intermediate cover 252 and the rear shell 234 are designed to mount to one another and together define a first head sub-volume 236 within the housing assembly 220. This first head sub-volume 236 is configured to contain and protect one or more components utilized in the operation of the humanoid robot 100, such as various electronics, batteries, computing components, and the like. The frontal shell 228 provides the front end of the housing assembly 220 and defines a second sub-volume 238, located between the intermediate cover 252 and the frontal shell 228, also within the housing assembly 220. This second sub-volume 238 is separated from the first sub-volume 236 by the intermediate cover 252 and is configured to contain and protect one or more components included in an electronics assembly 222, such as the display 300, light emitters 264.2a-264.2d, cameras, etc. Both The frontal shell 228 and/or the intermediate cover 252 can be removed from the rest of the housing assembly 220 to service components within the sub-volumes 236, 238 or to upgrade components located in these sub-volumes 236, 238. This modular design allows for individual components to be replaced without necessitating the replacement of the entire housing assembly 220.

i. Intermediate Cover

The intermediate cover 252 includes structures that are used to mount components of the electronics assembly 222 to the head portion 202a. The intermediate cover 252 is configured to couple with the rear shell 234 and is located between the first and second sub-volumes 236, 238 to separate these first and second sub-volumes 236, 238. In other words, the intermediate cover 252 is designed to split or divide the first sub-volume 236 from the second sub-volume 238. In alternative embodiments, the intermediate cover 252 may be omitted entirely, in which case the first and second sub-volumes 236, 238 may be converted into a single, larger sub-volume. Alternatively, the intermediate cover 252 may be combined or integrally formed with other structures disclosed herein (e.g., the electronics support 254, the rear shell 234, and/or the frontal shell 228), whereby the first and second sub-volumes 236, 238 may either remain distinct or may be combined into a single sub-volume depending on the specific integrated design. Further, it should be understood that other mounting structures, dividers, covers, and/or plates may be included within the head portion 202a to further sub-divide the housing assembly 220 into additional sub-volumes (e.g., potentially ranging from 3-10 sub-volumes).

The intermediate cover 252 has an outer perimeter 256 that is sized to fit within an inset rim 258 of the rear shell 234. In this manner, the outer perimeter 256 is slightly less than the inner perimeter of an extent of the rear shell 234 that is positioned between a ledge 257 and a forward edge 253 of an outer perimeter 259 of the rear shell 234. As such, the outer perimeter 256 of the intermediate cover 252 has a length that is less than the length of the outer perimeter 259 of the rear shell 234. In other embodiments, the outer perimeter 256 of the intermediate cover 252 may not be sized to fit within an inset rim 258 of the rear shell 234. Instead, said outer perimeter 256 of the intermediate cover 252 may be substantially equal to the outer perimeter 259 of the rear shell 234, wherein said intermediate cover 252 may be coupled to, positioned adjacent to, and/or abutting said forward edge 253 of the rear shell 234. In other words, a rear extent of the intermediate cover 252 may be configured to abut the forwardmost surface of said forward edge 253 of the rear shell 234. As such, the forward edge 253 of the second or rear shell 234 may not abut or may be positioned at a distance from the rear edge 322 of the first or frontal shell 228. In yet other embodiments, the outer perimeter 256 of the intermediate cover 252 may only extend along an extent that is less than substantially all, or even less than a majority (e.g., along only a minority), of the inner perimeter of an extent of the rear shell 234 that is positioned between a ledge 257 and a forward edge 253 of the outer perimeter 259.

The outer perimeter 256 of the intermediate cover 252 is also slightly less than an outer perimeter 260 of the frontal shell 228. As such, the outer perimeter 256 of the intermediate cover 252 has a length that is less than the length of the outer perimeter 260 of the frontal shell 228. In other embodiments, the outer perimeter 256 of the intermediate cover 252 may be substantially equal to the outer perimeter 260 of the frontal shell 228. In further alternative embodiments, the outer perimeter 256 of the intermediate cover 252 may only extend along an extent that is less than substantially all, or even less than a majority (e.g., along only a minority), of a rear edge 322 of the frontal shell 228.

The intermediate cover 252 further includes a plurality of peripheral protrusions 262a, 262b, 262c, 262d, which are spaced around the outer perimeter 256 of the intermediate cover 252. Said peripheral protrusions 262a, 262b, 262c, 262d form a plurality of light emitter housings 262.10a-262.10b. Specifically, each of these peripheral protrusions 262a, 262b, 262c, 262d is configured to house a respective light emitting assembly 264a, 264b, 264c, 264d of the illumination assembly 263. Said light emitter housings 262.10a-262.10b have five primary walls that are comprised of: (i) two end walls 262.10.2, 262.10.4, wherein said end walls 262.10.2, 262.10.4 are angled (e.g., at an obtuse angle) relative to a frontal surface $S_{IF}$ of the intermediate cover 252; (ii) a top wall 262.10.6; (iii) a bottom wall 262.10.8, wherein said bottom wall 262.10.8 is also angled relative to the frontal surface $S_{IF}$ of the intermediate cover 252; and (iv) an interior wall 262.10.10, wherein said interior wall 262.10.10 is angled (e.g., at an obtuse angle) relative to the frontal surface $S_{IF}$ of the intermediate cover 252. As shown in at least FIG. 13, this configuration provides a recess (or otherwise referred to as a groove) 220.4 in the head housing assembly 220, wherein the head housing assembly 220 includes: (i) a first shell 228 with a first point 228.10 located on an outer surface of the first shell 228, (ii) a second shell 234 with a second point located 234.10 on the outer surface outer surface of the second shell 234, and a third point 262.10.10.2 located on an exterior surface of the interior wall 262.10.10. And wherein the third point 262.10.10.2 is positioned closer to the centroid C of the head housing assembly 220 in comparison to both the first and second points 228.10, 234.10. The angled configuration of these two end walls 262.10.2, 262.10.4, the bottom wall 262.10.8, and the interior wall 262.10.10 is designed to achieve two objectives: (i) to effectively direct light out of the housings 262.10a-262.10b, and (ii) to ensure that the light emitted radiates through a diffuser or lens 264.4a-264.4d in a manner that does not let the light scatter too broadly, nor does it overly restrict the scattering of the light. In other embodiments, the walls 262.10.2, 262.10.4, 262.10.8, 262.10.10 may not be angled relative to the frontal surface $S_{IF}$ of the intermediate cover 252, the top wall 262.10.6 may be angled relative to the frontal surface $S_{IF}$ of the intermediate cover 252, and/or the angles between the walls 262.10.2, 262.10.4, 262.10.8, 262.10.10 and the frontal surface $S_{IF}$ of the intermediate cover 252 may be an acute angle instead of obtuse angle.

ii. Electronics Support

Figure 27:
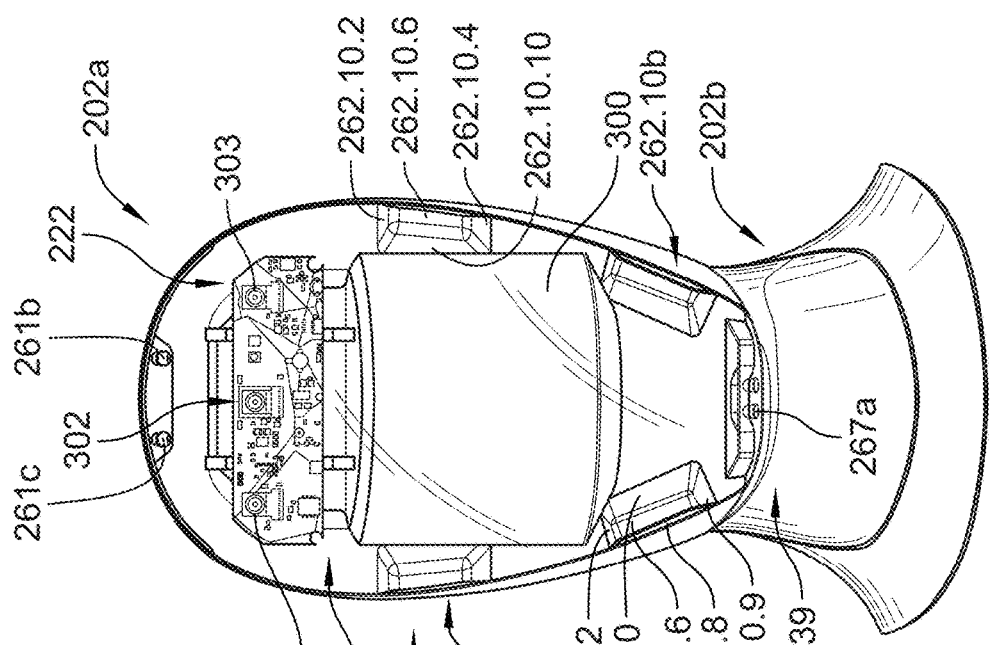
FIG. 27 is a front view of the head and neck assembly of FIG. 26.
Figure 26:
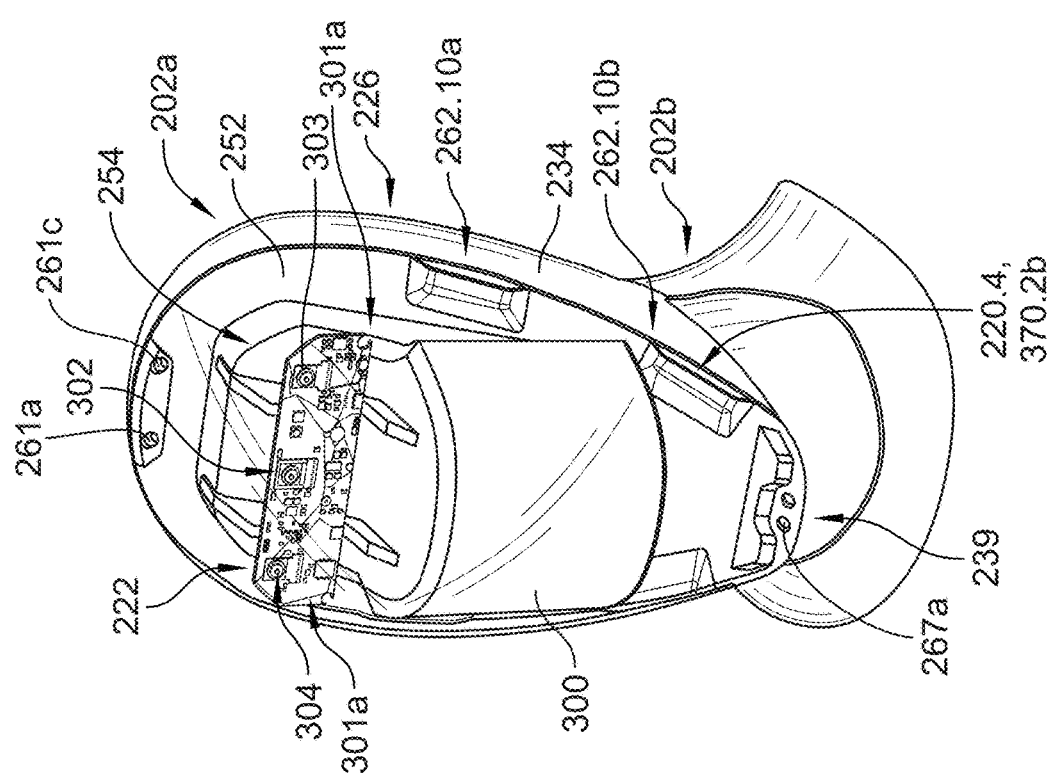
FIG. 26 is a perspective view of the head and neck assembly of FIG. 12, wherein the head electronics assembly includes a sensor assembly: (i) coupled to the electronics support, (ii) positioned above the display, and (iii) within the interior space formed between the intermediate cover and the frontal shell.
Figure 31B:
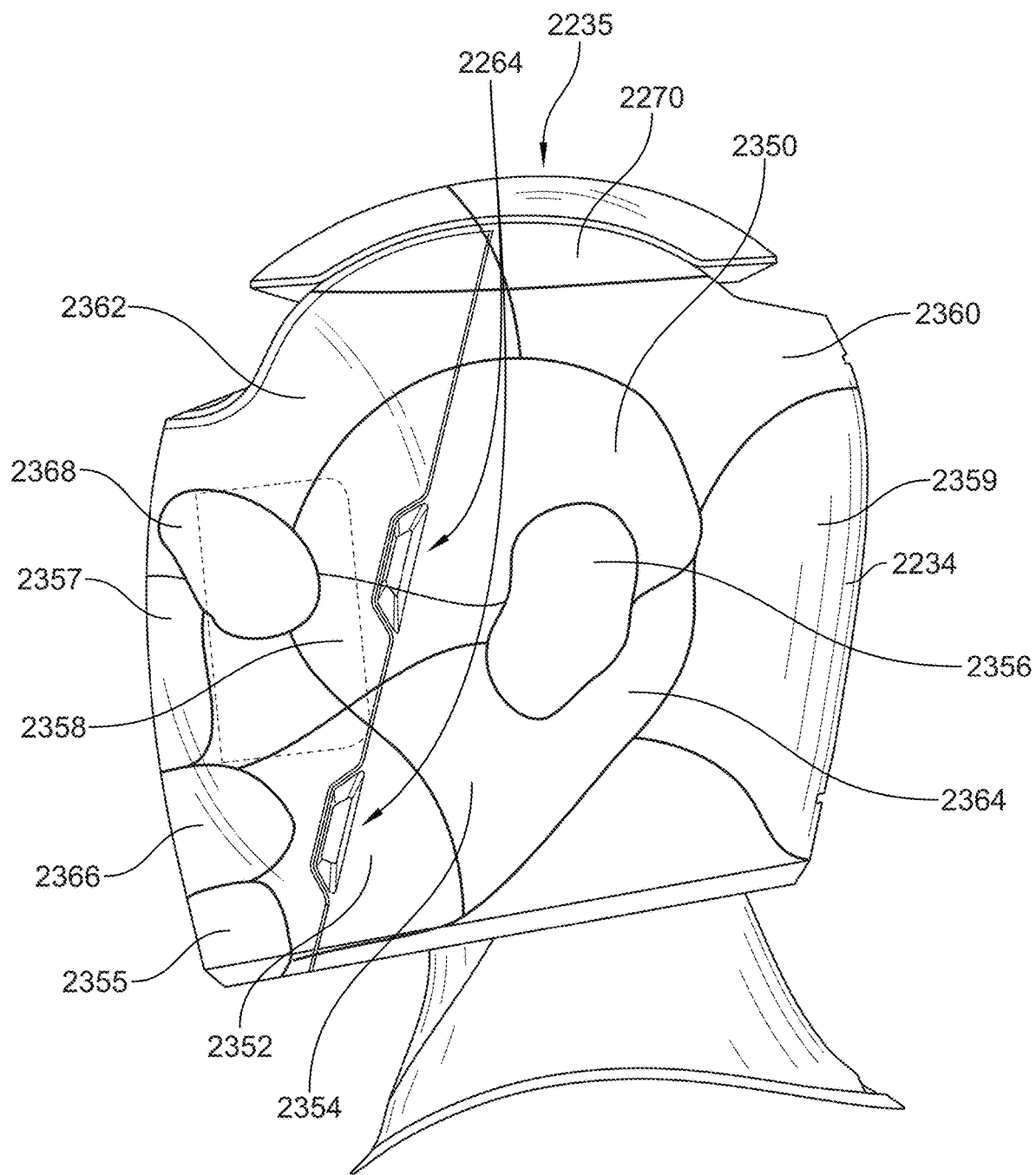
FIG. 31B is a side view of the head and neck assembly of FIG. 28 showing various anatomical regions of the head.
Figure 32:
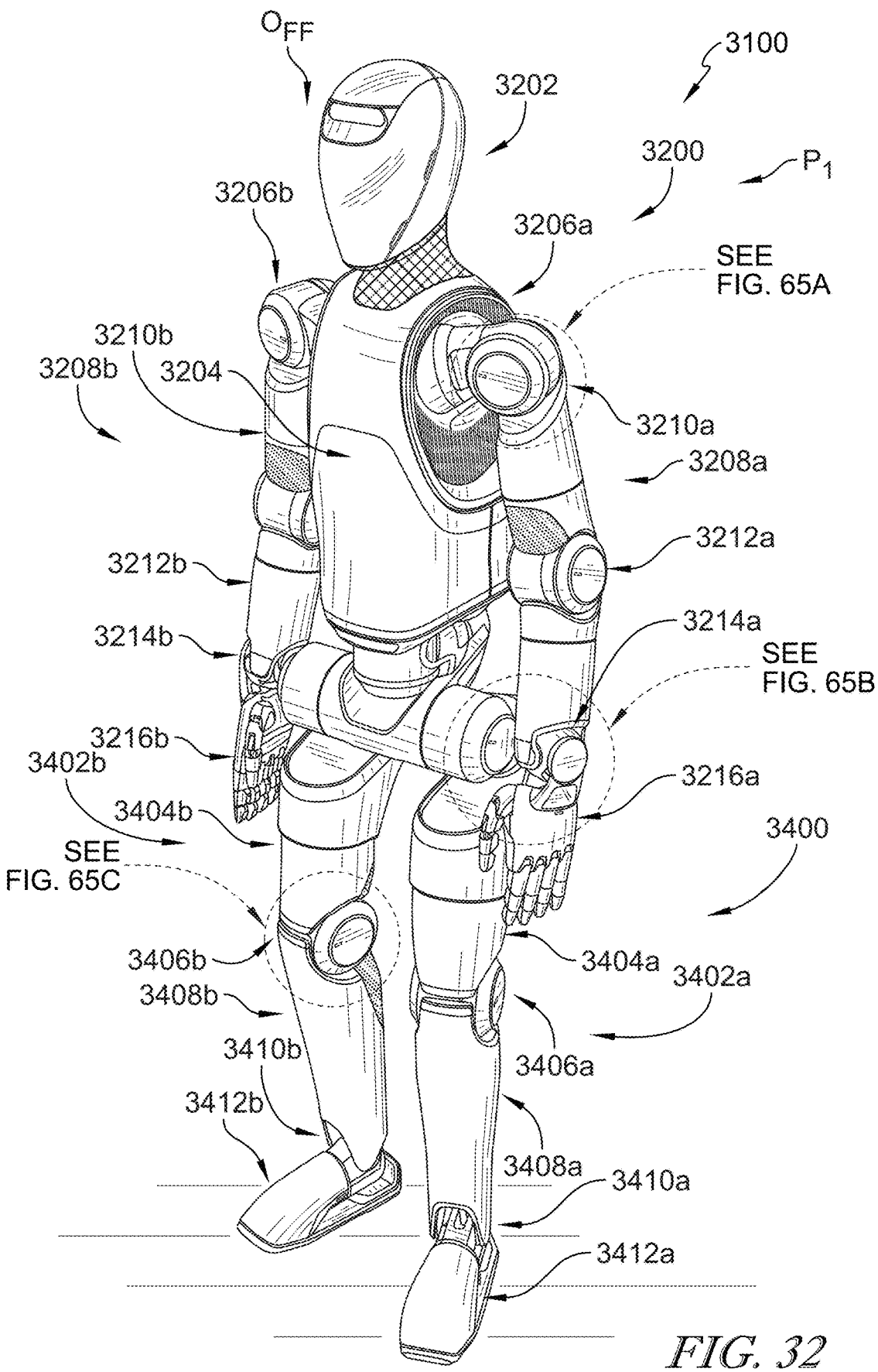
FIG. 32 is a perspective view of a third embodiment of head and neck assembly of the humanoid robot, wherein the head and neck assembly includes a deformable mesh covering internal structures and components of the neck assembly.

The electronics support 254 is mounted to a generally central area of the intermediate cover 252 and is configured to position the display 300, which is included in the electronics assembly 222, between the intermediate cover 252 and the frontal shell 228, specifically within the second head sub-volume 238. The electronics support 254 includes a base coupling 266 configured to mount to the intermediate cover 252, and a display coupling 268 configured to mount the display 300 to the electronics support 254. The base coupling 266 is located above and rearward of the display coupling 268. The display coupling 268 positions the display 300 in a spaced apart relation to the frontal shell 228, as clearly shown in FIG. 15. As shown in FIGS. 26 and 27, the intermediate cover 252 is configured to lie behind the electronics assembly 222 to locate at least a portion of the electronics assembly 222 between the intermediate cover 252 and the frontal shell 228.

iii. Frontal Shell

The frontal shell 228 is configured to cover at least the intermediate cover 252 and the electronics assembly 222, as shown in FIGS. 1-27. The frontal shell 228 forms a forwardmost, exterior surface of the head portion 202a and cooperates with the intermediate cover 252 to define the second sub-volume 238 within the housing assembly 220. The frontal shell 228 may be made from a transparent material so that the display 300, which is mounted on the electronics support 254, may be viewed therethrough. In other embodiments, the frontal shell 228 may be tinted or entirely opaque. The intermediate cover 252 can be similarly colored (tinted or opaque) so that the frontal shell 228 has a similar appearance to the intermediate cover 252, and so that lights or images displayed on the display 300 are the only items that are visible or displayed/conspicuous through the frontal shell 228. The frontal shell 228 may be coated, etched, or formed in with a plurality of layers (e.g., examples of which are disclosed within U.S. Pat. Nos. 8,770,749, 9,134,547, 9,383,594, 9,575,335, 9,910,297, all of which are incorporated herein by reference) in a manner that improves durability, increases sensor accuracy, filters one or more specific wavelengths of light, reduces glare, enhances overall appearance, reduces fogging, makes the frontal shell 228 easier to clean or protects it from cleaning products. Examples of such optical coatings include anti-reflection coatings, mirror coatings, hard coatings, anti-static coatings, anti-fog coatings, some of which are described within U.S. patent application Ser. Nos. 16/896,016, 16/698,775, 16/417,311, 16/126,983, 15/359,317, 15/515,966, each of which are incorporated herein by reference. Further, the material composition, shape, number of layers, and composition of said layers of the frontal shell 228 may be different from the material composition, shape, number of layers, and composition of said layers utilized within other parts of the frontal shell 228 itself. In other words, the composition, shape, number of layers, and composition of said layers may vary across different regions of the frontal shell 228. It should be understood that this disclosure is not limited to just the information that is disclosed within those specifically cited applications; but instead should encompass any compositions, shapes, layer numbers, and compositions of layers that are known in the art or are rendered obvious in light of what is currently known in the art.

The frontal shell 228, or an extent thereof, may have a substantially uniform thickness, which may be equal to or greater than 1 mm, and is preferably greater than 2 mm. Additionally, the frontal shell 228 may be optically correct and is typically not designed to be a corrective lens. As such, the frontal shell 228 has a dioptric power of less than 0.25 diopters, preferably less than 0.12 diopters, and most preferably less than 0.06 diopters. The frontal shell 228 may exhibit a reverse/negative pantoscopic tilt, a forward/positive pantoscopic tilt, or no pantoscopic tilt at all. Accordingly, the frontal shell 228 may be made from or may include materials such as polycarbonate (PC), acrylic (PMMA), trivex, nylon, gorilla glass (aluminosilicate glass), thermoplastic polyurethane (TPU), high-grade glass, cr-39, polyethylene terephthalate (PET), polystyrene, fused silica (quartz glass), borosilicate glass, polyurethane, cellulose acetate, polyvinyl chloride (PVC), cellulose acetate butyrate (CAB), polyvinyl butyral (PVB), optical-grade resin, sapphire glass, polyetherimide (PEI), Lexan, thermoset plastics, other anti-scratch coated plastics, or any other similar material that is known in the art.

In the illustrative embodiment shown in FIGS. 1-16, the frontal shell 228 is mounted to the intermediate cover 252 and/or the rear shell 234 along a shield interface 320, which is located at the outer perimeters 256, 260 of the rear shell 234 and the frontal shell 228. A rear facing edge 322 of the frontal shell 228 is configured to mount with: (i) the forward edge 253 of the rear shell 234, (ii) a frontal extent of the intermediate cover 252, and/or (iii) both, to form the shield interface 320. As shown in this embodiment, the shield interface 320 is not flat or planar. Instead, the shield interface 320 is irregular due to the fact that the rear edge 322 of the frontal shell 228 is formed to include a plurality of recesses 324. Each recess 324 is sized to receive a respective one of the peripheral protrusions 262a, 262b, 262c, 262d that are formed in the intermediate cover 252 and that house the respective light emitting assemblies 264a-264d. In some embodiments, the frontal shell 228 itself could include the peripheral protrusions 262a, 262b, 262c, 262d, although this configuration may not be desirable as the frontal shell 228 is the component that is most likely to be removed from the housing assembly 220 for servicing the head portion 202a and the electronics assembly 222.

Figure 5A:
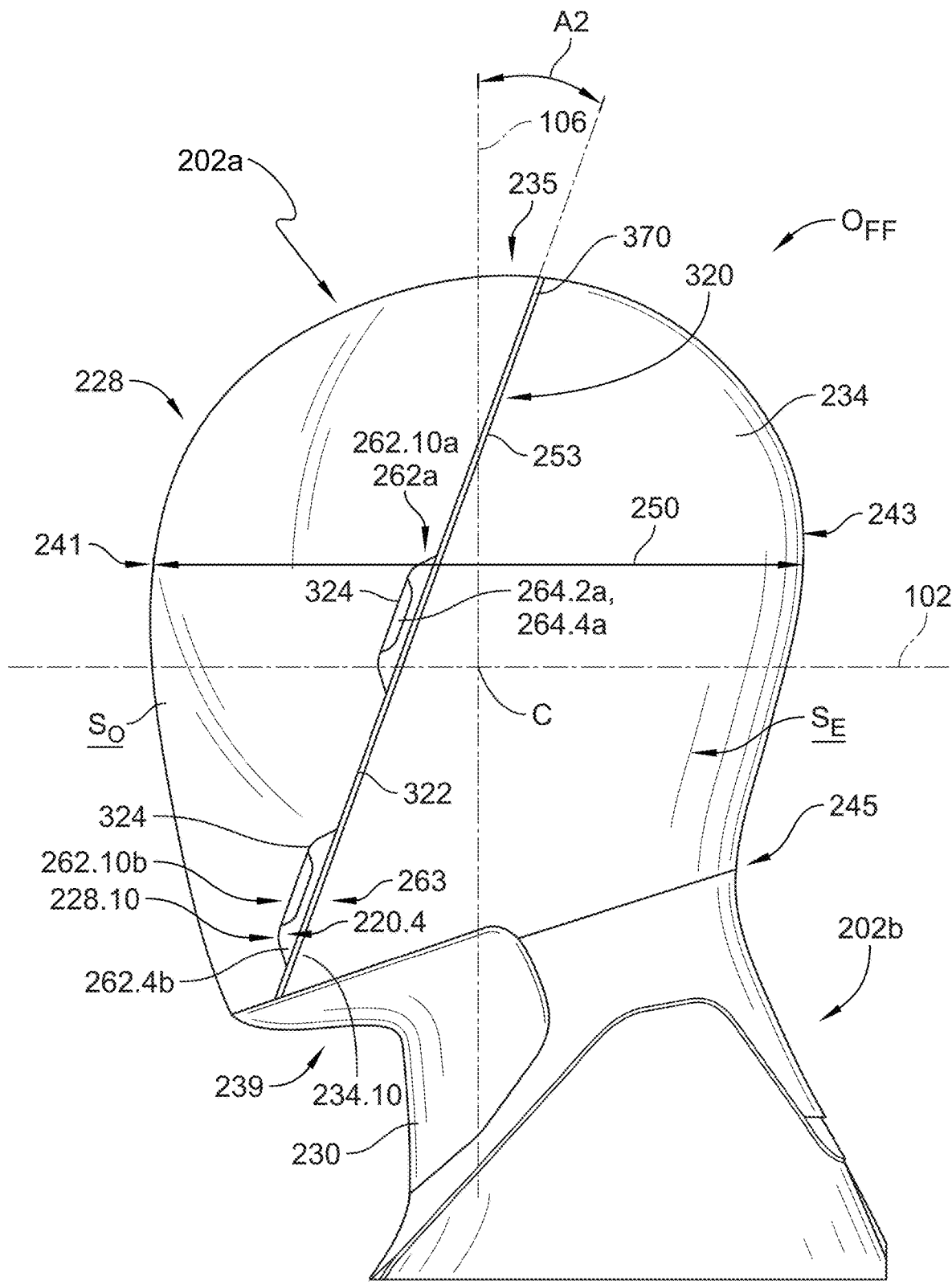
FIG. 5A is a side view of the head and neck assembly of FIG. 3.

Except for the aforementioned recesses 324, the rear facing edge 322 of the frontal shell 228 is substantially planar along the interface 320. The shield interface 320 between the intermediate cover 252 and the frontal shell 228, and thus the rear-facing edge 322, extends at an rear angle A2 relative to the third, vertical, plane 106, as shown in FIGS. 5, 15, 31, and 57. When the head portion 202a is in a forward facing orientation $O_{FF}$, this rear angle A2 is within a range of about 15 degrees to about 50 degrees, preferably between 20 and 40 degrees, most preferably between 25 and 35 degrees, and may be approximately 30 degrees. Additionally or alternatively, an obtuse angle may be formed between the rear facing edge 322 of the frontal shell 228 and a horizontal plane 102, and wherein an obtuse angle is obtuse between 90 degrees and 140 degrees, preferably 110 degrees, when the head portion 202a is in a forward facing orientation $O_{FF}$. This angular relationship provides the frontal shell 228 with a larger depth at a top end thereof, which serves to increase the volume of the second sub-volume 238 and thereby provide more room for components of the electronics assembly 222. An upper end of the frontal shell 228, near an upper extent of the head portion 202a, is located rearward of the third plane 106, while a lower end of the frontal shell 228, near a chin region 355, is located forward of the third plane 106, as depicted in FIG. 5A. There are no recesses formed in the frontal shell 228 in the orbital region 368, the nasal region 357, the oral region 366, or the frontal region 362. The frontal shell 228 extends upward from an extent of the rear shell 234 that is positioned in the chin region 355, continuing over a majority of the facial region 241, and into or beyond a frontal edge of the parietal region 360. The frontal shield 228 has an outer surface that occupies at least an orbital region 368 and a nasal region 357. Significantly, the orbital region 368 of the frontal shell 228 is not recessed in comparison to the nasal region 357 of the frontal shell 228.

The described depth change of the frontal shell 228 positions a first light emitting assembly 264a and a third light emitting assembly 264c above and rearward of a second light emitting assembly 264b and a fourth light emitting assembly 264d. Such an arrangement provides a greater viewing area for users to observe at least one light emitting assembly 264a-264d when they are positioned at different orientations relative to the humanoid robot 100. In other embodiments, the first and third light emitting assemblies 264a, 264c may not be positioned rearward of the second and/or fourth light emitting assemblies 264b, 264d. Instead, the second and/or fourth light emitting assemblies 264b, 264d may be positioned in the same vertical plane as the first and third, and/or may even be positioned rearward of the first and third light emitting assemblies 264a, 264c.

The frontal shell 228 may: (i) wrap from the front of the head portion 202a into the side regions of the head portion 202a, (ii) extend into the chin area region 355 or cover the entire chin area, (iii) may have a non-uniform rear edge 322, which is formed by the plurality of recesses 324. The plurality of recesses 324 may be configured to receive an extent of the peripheral protrusions 262a, 262b, 262c, 262d.

The frontal shell 228 may not extend to the crown region 270 of the head portion 202a and/or may not extend rearward past a location where a human's ears would typically be located. The disclosed frontal shell 228 may occupy between 25% and 50% of the surface area of the head portion 202a and may be curved in at least two directions (e.g., vertically and horizontally). In some embodiments, the frontal shell 228 and the display 300 may be integrated into a single component or may be formed from a plurality of interconnected components. It is also possible that The frontal shell 228 may have a different curvature than the display 300.

As shown in FIG. 14, the frontal shell 228 has in a forward facing orientation $O_{FF}$, at least: (i) a substantially horizontal first arc length $AL_1$ or chin arc length that extends from a first edge extent 323a of the rear edge 322 to a second edge extent 323b of the rear edge 322 at a first location or horizontal plane 120 and along an exterior surface of the frontal shell, (ii) a substantially horizontal second arc length $AL_2$ or a display arc length hat extends from a first edge extent 323a of the rear edge 322 to a second edge extent 323b of the rear edge 322 at a second location or horizontal plane 122, and along an exterior surface of the frontal shell, (iii) a substantially horizontal third arc length $AL_3$ or forehead arc length, or above the display arc length that extends from a first edge extent 323a of the rear edge 322 to a second edge extent 323b of the rear edge 322 at a third location or horizontal plane 124 and along an exterior surface of the frontal shell, and (iv) a substantially horizontal fourth arc length $AL_4$ or crown arc length that extends from a first edge extent 323a of the rear edge 322 to a second edge extent 323b of the rear edge 322 at a fourth location or horizontal plane 126 and along an exterior surface of the frontal shell.

The frontal shell 228 is concave relative to the display 300 at each of these locations 120, 122, 124, 126, such that the frontal shell 228 extends at least partially about the display 300. The first arc length $AL_1$ occurs at a position below the display 300. The second arc length $AL_2$ occurs at approximately the center C of the head portion 202a, is aligned with the display 300, and is greater in magnitude than the first arc length $AL_1$. The third arc length $AL_3$ occurs at a position above the display 300 and is greater in magnitude than the second arc length $AL_2$. The fourth arc length $AL_4$ occurs at a position above the third arc length $AL_3$, above the camera(s) 302, 303, 304, and also above the display 300, and is less in magnitude than both the second and third arc lengths $AL_2$, $AL_3$.

As shown in FIG. 4, the frontal shell 228 also has, at least: (i) a first width $W_1$ or lower frontal shell width that extends from a first edge extent 323a of the rear edge 322 to a second edge extent 323b of the rear edge 322 at a first location below the first horizontal plane 120; (ii) a second width $W_2$ or frontal shell centroid width that extends from a first edge extent 323a of the rear edge 322 to a second edge extent 323b of the rear edge 322 at a second location or at the horizontal plane 102 (which passes through the center C); and (iii) a third width $W_3$ or upper frontal shell width that extends from a first edge extent 323a of the rear edge 322 to a second edge extent 323b of the rear edge 322 at a third location above the first plane 102. The first width $W_1$ is less than both the second width $W_2$ and the third width $W_3$; the second width $W_2$ is greater than both the first width $W_1$ and the third width $W_3$; and the third width $W_3$ is greater than the first width $W_1$ but less than the second width $W_2$. The first width $W_1$ or lower frontal shell width is positioned below a display width $W_D$, and wherein the display width $W_D$ is greater than the frontal shell width $W_1$. The frontal shell centroid width $W_2$ and the upper frontal shell width $W_3$ is greater than the display width $W_D$. As best shown in FIG. 4, the frontal shell 228 also has a shell width $W_S$ that extends from a first shell point 324.2b positioned on the first edge extent 323a of the rear edge 322 to a second shell point 324.2d located on a second edge extent 323b of the rear edge 322. Wherein the first shell point 324.2b is positioned adjacent to a first region 370.2b and the second shell point 324.2d is positioned adjacent to the second region 370.2d, wherein a first lower light emitter 264.2b is configured to illuminate an extent of the first region 370.2b to an outermost point 370.4b of said region 370.2b and a second lower light emitter 264.2d is configured to illuminate an extent of the second region 370.2d to an outermost point 370.4d of said region 370.2d. Wherein an illumination width $W_I$ extends from outermost point 370.4b to the opposed outermost point 370.4d, and wherein the first shell $W_S$ is substantially colinear with the illumination width $W_I$, said first shell width $W_S$ is less than the illumination width $W_I$.

iv. Rear Shell

Figure 5B:
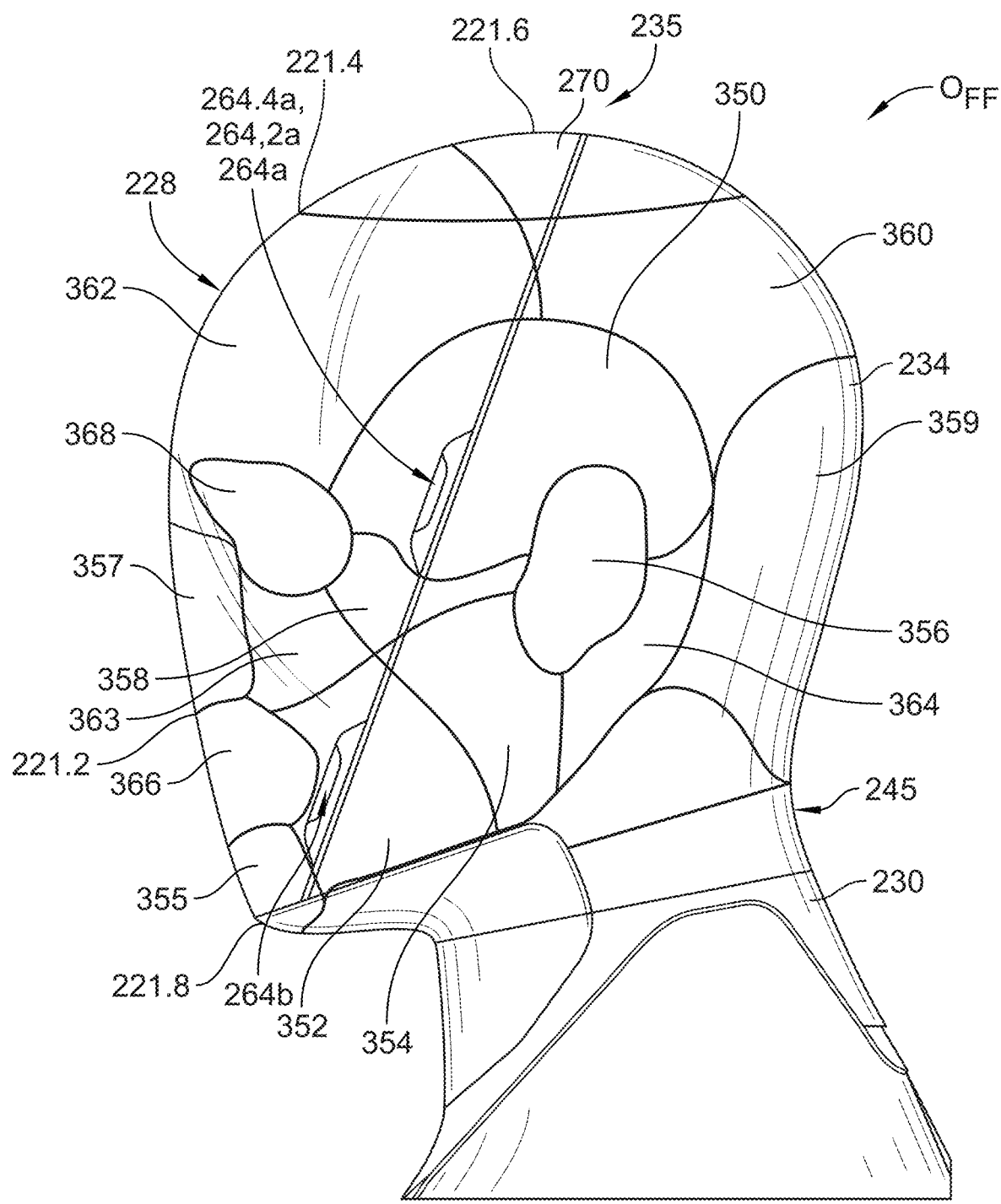
FIG. 5B is a side view of the head and neck assembly of FIG. 3 showing various anatomical regions of the head.
Figure 6:
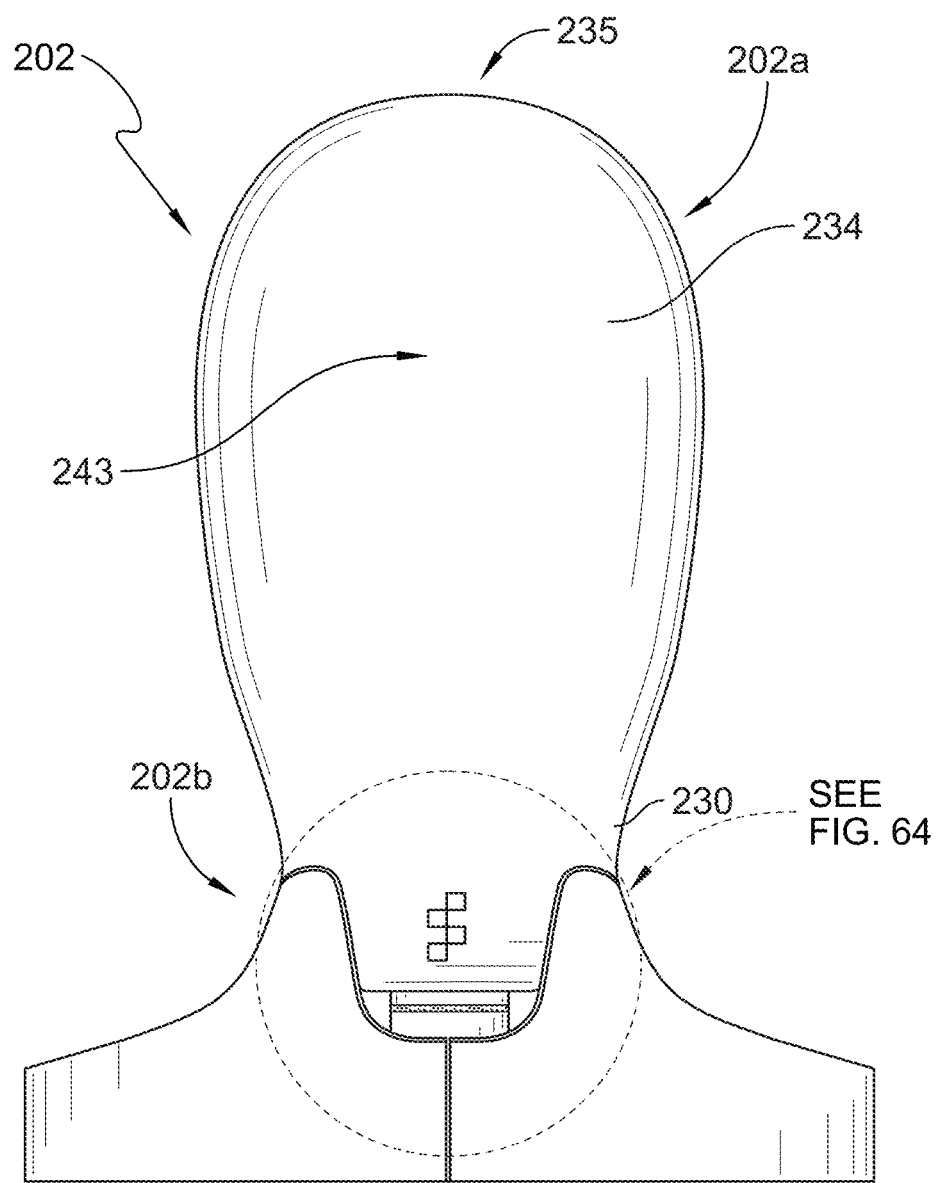
FIG. 6 is a rear view of the head and neck assembly of FIG. 3.
Figure 15A:
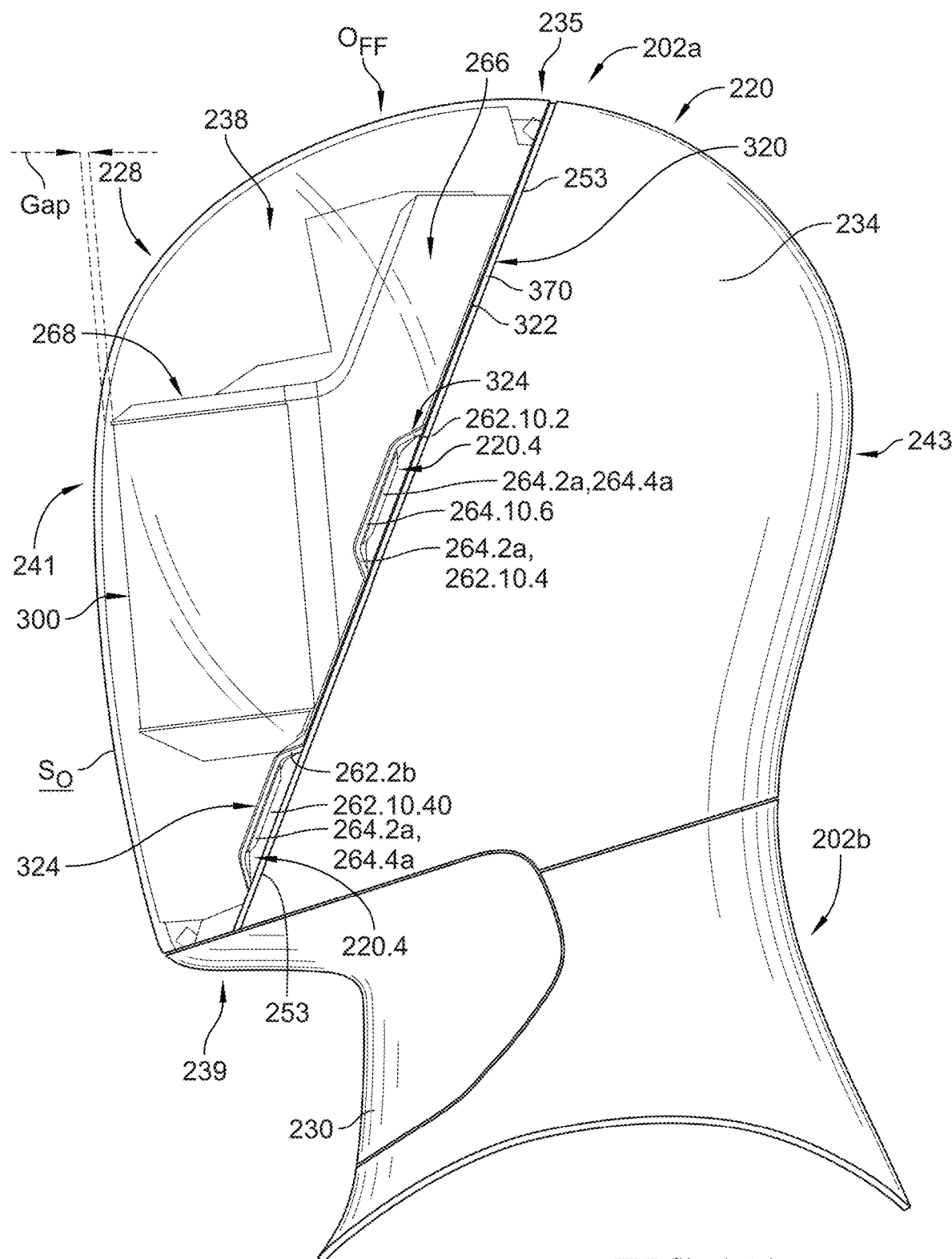
FIG. 15A is a side view of the head and neck assembly of FIG. 12.
Figure 15B:
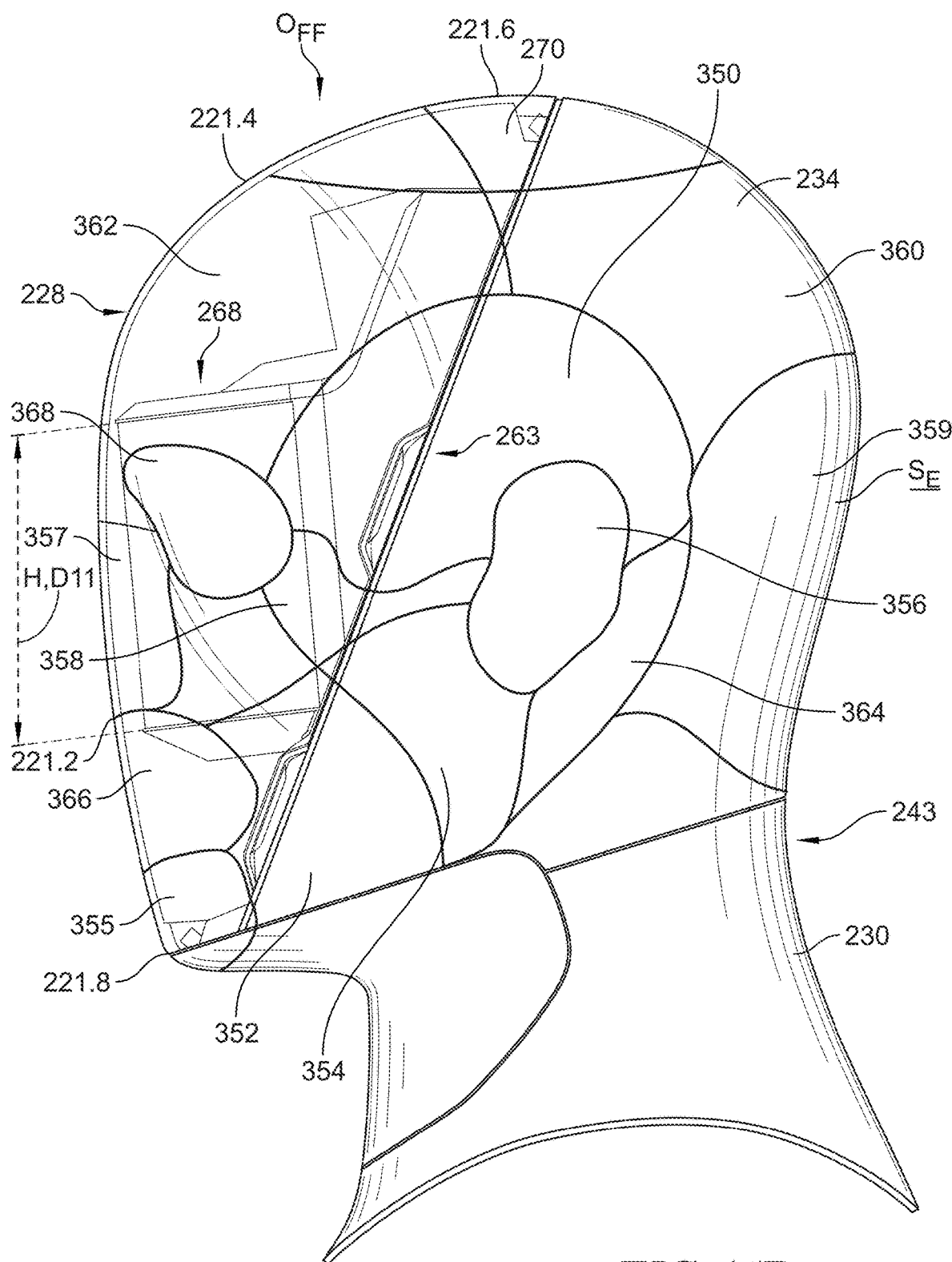
FIG. 15B is a side view of the head and neck assembly of FIG. 12 showing various anatomical regions of the head.

The rear shell 234 is shaped to resemble the curvature of a rear and sides of a human head, or at least portions of a parietal region 360, an occipital region 359, a temporal region 350, an auricular region 356, a zygomatic region 358, a mastoid region 364, a buccal region 352, and a parotid region 354. As shown in FIGS. 5B and 15B, the interface region 320 between the rear shell 234 and the frontal shell 228 passes through the buccal region 352, the parotid region 354, the zygomatic region 358, the temporal region 350, the parietal region 360, and the crown region 270. In other words, the rear shell 234 begins at the parotid region 354, the zygomatic region 358, the temporal region 350, the parietal region 360, and the crown region 270 and forms all portions of the head portion 202a rearward thereof. Likewise, the frontal shell 228 begins at the parotid region 354, the zygomatic region 358, the temporal region 350, the parietal region 360, and the crown region 270 and forms all portions of the head portion 202a forward thereof except for a chin region 355 which is included as part of the rear shell 234. Accordingly, a majority of the rear or second shell 234 is positioned rearward of the front or first shell 228 when the head and neck assembly 202 are in a forward facing orientation $O_{FF}$. Also, it should be understood that in some variations, the frontal shell 228 may only be positioned forward of the auricular region 356.

The rear shell 234 is configured to cover a rear portion of the electronics assembly 222 and to form the rear end of the head portion 202a. The rear shell 234 extends downward from a top central position and also forward at an angle that is substantially similar to that of the rear facing edge 322 of the frontal shell 228. The rear shell 234 includes a forward facing edge 298 that is configured to mate with the rear facing edge 322 of the frontal shell 228 and/or with the intermediate cover 252.

Figure 16:
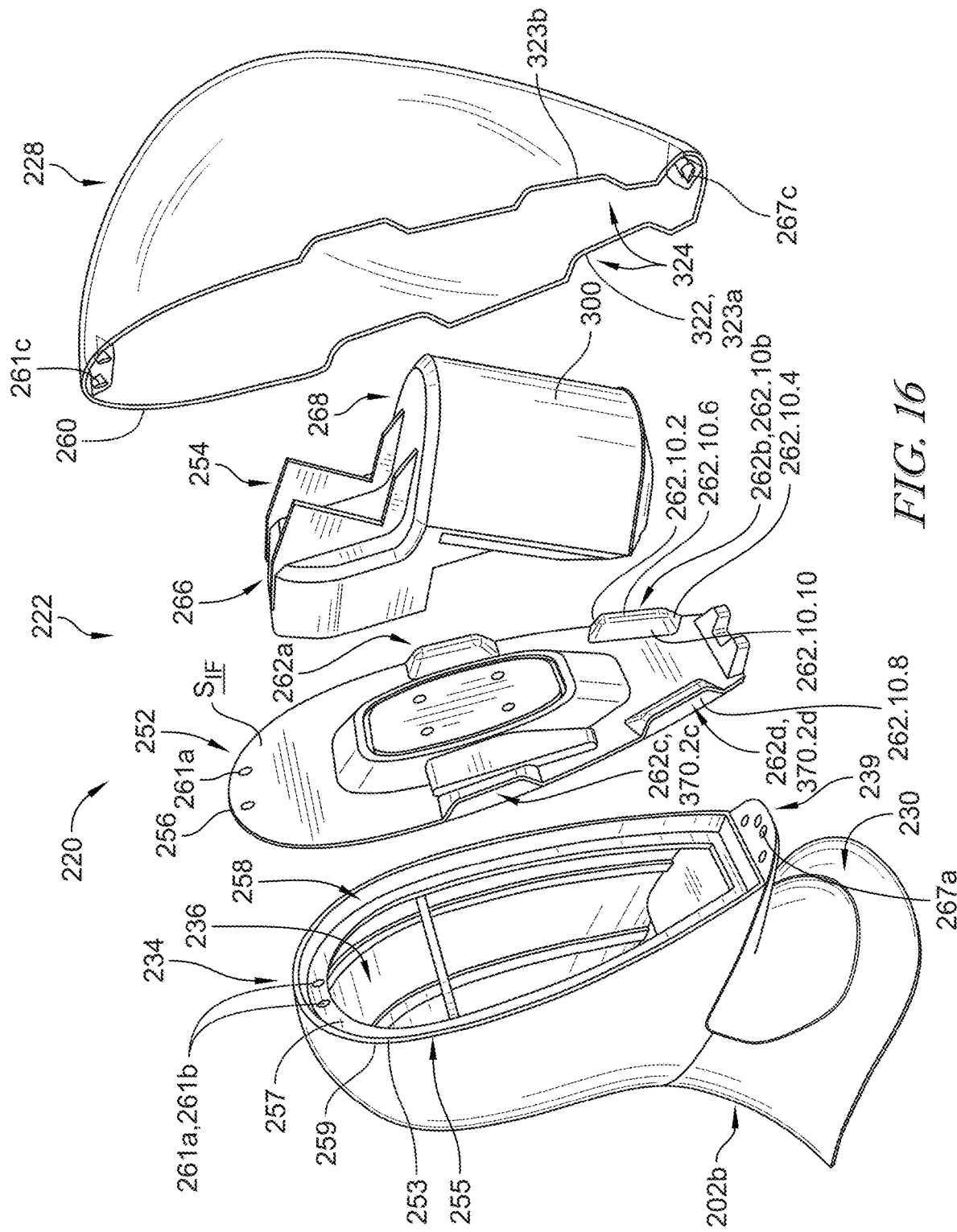
FIG. 16 is an exploded assembly view of the head and neck assembly of FIG. 12 wherein: (i) the head housing assembly includes an electronics support and an intermediate cover, (ii) the display is coupled to the electronic support, and (iii) the light emitters of the illumination assembly are coupled to the intermediate cover.
Figure 18:
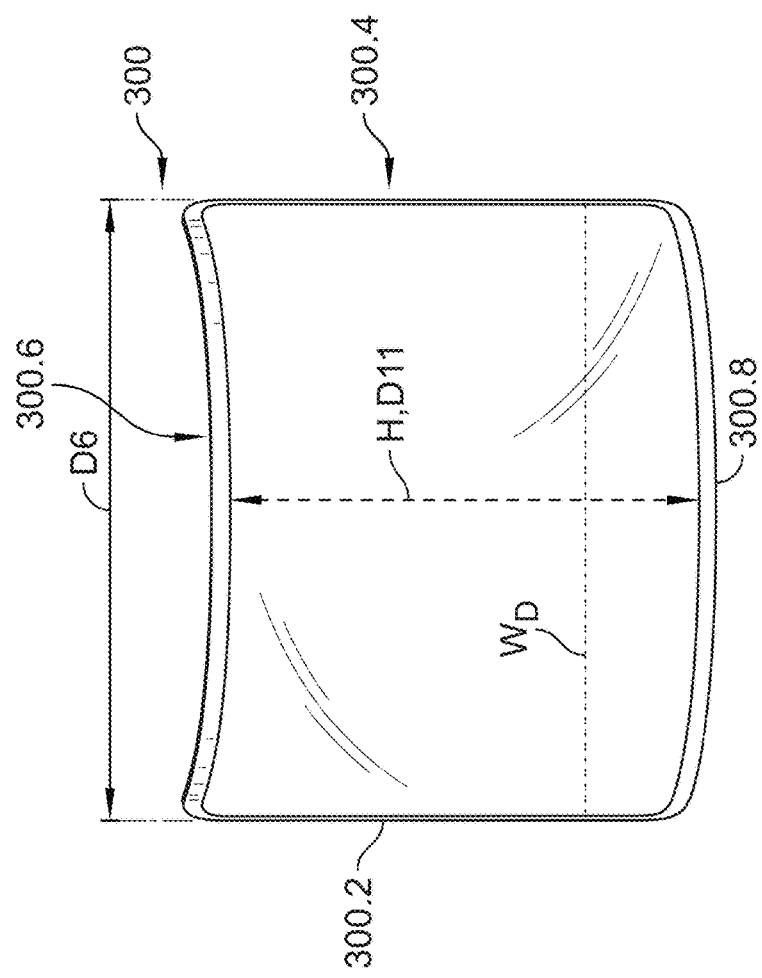
FIG. 18 is a front view of the display of FIG. 12.
Figure 17:
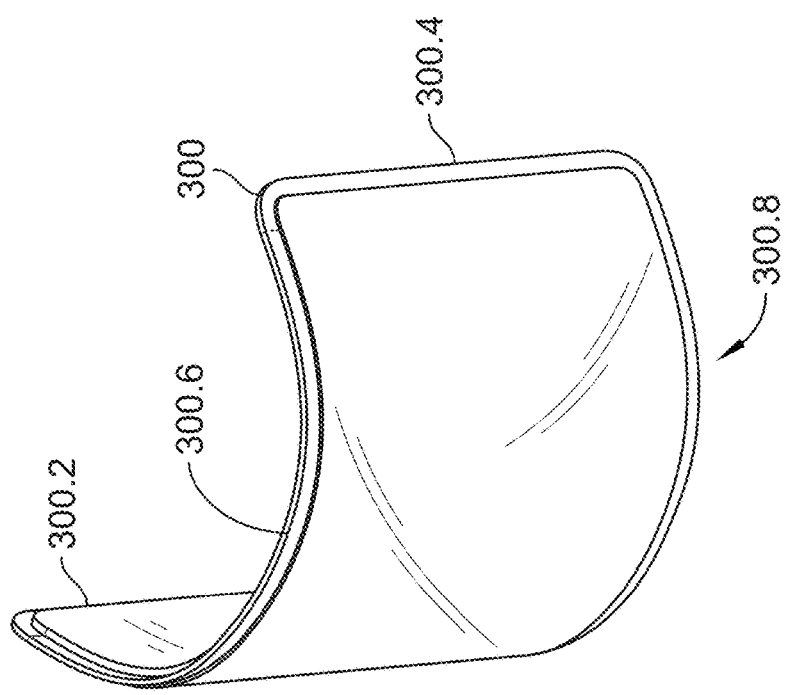
FIG. 17 is a perspective view of the display of FIG. 12.

As shown in FIG. 16, the rear shell 234 has an outer rim 255 and a ledge 257 that projects inwardly from this outer rim 255 and is located within the first sub-volume 236. The rim 255 may have a slightly larger outer perimeter 259 than the outer perimeter 256 of the intermediate cover 252; this sizing allows the intermediate cover 252 to fit snugly within the rim 255 and engage the ledge 257. Both the ledge 257 and the intermediate cover 252 have corresponding attachment holes 261a, 261b that are designed to receive a fastener to securely mount the intermediate cover 252 to the rear shell 234. Apertures 261c, which are formed in the frontal shell 228, also receive a fastener to mount the frontal shell 228 to both the intermediate cover 252 and the rear shell 234.

The rear shell 234 further includes a chin projection region 269 that extends forward from the rim 255 and defines a lower end of the rear shell 234. The intermediate cover 252 further includes a lower mount 265 that engages and rests upon this chin projection region 269. The chin projection region 269 and the lower mount 265 each include corresponding attachment holes 267a, 267b that receive a fastener to secure the intermediate cover 252 to the rear shell 234 at a lower end thereof. Apertures 267c, formed in the frontal shell 228, also receive a fastener to mount the frontal shell 228 to both the intermediate cover 252 and the rear shell 234 at this lower junction.

The rear shell 234 may be fabricated from a variety of materials, including but not limited to: silicone elastomers, thermoplastic polyurethane (TPU), shape-memory polymers (SMPS), polydimethylsiloxane (PDMS), polyurethane, liquid silicone rubber (LSR), urethane rubber, vinyl (PVC) skin, soft thermoplastic elastomers (TPE), elastomeric alloys, acrylonitrile butadiene styrene (ABS) blends, high-density polyethylene (HDPE) blends, conductive polymers, carbon nanotube-infused elastomers, magnetic shape-memory alloys, electroactive polymers (EAPS), styrene-butadiene rubber (SBR), thermoplastic vulcanizates (TPV), polyurea elastomers, medical-grade synthetic skin materials, thermoplastic olefins (TPO), fluoroelastomers, chloroprene rubber, ethylene propylene diene monomer (EPDM) rubber, polyacrylamide hydrogels, polycaprolactone (PCL), photo-curable resins, elastomeric composites, phosphorescent elastomers, thermochromic materials, electrostrictive polymers, piezoelectric polymers, superelastic alloys, microcellular foams, hyperelastic materials, viscoelastic gels, nanocomposite elastomers, fabrics, metal, other similar plastics or polymers, any combination of the above, and/or any other similar material known in the art. The rear shell 234 may be manufactured using any known method, including techniques such as: molding (e.g., injection molding or dip molding), casting, 3D printing (additive manufacturing), dip molding and subsequent coating, spray coating, lamination and layering, electrospinning, sculpting and machining, thermoforming, any combination of these methods, and/or any other known manufacturing method.

3. Electronics Assembly

The electronics assembly 222, which is contained within the head portion 202a, may include one or more of the following components: (i) a sensor assembly 301a, (ii) the display 300, (iii) a directional microphone, (iv) one or more speakers, (v) antennas, (vi) the illumination assembly that includes at least one, and preferably a plurality of, light emitting assemblies 264a-264d, (vii) a data storage device, and (viii) other miscellaneous electronics (e.g., an Inertial Measurement Unit (IMU), an RFID reader, location sensors (such as Global Positioning System ("GPS"), GLONASS, Galileo, QZSS, and/or iBeacon technology), etc.), and/or Printed Circuit Boards (PCBs) for connecting these various electronic components. The data storage device may be a removable memory device or may be integrated within a computing device that comprises a processor and associated memory. In some examples, the data storage device may be housed in another portion of the humanoid robot 100, such as within the torso 204. In some examples, the data storage device may be configured to store data that is collected from other components of the humanoid robot 100.

As shown in at least FIGS. 19-20, the components of the electronics assembly 222 may be mounted to the electronics support 254 and located above the display 300; alternatively, they may be mounted to an internal mounting frame that supports the head and neck assembly 202 on the torso 204, or to any other suitable structure within the head and neck assembly 202. Mounting the electronics assembly 222 to the electronics support 254 above the display 300 and within the second sub-volume 238 may allow for the individual items to be arranged in a space-saving manner and may leave other areas of the head and neck assembly open for the storage of other components that do not require direct access to areas outside of the humanoid robot 100, such as sensors, cameras, displays, etc. As noted previously, the housing assembly 220 is configured to enclose the electronics assembly 222 without interfering with the transmission or reception of signals. For example, the housing assembly 220 does not obscure the line of sight of the sensors.

i. Display

As best shown in FIGS. 17-25, the display 300 of the electronics assembly 222 may be mounted to the electronics support 254 and positioned behind the frontal shell 228. The display 300 is operatively connected to at least one processor to generate and display status messages and other types of information on the display 300. For example, the display 300 may display information: (i) related to the robot's operational state (e.g., working, error, moving, etc.); (ii) obtained from sensors contained within the head portion 202a, or (iii) received from other processors that are in communication with the display 300 (e.g., other internal processors housed within the humanoid robot 100 or external information transmitted to and received by the humanoid robot 100)). The information may be displayed in the format of blocks, well-known shapes, logos, or other moving items (e.g., animated thought bubbles). However, as stated before, the information may not be displayed in connection with human facial features (e.g., eyes, mouth, nose).

As shown in FIGS. 17-25, the display 300 may have a substantially rectangular display surface that has a convex curvature that conforms with the curvature of the frontal shell 228 of the housing assembly 220. The display 300 has a first or left substantially vertical edge 300.2 and a second or right substantially vertical edge 300.4 when the head is in the forward facing orientation $O_{FF}$, and wherein said display 300 also includes a display width $W_D$ that extends between the first or left substantially vertical edge 300.2 and the second or right substantially vertical edge 300.4. The display width $W_D$ is greater than the first width $W_1$ or lower frontal shell width, but is less than the frontal shell centroid width $W_2$ and the upper frontal shell width $W_3$. The display 300 also includes an upper edge 300.6 and a lower edge 300.8, wherein the display 300 has a constant: (i) height H between the upper edge 300.6 and the lower edge 300.8 across the display width $W_D$, and (ii) a constant arc length between the upper edge 300.6 and the lower edge 300.8.

The display 300 may also be slightly tilted downward. For example, the display 300 may be tilted from a horizontal plane at an angle of about 5.7 degrees to about 8.6 degrees, or more specifically, about 6.4 degrees to about 7.9 degrees. This tilted orientation of the display 300 increases viewability for an observer and helps to eliminate unwanted reflections. The display 300 may use any known display technology or feature including, but not limited to: LCD, LED, OLED, LPD, IMOD, QDLED, mLED, AMOLED, SED, FED, plasma, electronic paper or EPD, MicroLED, quantum dot display, LED backlit LEC, WLCD, OLCD, transparent OLED, PMOLED, capacitive touchdisplay, resistive touchdisplay, monochrome, color, or any combination of the above, or any other known technology or display feature. The displays disclosed herein meet the standards described in FDA CFR Title 21 part 1040.10, titled Performance standards for Light-Emitting Products, and ANSI LIA Z136.1, titled Safe Use of Lasers, at the time of filing this application, both of which are incorporated herein by reference.

It should be understood that this application contemplates the use of displays 300 that have different sizes. To this end, the display 300 may extend between any two of the horizontal lines shown in FIGS. 22 and 23. For example, the display 300 may extend from the third line from the bottom to the third line from the top in these figures. In other examples, the display 300 may be sized to fit between any two of the lines shown in FIGS. 24 and 25. Additionally, each of the lines indicated on the display 300 in FIGS. 22-24 can represent different zones or segments included in the display 300, which can be used to convey different images or other visual representations across the surface of the display 300. As an example, the sides of the display 300 can be used to display a different image or visual representation compared to a front portion of the display 300. Alternative display sizes may be used for various reasons, such as: (i) to reduce the surface area of fragile elements within the humanoid robot 100, (ii) because the humanoid robot 100 is not primarily designed to work in close proximity to humans, (iii) because additional area within the head portion 202a is needed for sensors or other electronics, or (iv) for any other reason that would be known or apparent to one of skill in the art.

Figure 50:
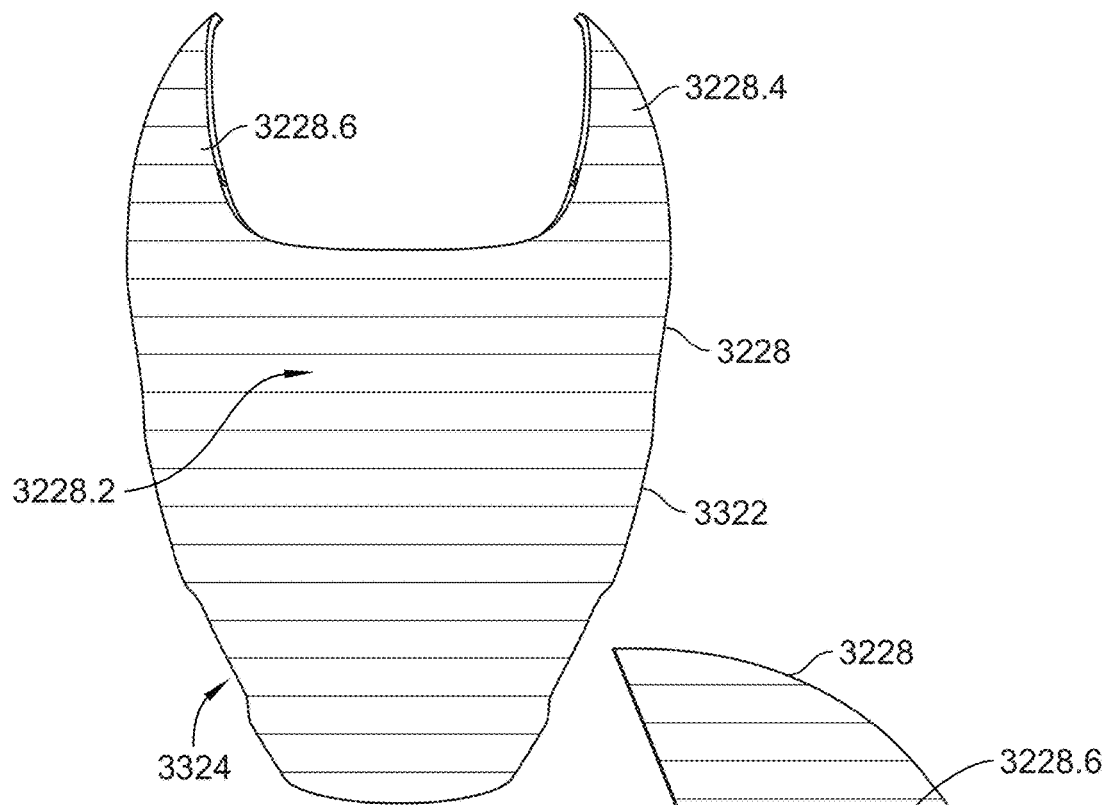
FIG. 50 is a front view of the frontal shell with a plurality of zones in a horizontal arrangement relative to one another.
Figure 51:
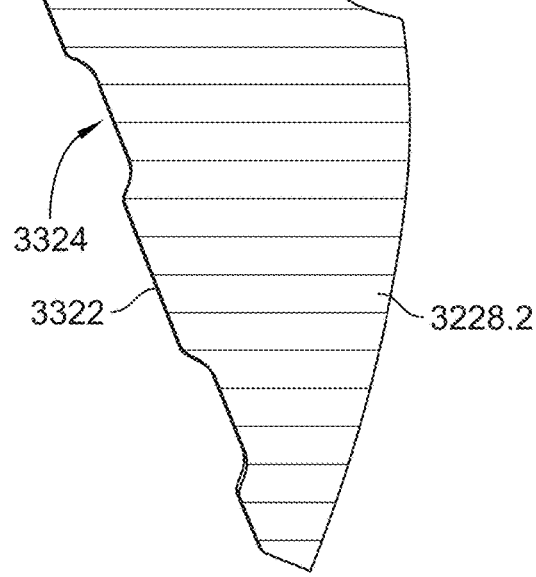
FIG. 51 is a side view of the frontal shell of FIG. 50.
Figure 52:
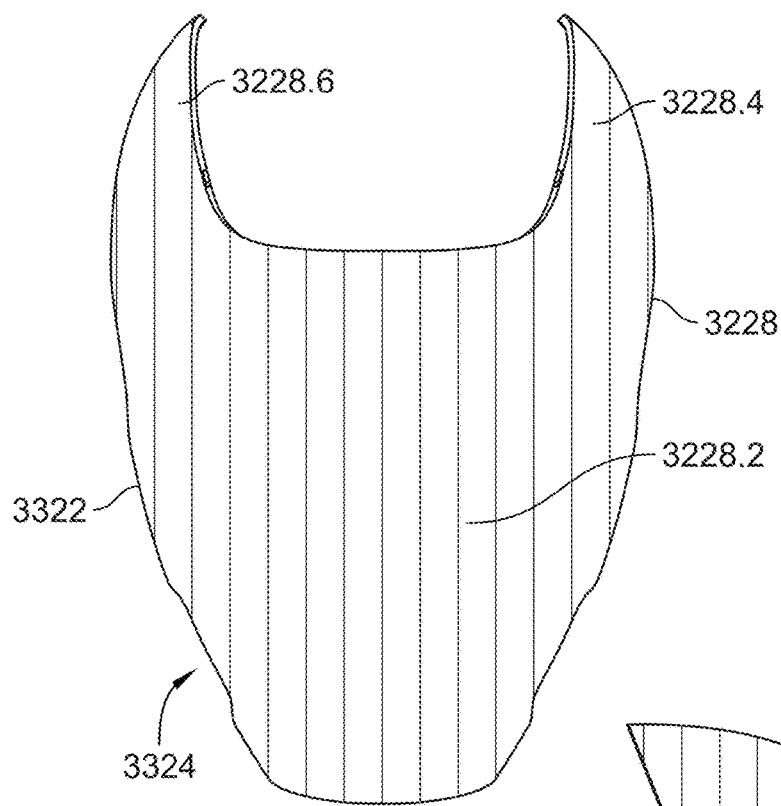
FIG. 52 is a front view of the frontal shell with a plurality of zones in a vertical arrangement relative to one another.
Figure 53:
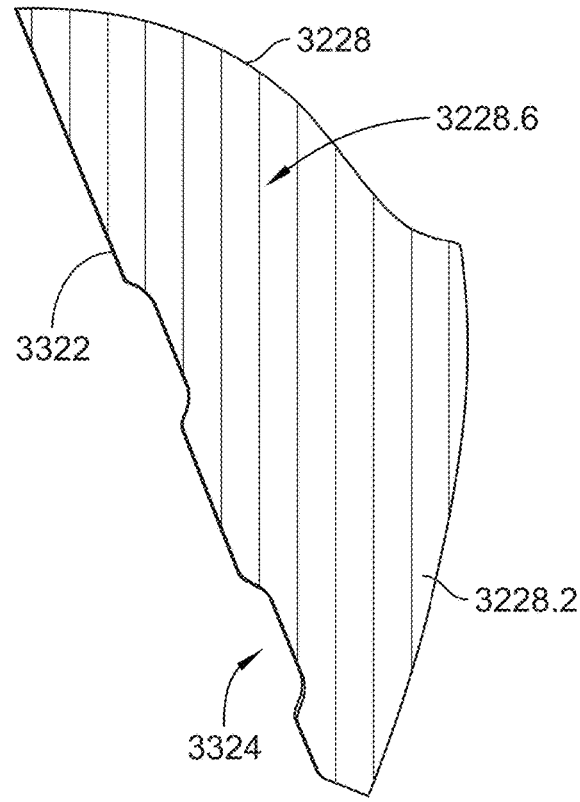
FIG. 53 is a side view of the frontal shell of FIG. 52.
Figure 54:
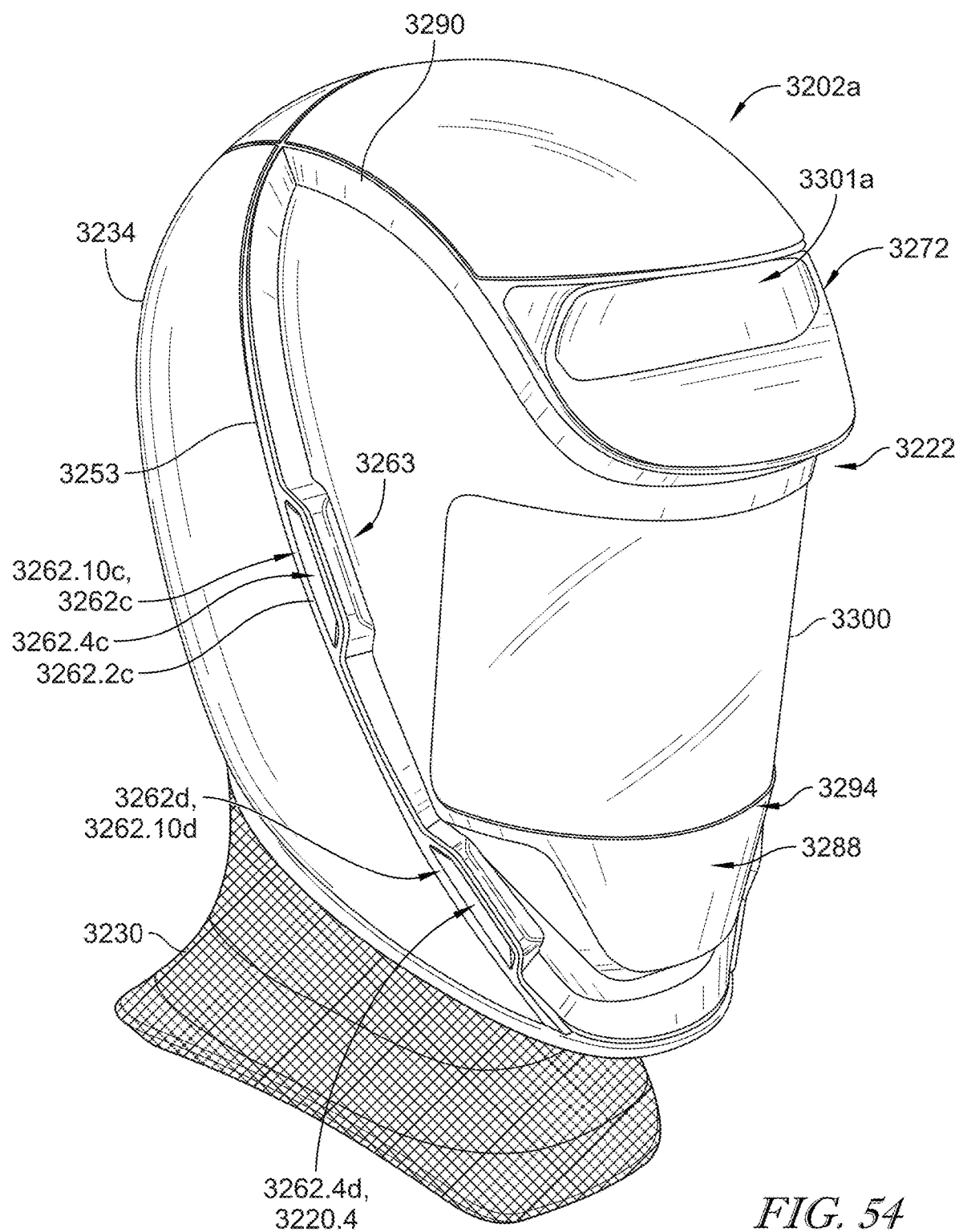
FIG. 54 is a perspective view of the third embodiment of the head and neck assembly wherein the frontal shell is omitted from the housing assembly to further show the display positioned within said head assembly.
Figure 55:
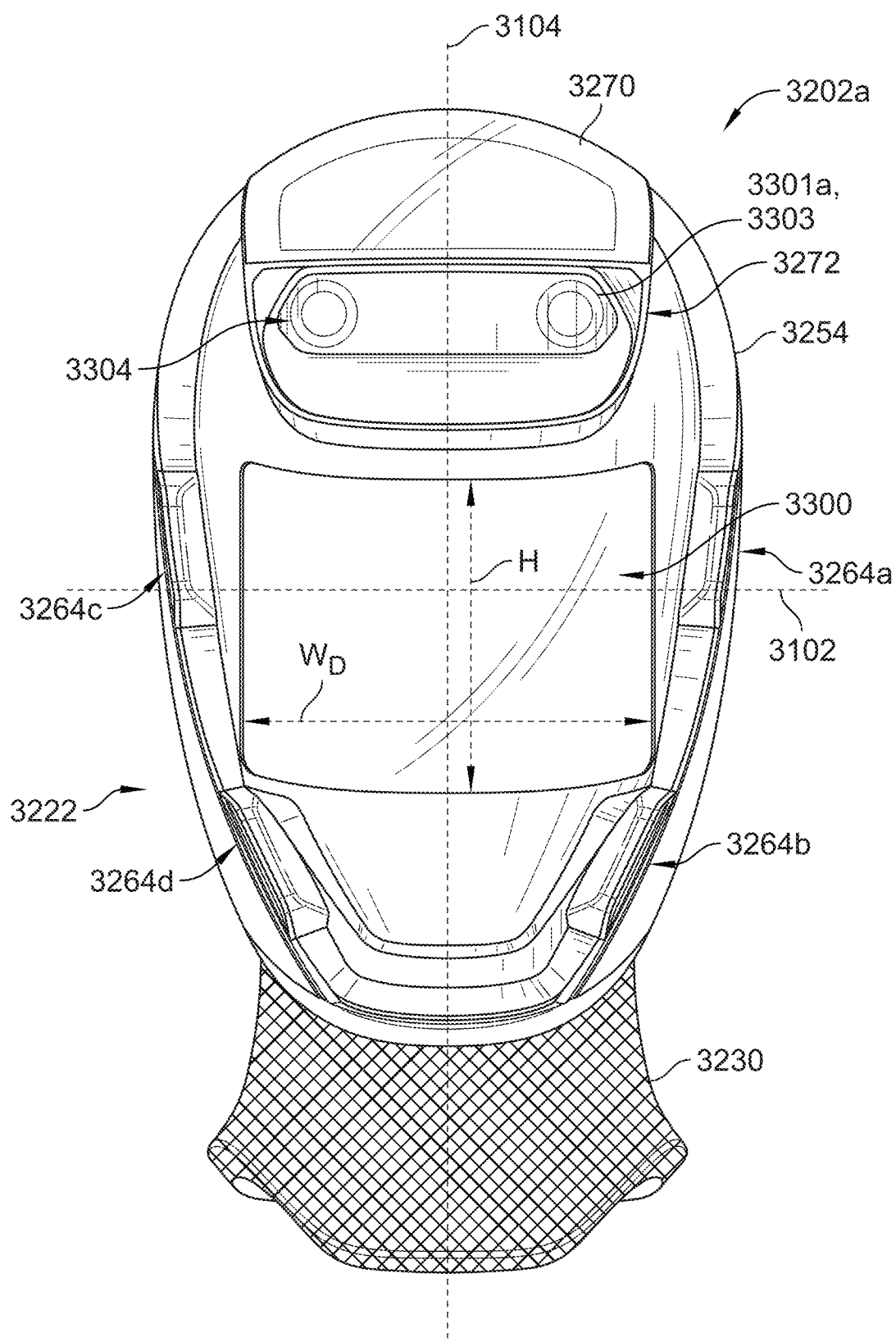
FIG. 55 is a front view of the head and neck assembly of FIG. 54.

The disclosed display 300 may be embedded in or occupy the entire frontal shell 228, between 100% and 75% of the frontal shell 228, between 75% and 50% of the frontal shell 228, between 50% and 25% of the frontal shell 228, or less than 25% of the frontal shell 228. In some examples, the display 300 may utilize the full area of the frontal shell 228. In some examples, the display 300 may be sized to fit between any two of the lines shown in FIGS. 50-51. In some further examples, the display 300 may be sized to fit between any two of the lines shown in FIGS. 52-53. In other words, the ratio of the display 300 size to the frontal shell 228 size may be any suitable ratio. The display 300 may be curved in a single direction, in two directions (e.g., vertically and horizontally), or it may embody a freeform design that could include multiple complex curves. In certain embodiments, the frontal shell 228 and the display 300 may be integrated into a single, cohesive unit. As best shown in FIGS. 15A, a gap is formed between the outer surface of the display 300 and the inner surface of the frontal shell 228.

As shown in FIG. 15B, the display 300 is curved so as to occupy and/or coincide with and display information through all or portions of the orbital region 368, the frontal region 362, the temporal region 350, the zygomatic region 358, the nasal region 357, the infraorbital region 363, the buccal region 352, and the oral region 366 of the head portion 202a. The display 300 may not coincide with any region located rearward of the shield interface 320, including a mental region 355, an auricular region 356, a crown region 270, a parietal region 360, an occipital region 359, or a mastoid region 364. In other embodiments, the display 300 may present information, indications, or visual representations across: (i) the entire frontal shell 228, (ii) a majority of the frontal shell 228, (iii) the entire facial region 241, and/or (iv) a majority of the facial region 241. In contrast, in other alternative embodiments, the display 300 may be omitted entirely or moved to a different region (e.g., the torso 204) of the humanoid robot 100.

FIGS. 9A-9G show various statuses and their corresponding indications or visual representations that are contemplated by this disclosure for display on the display 300. It should be noted that the present disclosure is not limited to these specific statuses and their corresponding indications or visual representations and that these are merely examples that can be displayed by the display 300.

Figure 9A:
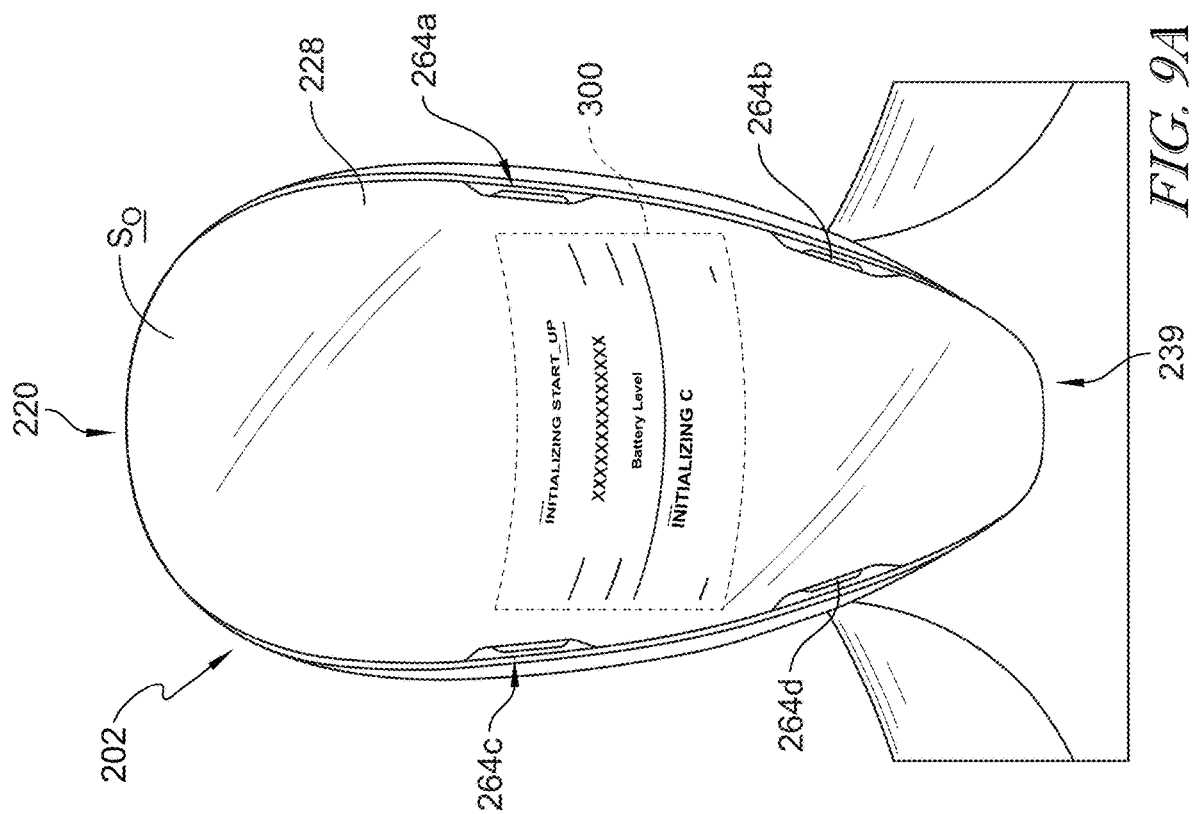
FIG. 9A is a front view of the head and neck assembly of FIG. 3 showing a second set of information displayed on an/or through the frontal shell.
Figure 8:
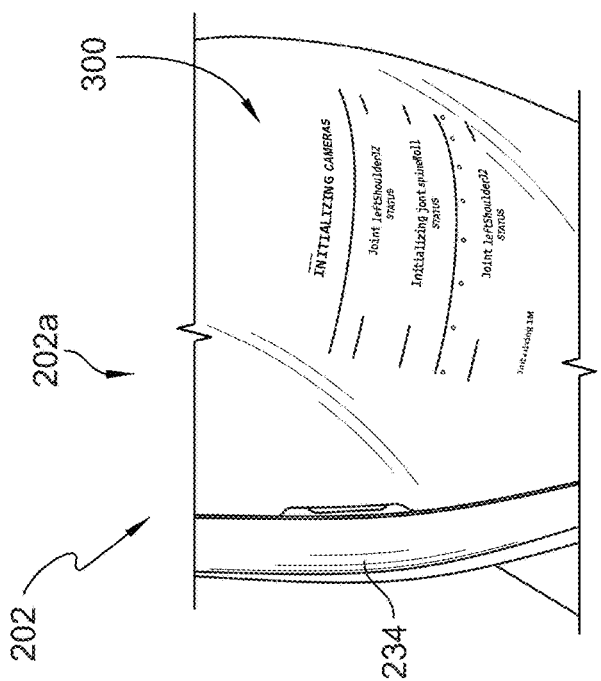
FIG. 8 is a partial perspective view of the head and neck assembly of FIG. 3 showing a first set of information displayed on and/or through the frontal shell.

FIGS. 8 and 9A show sets of information displayed by the display 300, including device status (e.g. camera status and robot start-up status), robot part status (e.g. a specified joint status), and a battery level status. The various statuses disclosed herein can update as the actual status changes. For example, during the start-up sequence of a camera(s) 302, 303, 304, the display 300 may display text, an icon, or another visual representation indicating that the camera(s) 302, 303, 304 is currently initializing and is not yet ready for use. The status can then change to display an icon, or another visual representation, indicating that the camera(s) 302, 303, 304 are active once the start-up process is complete.

Figure 9C:
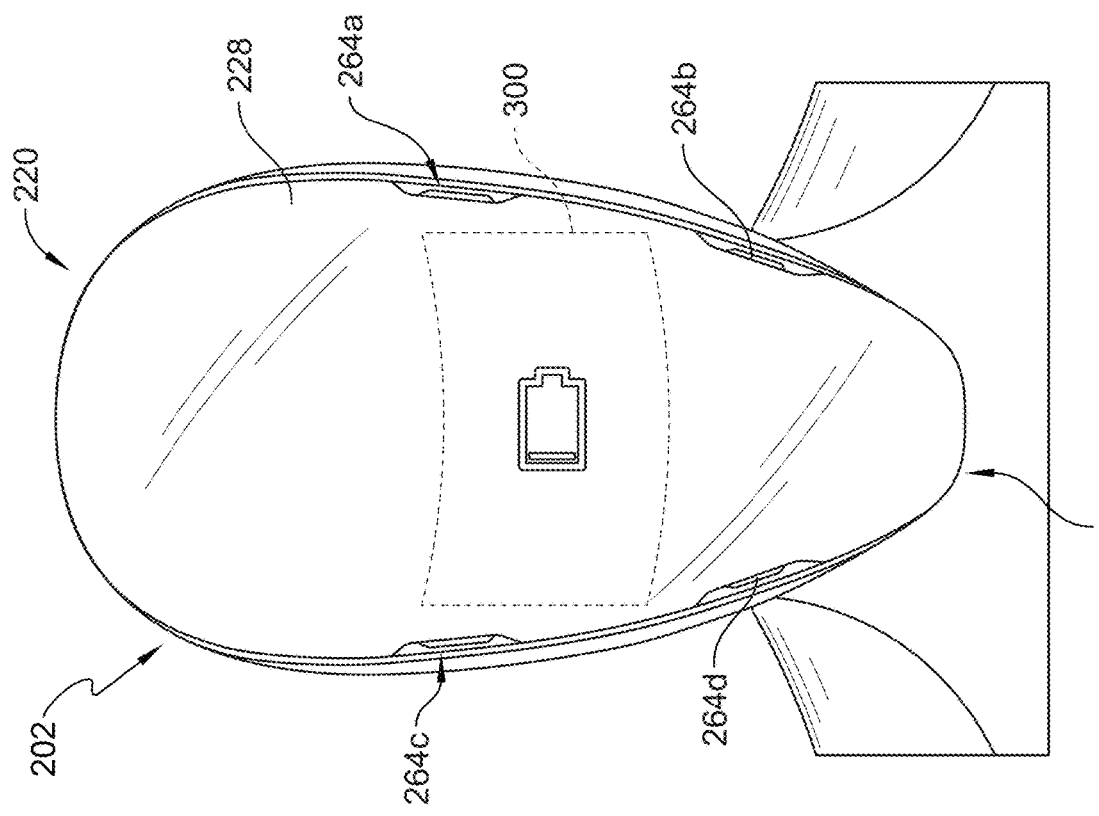
FIG. 9C is a front view of the head of the robot showing another icon indicating a low battery status on an/or through the frontal shell.
Figure 9B:
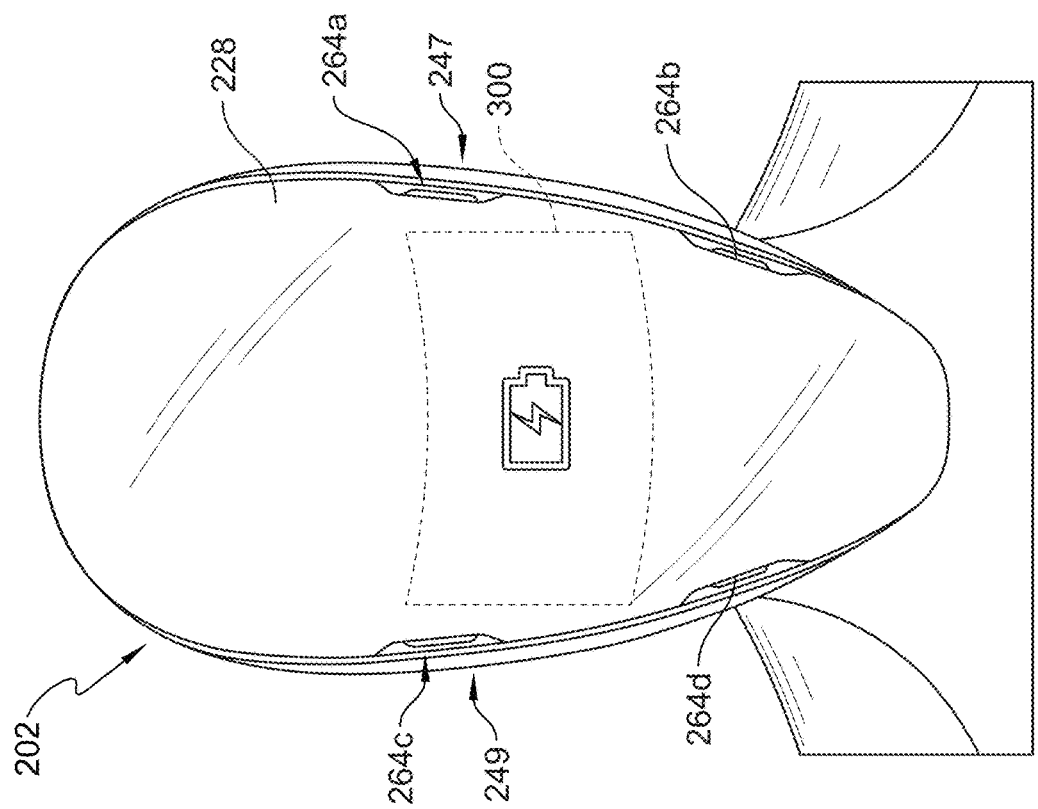
FIG. 9B is a front view of the head of the robot showing an icon indicating a battery status on an/or through the frontal shell.

FIG. 9B shows an icon indicating a battery status, specifically that the battery is charging. The icon is generally in the shape of a battery. The icon further includes a lightning bolt symbol to indicate that the battery is currently in a charging state. This icon (or icons) can be displayed in a first color (e.g. green) while the battery is charging and/or after the battery has been fully charged. FIG. 9C shows another icon indicating an additional battery status, in this case, a low battery level. This icon is also generally in the shape of a battery and includes a level marker to indicate the current battery charge level. In the illustrative embodiment of FIG. 9C, the level marker is depicted as a thin line to one side of the battery icon, visually indicating that the battery charge is low and that the battery should be recharged soon. This level marker can move or increase in size to indicate the current battery charge level at any given time.

Figure 9E:
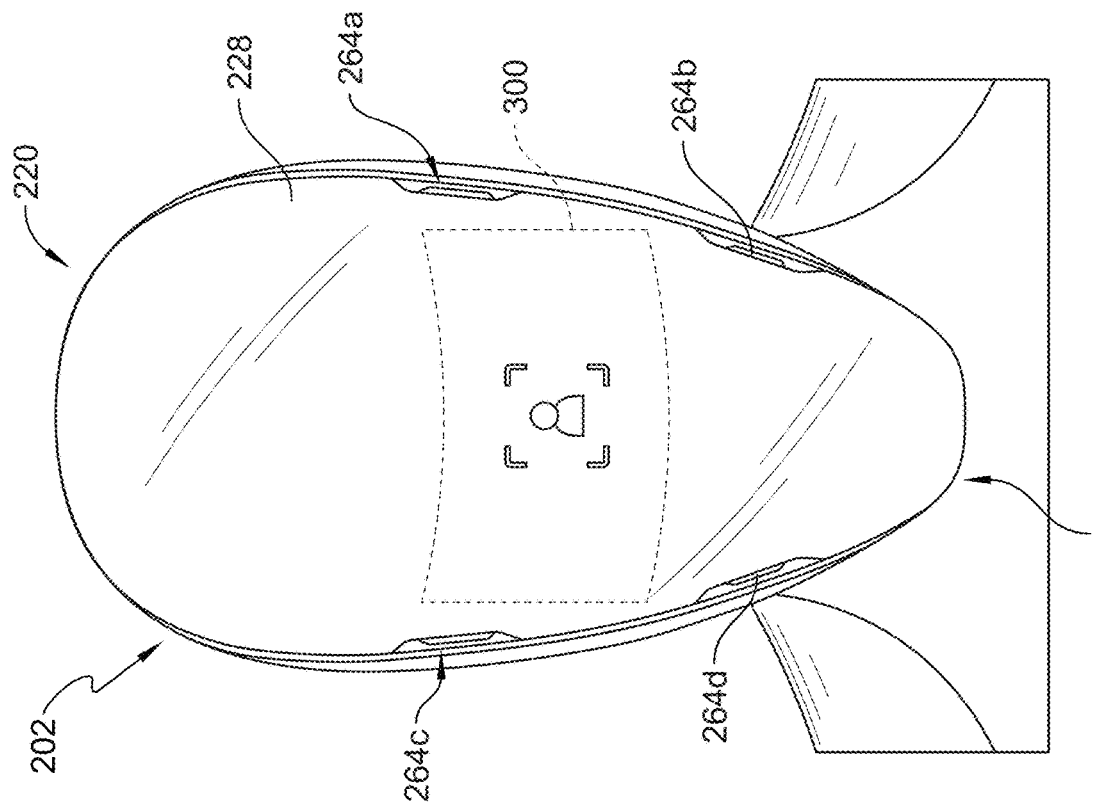
FIG. 9E is a front view of the head of the robot showing an icon indicating a particular mode of the robot on an/or through the frontal shell.
Figure 9D:
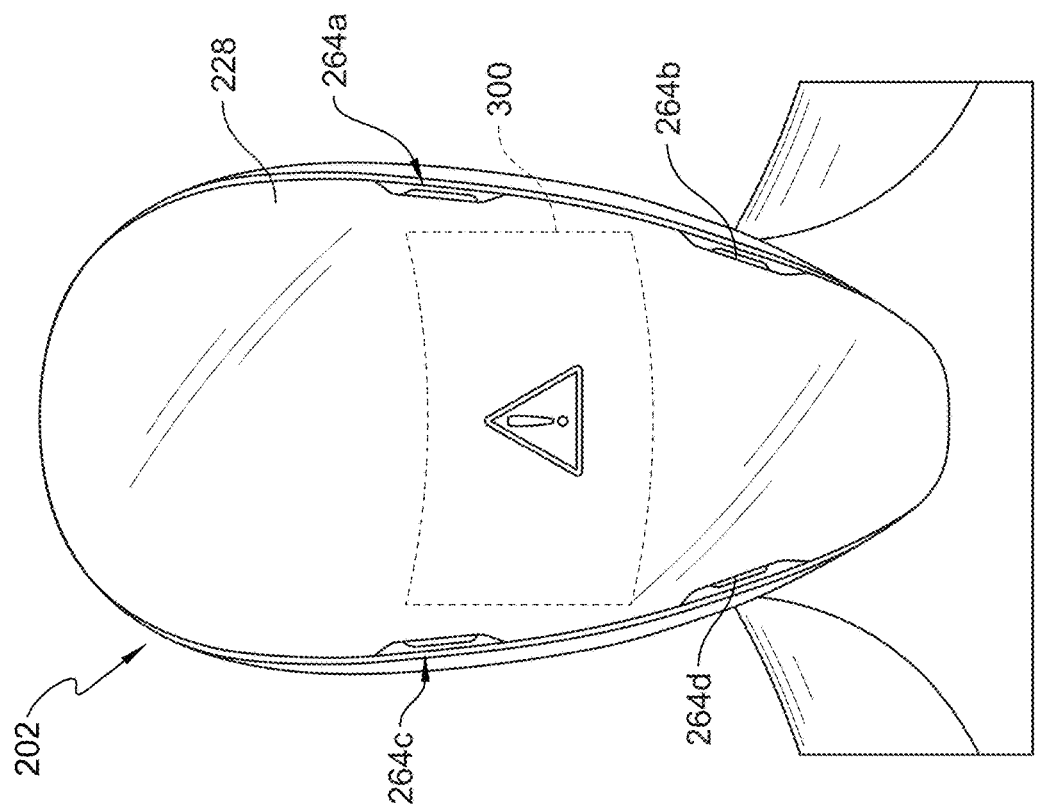
FIG. 9D is a front view of the head of the robot showing another icon indicating an alert or system failure event on an/or through the frontal shell.
Figure 10:
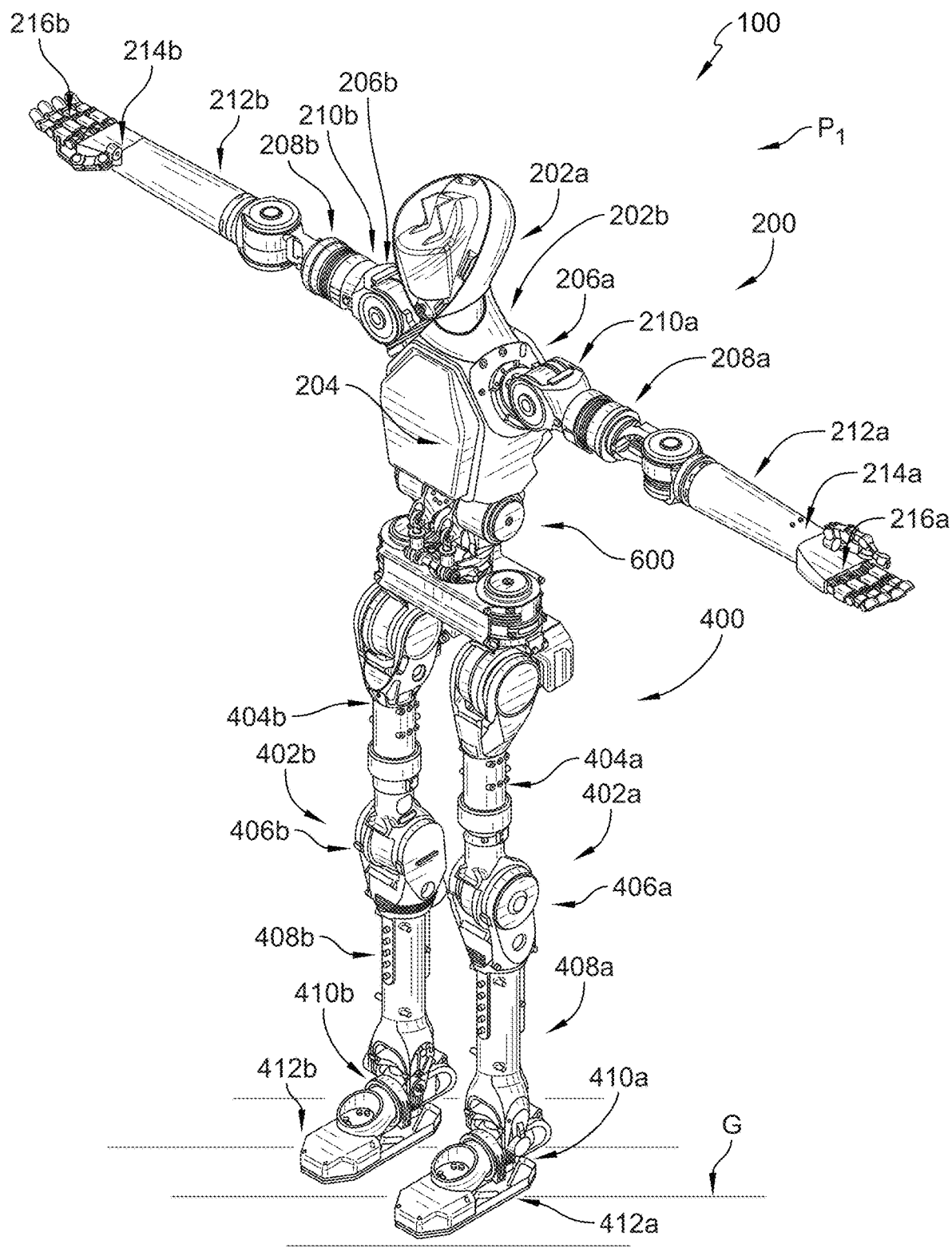
FIG. 10 is a perspective view of a second embodiment of a humanoid robot in an upright standing position P1 with outer covers of the robot removed to expose various actuators and components included in the robot.
Figure 11:
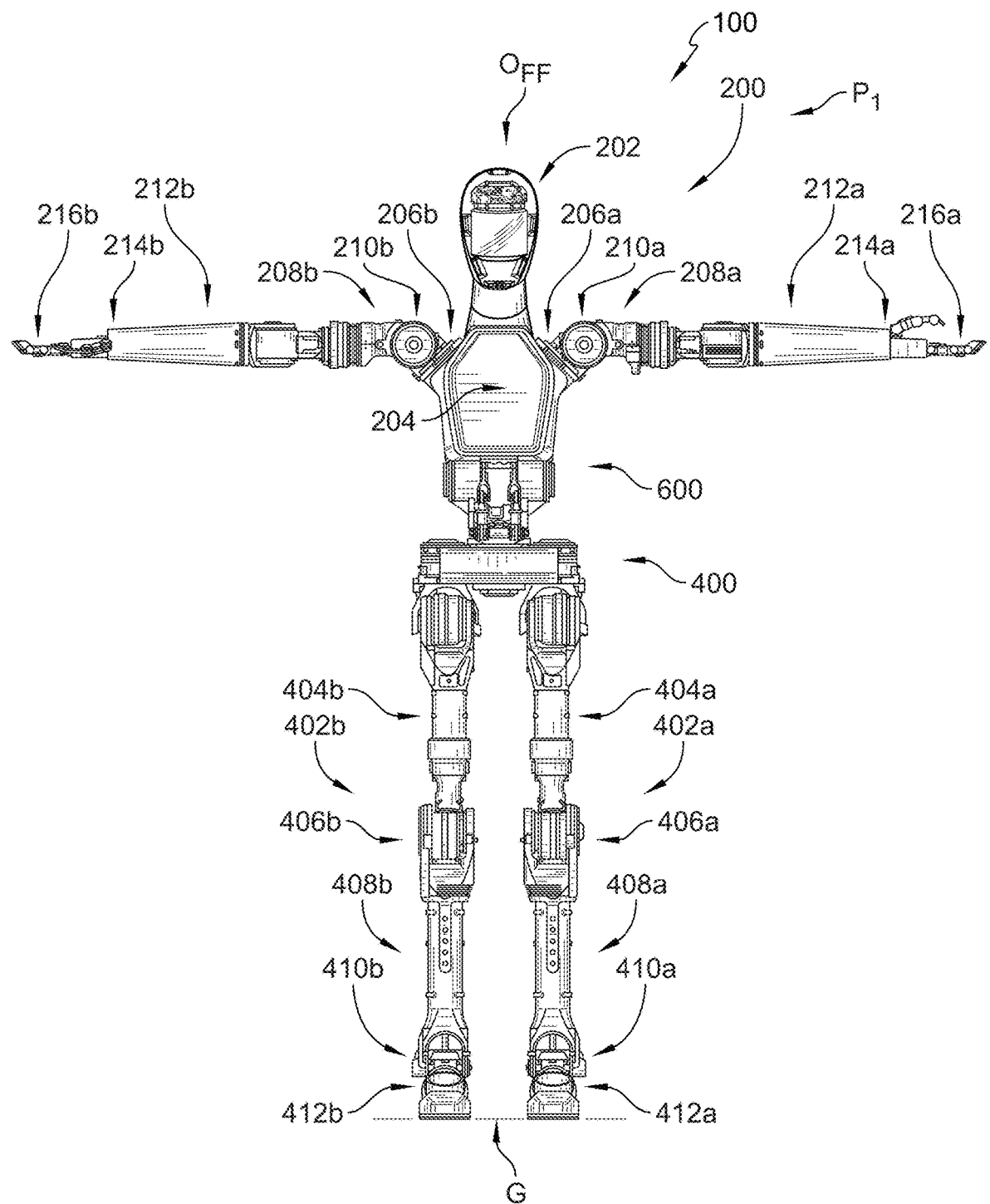
FIG. 11 is a front view of the humanoid robot of FIG. 10.
Figure 13:
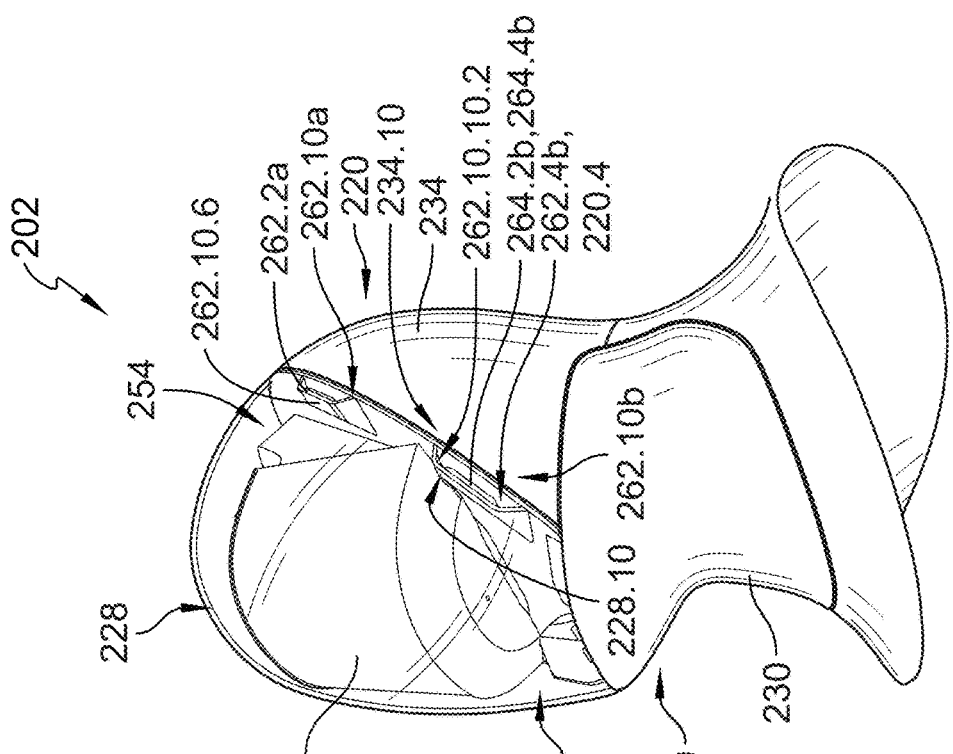
FIG. 13 is a bottom perspective view of the head and neck assembly of FIG. 12.
Figure 12:
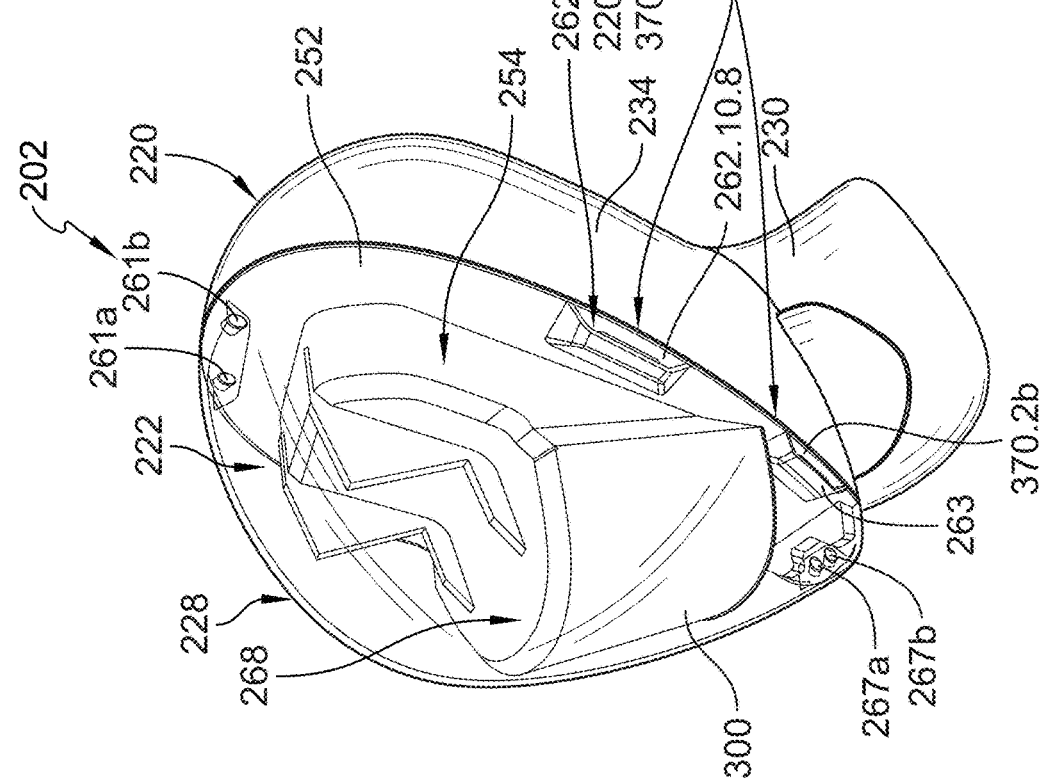
FIG. 12 is a perspective view of the head and neck assembly of FIG. 10, wherein the head electronics assembly further includes a display that is visible through the frontal shell.

FIG. 9D shows another icon indicating an alert or a system failure event. The icon includes a triangle with an exclamation mark contained within it to signify the alert or system failure event. Such an icon may be displayed when a part of the humanoid robot 100 has failed, such as an actuator, a camera, or another device included in the humanoid robot 100. Identifying information, in the form of text or another accompanying icon, can also be displayed along with the alert or failure icon to specify which particular part of the humanoid robot 100 has failed or requires attention. FIG. 9E shows an icon indicating a particular operational mode of the robot. Illustratively, the mode depicted by this icon indicates a "follow mode," in which the humanoid robot 100 is engaged in following a user, another device, or another robot. The icon includes a generally human-shaped figure with a border around this generally human-shaped figure. Other icons corresponding to additional modes of operation of the robot can also be displayed as needed.

FIG. 9F shows an icon indicating a particular task currently being performed by the humanoid robot 100. Illustratively, the task icon depicted is a generally human shaped figure that is shown lifting and carrying a box or another item. Other icons corresponding to additional tasks that can be completed by the robot can also be displayed. FIG. 9G shows an additional robot status icon. Illustratively, the status icon depicted is a "pause" icon. The pause icon can be displayed when the humanoid robot 100 is currently not completing any tasks or modes and is essentially in a ready state, awaiting instructions. Other icons corresponding to additional robot statuses that can be conveyed by the robot can also be displayed.

ii. Head Illumination Assembly

The head illumination assembly 263 includes at least one, and preferably a plurality of, light emitting assemblies 264a-264d that are located on the lateral sides of the head portion 202a. In certain configurations, this illumination assembly 263 may be designed to visually indicate various robot statuses to users who are viewing the humanoid robot 100 from the side. As shown in FIGS. 5B, 15B, 31B, and 57B, a first light emitting assembly 264a is located in the temporal region 350 of the robot's head portion 202a, and a second light emitting assembly 264b is located in the buccal region 352 of the robot's head portion 202a. Third and fourth light emitting assemblies 264c, 264d are located symmetrically on the opposite side of the robot's head portion 202a, and so are also located in the temporal region 350 and the buccal region 352, respectively. In some embodiments, the light emitting assemblies 264a-264d can be located all or partially in a parotid region 354 of the robot's head portion 202a, an auricular region 356 of the robot's head portion 202a, a zygomatic region 358 of the robot's head portion 202a, a parietal region 360 of the robot's head portion 202a, a frontal region 362 of the robot's head portion 202a, or a mastoid region 364 of the robot's head portion 202a, so long as the light emitters 264.2a-264.2d of the assemblies 264a-264d are positioned on a lateral side of the robot's head portion 202a so as to be visible to a person standing next to the humanoid robot 100. These strategic positions of the light emitting assemblies 264a-264d allow users to view the light emitted from said light emitting assemblies 264a-264d from the side while the humanoid robot 100 is, for example, working on a task in an assembly line, and while the main display 300 is facing the assembly line and may not be entirely visible by the user. Further, the light emitting assemblies 264a-264d may face away from the display 300 so as not to obstruct the information being shown by the display 300, and they may also face away from other sensors so as not to interfere with the operation of those sensors. Other regions of the head portion 202a where the light emitting assemblies 264a-264d are not typically found include the chin or mental region 355, the orbital region 368, the nasal region 357, the crown region 270, and the occipital region 359.

The light emitting assemblies 264a-264d in the head portion 202a may be configured to display a status of the humanoid robot 100, or a part thereof, to users. For example, the light emitting assemblies 264a-264d can display: (i) a first color (i.e., green) when the robot is engaged in a task, such as assembling a part on an assembly line, (ii) a second color (i.e., yellow) when the humanoid robot 100 is not currently assigned to a task, thereby indicating to users that the humanoid robot 100 is available for a new task, and (iii) a third color (i.e. red) when the humanoid robot 100 is low on battery life and should be recharged. The light emitting assemblies 264a-264d and/or the display 300 can also be used to indicate when a component in the head portion 202a and/or the neck portion 202b, such as an actuator, is malfunctioning and should be serviced.

The light emitting assemblies 264a-264d can also incorporate one or more display sequences in which the light emitting assemblies 264a-264d are turned off and on, or the light emitted from said light emitting assemblies 264a-264d changes, in a specific pattern or sequence to indicate various statuses. For example, the light emitting assemblies 264a-264d can blink repeatedly to indicate that the humanoid robot 100 has lost communication with a host server or an external device, or that it is attempting to pair with or searching for a device or server to connect to. The light emitting assemblies 264a-264d may coordinate their display output with the information being displayed on the main display 300. For example, the light emitting assemblies 264a-264d can display a particular color that corresponds with the information currently displayed on the display 300. If the humanoid robot 100 is running low on battery life, the light emitting assemblies 264a-264d can display a red color while the display 300 concurrently displays a message and/or an icon that indicates that the battery is low.

The light emitting assemblies 264a-264d can also be synchronized with other devices included in the humanoid robot 100 as well. For example, the light emitting assemblies 264a-264d can be operated in conjunction with a speaker and may change colors or blink as the humanoid robot 100 outputs an audible message. Light emitting assemblies 264b and 264d are positioned adjacent to an oral region 366 of the head portion 202a and can be operated independently of the light emitting assemblies 264a, 264c which are located above light emitting assemblies 264b, 264d and adjacent to an orbital region 368 of the head portion 202a.

Each of the light emitting assemblies 264a-264d in the head portion 202a typically includes: (i) a light source or light emitter 264.2a-264.2d, and (ii) a diffuser lens 264.4a-264.4d covering the light source 264.4a-264.4d. The light source 264.2a-264.2d and the diffuser lens 264.4a-264.4d form a unit 264.6a-264.6d that is inserted together into each respective peripheral protrusion 262a, 262b, 262c, 262d to couple the light emitting assemblies 264a-264d to the head portion 202a. The light source or emitter 264.2a-264.2d can include any known light emitter, including any one or more of the following: laser, LCD, LED (e.g., COB LED), OLED, LPD, IMOD, QDLED, mLED, AMOLED, SED, FED, plasma, electronic paper or EPD, MicroLED, quantum dot display, LED backlit LCD, WLCD, OLCD, transparent OLED, PMOLED, capacitive touchdisplay, resistive touchdisplay, monochrome emitter, color emitter, or any combination of the above, or any other known technology or light-emitting feature. It should be understood that in other embodiments, the above-disclosed light sources or emitters 264.2a-264.2d and/or additional light emitters 264.2a-264.2d may be formed in any desirable configuration or used with any other material, structure, or component to form the desirable light emitting assemblies 264a-264d. Examples of said light emitting assemblies 264a-264d that may be formed include configurations utilizing fiber optic cables, electroluminescent (EL) wire, laser diodes, neon tubes, cold cathode fluorescent lamps (CCFL), plasma tubes, phosphorescent strips, UV LED strips, infrared LED arrays, light guide panels (LGP), or edge-lit light panels. The light source or light emitter 264.2a-264.2d may be made from a single emitter or a plurality of emitters (e.g., a number ranging between 2 and 1000 individual emitters). Said light source or light emitter 264.2a-264.2d may be driven by an internal driver or an external driver located within another aspect of the electronics assembly 222. Each of the light emitters 264.2a-264.2d is positioned in an inner portion of each respective peripheral protrusion 262a-262d (i.e., positioned toward the display 300) and the diffuser lens 264.4a-264.4d is positioned in front of the light emitter 264.2a-264.2d so as to reside between a frontal extent of the light emitter 264.2a-264.2d and an outermost edge 262.2a-262.2d of each respective peripheral protrusion 262, and/or an outermost edge or surface of the head portion 202a or frontal shield 228. In some embodiments, the diffuser lens 264.4a-264.4d can be omitted from the light emitting assemblies 264a-264d. Each light emitter 264.2a-264.2d is located forward of and adjacent to the forward facing edge 298 of the rear shell 234, and also rearward of and adjacent to a portion of the rear facing edge 322 of the frontal shell 228 that defines each recess 324. A rearmost edge of each light emitter is located rearward of the entire rear facing edge 322 of the frontal shell 228. The light emitters 264.2a-264.2d are located in voids 262.4a-262.4d that are defined by each respective peripheral protrusion 262a-262d, where these voids 262.4a-262.4d are located between the frontal shell 228 and the rear shell 234. In other embodiments, the light emitters 264.2a-264.2d may not be formed directly in these voids 262.4a-262.4d; and instead, said voids 262.4a-262.4d may act as a reflector for light that is emitted from said light emitter or source. In other words, the light emitter may be positioned in the first head sub-volume 236.

A gap or channel 370 is formed between the rear edge of the frontal shell 228 and the rear shell 234, and wherein light emitted from the illumination assembly 263 (comprising the light emitting assemblies 264a-264d) is configured to be visible in the recess 220.4 and in the gap or channel 370. The recess 220.4 or gap 370 includes a region, wherein said region is: (i) positioned adjacent to both the rear edge 322 of the frontal shell 228 and the frontal edge 253 of the rear shell 234, and (ii) illuminated by an extent of the illumination assembly 263, namely by light that is emitted by at least one of the light emitters 264.2a-264.2d. An extent of the head portion 202a is provided by these peripheral protrusions 262a-262d, namely the voids 262.4a-262.4d. As shown in at least FIGS. 3, 4, 14, and 16, an extent of The voids 262.4a-262.4d and regions 370.2-370.2d are recessed relative to both: (i) a first location on the outer surface $S_O$ of the frontal shell 228 that is positioned adjacent to the gap 370, and (ii) a second location on the outer surface of the rear shell 234 that is also positioned adjacent to said gap 370. Additionally and as shown in FIG. 4, the regions 370.2-370.2d disposed within the interior of the light emitter housings 262.10a-262.10b are visible from a frontal view of the head and neck assembly 202 when said head and neck assembly 202 is in the forward facing orientation $O_{FF}$.

As best shown in FIGS. 4 and 5A, the rear edge 322 of the frontal shell 228 does not directly abut the forward edge 298 of the rear shell 234 at a location corresponding to these gaps 370. As such, recess material may be positioned in these gaps 370, and wherein said recess material may be a portion of the peripheral protrusions 262a, 262b, 262c, 262d that form the light emitter housings 262.10a-262.10b. In other words, an extent of the portion of the peripheral protrusions 262a, 262b, 262c, 262d that form the light emitter housings 262.10a-262.10b may be recessed relative to the outer surfaces of both the frontal shell 228 and the rear shell 234. This specific positional relationship may cause an extent of the head portion 202a (namely, parts of the protrusions 262) to be positioned: (i) effectively within the envelope defined by the frontal shell 228 and/or the rear shell 234, and (ii) at said location to help connect the frontal shell 228 to the rear shell 234 (via the intermediate cover 252 to which they are attached). Light emitted from the illumination assembly 263 may obscure an extent of the head portion 202a (specifically, the recessed surfaces of the protrusions 262), and may specifically obscure an extent of the head portion 202a that has an outer surface that is recessed relative to the outer surfaces of the frontal and rear shells 228, 234.

When viewing the head portion 202a from the front, as shown in FIGS. 4 and 14, it can be seen that the light emitters 264.2a-264.2d of assemblies 264a-264d are spaced apart from the display 300 and the electronics support 254. In other words, the light emitters 264.2a-264.2d do not reside behind or overlap with the display 300 or the electronics support 254, although in some alternative embodiments, such an overlap may occur. The lower light emitting assemblies 264b, 264d are positioned below the display 300 and the electronics support 254. The upper light emitting assemblies 264a, 264c flank the display 300 and the electronics support 254 such that a horizontal plane (i.e., the plane 122) extending through these upper light emitting assemblies 264a, 264c also passes through the display 300. This plane 122 also passes through the center C of the head portion 202a, but the upper light emitting assemblies 264a, 264c are depicted as being slightly offset upward relative to this plane 122. The upper light emitting assemblies 264a, 264c are also located below a top end of the display 300 so as to be positioned below any cameras or sensors mounted to the electronics support 254 above the display 300.

iii. Sensor Assembly

The sensor assembly 301a associated with the head portion 202a may include one or more cameras (such as upper cameras 302, 303, 304), and/or other types of sensors including temperature sensors, pressure sensors, force sensors, inductive sensors, capacitive sensors, any combination of these sensors, or other known types of sensors. In the illustrative example provided, the sensor assembly 301a includes a set of upper cameras 301a.2. For example, the set of upper camera 302.1 may include three upper cameras 302, 303, 304 that may be positioned in the head volume, in a forward facing orientation $O_{FF}$: (i) above: (a) the display/ shield 300, (b) the orbital region 368, (c) the nasal region 357, (d) the oral region 366, and (e) an extent of the illumination assembly 263 and at least one light emitter 264a-264d, (ii) generally positioned in the frontal region 362, (iii) vertically above an extent of: (a) the temporal region 350, (b) the zygomatic region 358, and (c) the buccal region 352, and (iv) directed forward. As shown in FIGS. 26 and 27, the three upper cameras 302, 303, 304 are substantially horizontally aligned and spaced apart from one another along a plane that is parallel with plane 124. Although these upper cameras 302, 303, 304 are shown as illustrative examples, other types of sensors may be relied upon and coupled to the internal mounting frame (or electronics support 254) in a similar manner to ensure proper directional positioning for their respective detection, sensing, or signal reception capabilities.

The sensor assembly 301a and/or camera 302, 303, 304 may include: (i) scan camera(s), (ii) monochrome camera(s), (iii) color camera(s), (iv) CMOS camera(s), (v) CCD sensor(s) or camera(s) that include CCD sensor(s), (vi) camera(s) or sensor(s) that feature either a rolling shutter or a global shutter mechanism, (vii) other types of 2D digital camera(s), (viii) other types of 3D digital camera(s), (ix) camera(s) or sensor(s) that are capable of stereo vision, structured light projection, and/or laser triangulation techniques, (x) sonar camera(s) or ultrasonic camera(s), (xi) infrared sensor(s) and/or infrared camera(s), (xii) radar sensor(s), (xiii) LiDAR, (xiv) other structured light sensors, camera(s), or technologies, (xv) dot projecting camera(s) or sensor(s), or (xvi) any combination of the above-listed sensors or any other known camera or sensor type. For example, the camera 303, 302, 304 used in the sensor assembly 301a may have a megapixel resolution of between approximately 0.4 Megapixels (MP) to 20 MP, may be capable of recording video at frame rates from 5.6 Frames Per Second (FPS) to 286 FPS, may utilize a CMOS sensor, its pixel size may range from 2.4 micrometers (um) to 6.9 um, it may utilize a Starvis rolling shutter technology, it can operate in ambient air temperatures up to 55 degrees Celsius, and may possess any other properties, technologies, or features that are discussed within U.S. Pat. Nos. 11,402,726, 11,599,009, 11,333,954, or 11,600,010, all of which are incorporated herein by reference. It should be understood that the cameras are typically configured as video cameras but may, in alternative configurations, function primarily as still image cameras.

D. Neck Portion

As shown in at least FIG. 3, the neck portion 202b of the head and neck assembly 202 includes a deformable cover and member 230 that is designed to extend from an upper portion of the torso 204 to a lower portion of the head portion 202a. In particular, this deformable cover and member 230 is configured to wrap around at least an edge portion of the rear shell 234 of the head portion 202a. In doing so, the deformable cover and member 230 effectively obscures the actuators and other electronics that are contained within the neck portion 202b.

E. Distances, Angles, Radii, and Arcs

TABLE 1

| Distance (mm) | Lower Bound | Upper Bound | Preferred Lower Bound | Preferred Upper Bound |
|---|---|---|---|---|
| D6 | 81.5 | 122.3 | 91.7 | 112.1 |
| D7 | 80.5 | 120.8 | 90.6 | 110.7 |

TABLE 1-continued

| Distance (mm) | Lower Bound | Upper Bound | Preferred Lower Bound | Preferred Upper Bound |
|---|---|---|---|---|
| D8 | 76.1 | 114.2 | 85.6 | 104.7 |
| D9 | 80.6 | 120.9 | 90.7 | 110.9 |
| D10 | 34.2 | 51.2 | 38.4 | 47.0 |
| D11 | 61.7 | 92.6 | 69.4 | 84.8 |
| D22 | 93.3 | 140.0 | 105.0 | 128.3 |
| D23 | 173.6 | 260.4 | 195.3 | 238.7 |
| D24 | 166.2 | 249.4 | 187.0 | 228.6 |

TABLE 2

| Angle (Degrees) | Lower Bound | Upper Bound | Preferred Lower Bound | Preferred Upper Bound |
|---|---|---|---|---|
| A1 | 5.7 | 8.6 | 6.4 | 7.9 |

TABLE 3

| Radius (mm) | Lower Bound | Upper Bound | Preferred Lower Bound | Preferred Upper Bound |
|---|---|---|---|---|
| R1 | 99.7 | 149.6 | 112.2 | 137.1 |
| R2 | 46.0 | 69.0 | 51.7 | 63.2 |
| R10 | 127.7 | 191.6 | 143.7 | 175.6 |
| R11 | 79.3 | 118.9 | 89.2 | 109.0 |
| R12 | 69.0 | 103.5 | 77.6 | 94.8 |

TABLE 4

| Arc (Degrees) | Lower Bound | Upper Bound | Preferred Lower Bound | Preferred Upper Bound |
|---|---|---|---|---|
| Arc2 | 115.1 | 172.6 | 129.5 | 158.2 |
| Arc4 | 110.8 | 166.2 | 124.6 | 152.3 |
| Arc5 | 117.1 | 175.6 | 131.7 | 161.0 |
| Arc6 | 65.8 | 98.7 | 74.1 | 90.5 |
| Arc7 | 39.6 | 59.5 | 44.6 | 54.5 |

F. Alternative Embodiments of the Head and Neck Assembly

FIGS. 28-62 show seven alternative embodiments of the head and neck assembly 2202, 3202, 4202, 5202, 6202, 7202 that may be used interchangeably in connection with the two different general embodiments of the humanoid robot 100 shown in FIGS. 1-2, 10-11, and 32. Each of these alternative embodiments has slightly different structural features and configurations, but each embodiment maintains a similar and generally tapered overall shape. As discussed in more detail below, the features and/or components of each of these embodiments may be interchanged, added to, or removed from the features and/or components of other disclosed embodiments. For example, a lower recess 3310 that is formed in the chin or mental region 355 of the third embodiment of the head portion (e.g., as shown in FIGS. 32-57B, head 3202a) may be removed, similar to how such a lower recess was removed from the fifth, sixth, and seventh embodiments (e.g., FIGS. 58-62). Additionally, the concept of utilizing a deformable material in the neck assembly (e.g., neck shell 3230) and including actuators within the neck assembly to allow the head portion to move may be added to the head and neck assembly 202 of the first embodiment. It should be understood that these are only illustrative examples, and any feature and/or component from one embodiment may potentially be interchanged with, added to, or removed from any other embodiment disclosed herein.

1. Second Embodiment

Similar to the head and neck assembly 202 described above in connection with FIGS. 1-27, FIGS. 28-31B illustrate a second embodiment of a head and neck assembly, designated as 2202. For the sake of brevity, the detailed disclosure provided above in connection with the head and neck assembly 202 will not be fully repeated below, but it should be understood that like numerals in the different embodiments generally represent similar or like structures. For example, the disclosure regarding the display 300 applies equally to the display 2300 of the second embodiment. Further, it should be understood that the functionality and operation of the head and neck assembly 2202 are similar or identical to the features and functionality disclosed with respect to the head and neck assembly 202. It should also be understood that any one or more features of the head and neck assembly 202 may be used in combination with those disclosed with respect to the head and neck assembly 2202, and, conversely, that any one or more features of the head and neck assembly 2202 may be used in combination with those disclosed with respect to the head and neck assembly 202. The primary difference between the head and neck assembly 202 and the head and neck assembly 2202 is the fact the housing assembly 2220 of the second embodiment further includes front and rear recessed areas 2272, 2277 respectively, and an upper shell 2270. These differences also contribute to a different overall shape for the frontal shell 2228 of this second embodiment.

As shown in FIGS. 28-31B, the frontal shell 2228 is configured to cover a front portion of an electronics assembly 2222, thereby locating at least a portion of the electronics assembly 2222 between an intermediate cover 2252 and the frontal shell 2228. In the illustrative second embodiment, the housing assembly 2220 further includes an upper shell 2270 and a sensor recess 2272. The frontal shell 2228 may be formed to include a central notch 2274 that conforms to the shape of this sensor recess 2272. The housing assembly 2220 is configured to hold the display 2300 and at least one sensor, such as upper cameras 2302, which are part of the electronics assembly 2222 mounted on an electronics support 2254. The sensor recess 2272 may be positioned above an extent of the frontal shell 2228 and is integrated within the upper shell 2270. The housing assembly 2220 is shaped with a curved surface in at least the upper shell 2270 to resemble a head portion and has a rear facing edge 2276 that extends downward from the upper shell 2270 at a rear end thereof. For example, when viewed from the side, the housing assembly 2220 may have a rearwardly sloping, substantially linear edge with a forward angle (e.g., extending rearward from a horizontal reference) of between 90 degrees and 140 degrees, and preferably around 110 degrees from horizontal, when the humanoid robot 100 is in a normal vertical standing position (meaning the sagittal and coronal planes of the head are aligned with the sagittal and coronal planes of the robot). The upper shell 2270 may include a curved portion of the housing assembly 2220 from the rear edge to the sensor recess 2272 and may be defined by a curvilinear border 2278 that surrounds the upper shell 2270 and sensor recess 2272. In some examples, the upper shell 2270 has a continuous surface from the rear edge to the sensor recess 2272.

The upper sensor recess 2272 includes one or more sensor openings 2304 that are set back or recessed from the front of the housing assembly 2220. These sensor openings 2304 are positioned to correspond with the upper camera(s) 2302 of the electronics assembly 2222. The sensor openings 2304 are partially protected by an overhang feature of the upper shell 2270 that protrudes over these sensor openings 2304. A shelf 2284 extends forward and downward from the sensor opening 2304 at an angle such that this shelf 2284 will not obscure the line of sight of the upper cameras 2302 (or other sensors) of the electronics assembly 2222. The sensor recess 2272 may have a contoured surface to provide a smooth transition from the shelf 2284 to the overhang of the upper shell 2270. The curvilinear border 2278 extends from the edge of the shelf 2284 up to the upper shell 2270. The frontal shell 2228 of this embodiment may have a main body portion and two wing-like projections 2228.4, 2228.6 that extend upward from this main body 2228.2. Wherein said wing-like projections 2228.4, 2228.6 are designed to flank the upper sensor recess 2272 and are configured to have extents that are positioned adjacent to the curvilinear border 2278 of the upper sensor recess 2272.

The housing assembly 2220 may also include a sensor cover 2286 made of a material that does not obscure a signal intended to be detected by the sensor(s) housed therein. For example, the sensor cover 2286 may be a planar cover made of a transparent material that allows the upper cameras 2302 to receive images, preferably undistorted images. As such, housing assembly 2220 further comprises an upper substantially flat region 2220.2 that is provided by the sensor cover 2286, and wherein said upper substantially flat region 2220.2 located above the display 2300 that displays one or more visual representations (as shown in FIGS. 9A-9G). Additionally and/or alternatively, the sensor cover 2286 may have openings formed directly therein for receiving an extent of a sensor (e.g., a camera lens protruding through). In further embodiments, the upper sensor recess 2272 may be omitted entirely, and in such a case, the frontal shell 2228 itself may include openings formed therein for receiving an extent of a sensor (e.g., a camera lens).

In the illustrative embodiment shown in FIGS. 28-31B, a rear sensor recess 2277 may be formed in the head portion 2202a, positioned between a rear end of the upper shell 2270 and the rear shell 2234. This rear sensor recess 2277 can form a viewport for a rear facing sensor 2301c (e.g., camera) or can function as a vent to allow airflow into and/or out of the head portion 2202a for the purpose of cooling the electronics assembly 2222, potentially via an internal fan or a plurality of fans. As shown in FIGS. 28-31B, the frontal shell 2228 may include a curved upper surface defining the slot or notch 2274 and may be configured to fit between the curvilinear border 2278 and a rim. The frontal shell 2228 is shaped to generally resemble the form of the head portion 2202a, thereby providing a substantially continuous surface from the upper shell 2270 and sensor recess 2272 to the rear shell 2234. The curvature of the frontal shell 2228 may vary and may have different curvatures (i.e., different radii and arcs) at different positions along the frontal shell 2228. The frontal shell 2228 may include light recesses 2296a, 2296b, 2296c, 2296d to conform with the shape of the peripheral protrusions 2262a, 2262b, 2262c, 2262d.

2. Third Embodiment

Similar to the head and neck assemblies 202 and 2202 described above in connection with FIGS. 1-27 and FIGS. 28-31B respectively, FIGS. 32-57B illustrate a third embodiment of a head and neck assembly, designated as 3202. For the sake of brevity, the detailed disclosure provided above in connection with the head and neck assemblies 202 and 2202 will not be fully repeated below, but it should be understood that like numerals in the various embodiments generally represent similar or like structures. For example, the disclosure regarding the display 300 applies equally to the display 3300 of this third embodiment. Further, it should be understood that the functionality and operation of the head and neck assembly 3202 are similar or identical to the features and functionality disclosed with respect to the head and neck assemblies 202 and 2202. It should also be understood that any one or more features of the head and neck assemblies 202, 2202 may be used in combination with those disclosed with respect to the head and neck assembly 3202, and, conversely, that any one or more features of the head and neck assembly 3202 may be used in combination with those disclosed with respect to the head and neck assemblies 202, 2202. The primary differences between the head and neck assembly 2202 (second embodiment) and the head and neck assembly 3202 (third embodiment) are the fact that the head portion 3202a of the third embodiment does not include the rear sensor recess 2277 (found in the second embodiment), but it does include a lower sensor cover 3310 in the chin region, and it incorporates a deformable neck shell 3230.

i. Upper Shell

The head portion 3202a of the third embodiment includes an upper shell 3270 which has a recessed sensor region 3272 at a front end of this upper shell 3270, operating similarly to that of the housing assembly 2220 of the second embodiment. However, a rear end of the upper shell 3270 in this third embodiment is substantially flush with the rear shell 3234, such that there is no recessed region in this particular area (unlike the rear sensor recess 2277 of the second embodiment). In some examples of this third embodiment, the upper shell 3270 may further include an additional recessed area 3280. This recessed area 3280 may be configured to hold a top shell or cover plate 3282, which is considered part of the upper shell 3270 and has a shape that conforms to the shape of the recessed area 3280.

ii. Neck Shell

The neck shell 3230 of the third embodiment may be made from a material (e.g., fabric or a deformable plastic) that allows the head portion 3202a to twist in both directions (yaw) and pitch forward and back without the material bunching excessively or pulling unduly. The neck shell 3230 may be elastic or resilient in nature and is designed to return to its original, undeformed state when the head portion 3202a returns to its normal, neutral state or position. The disclosed head and neck assembly 3202 may include one or more actuators that allow the head portion 3202a to: (i) twist or rotate, and (ii) tilt or change its pitch. Unlike many conventional robots, these actuators are hidden underneath the deformable neck shield 3230. Movement of these actuators causes the deformable neck shell 3230 to deform and thereby accommodate such movements of the head portion 3202a.

The deformable neck shield 3230 is designed to extend up to approximately the jaw line of the head enclosure (housing assembly) and also into a rear extent of the head enclosure, but it generally does not extend into the side regions of the head portion 3202a. This specific configuration ensures that the neck shield 3230 is sufficiently attached to the head portion 3202a, yet it minimizes the surface area of the head portion 3202a that is covered by this deformable neck shield 3230. Minimizing the coverage of the deformable neck shield 3230 in the side regions of the head portion 3202a allows for the inclusion of more durable materials in these side regions without necessitating the use of overlapping layers of materials. This design is beneficial over conventional robot heads because it can reduce overall material usage and/or increase the lateral protection afforded to the electronics contained within the head portion 3202a.

iii. Lower Sensor Cover

Figure 33:
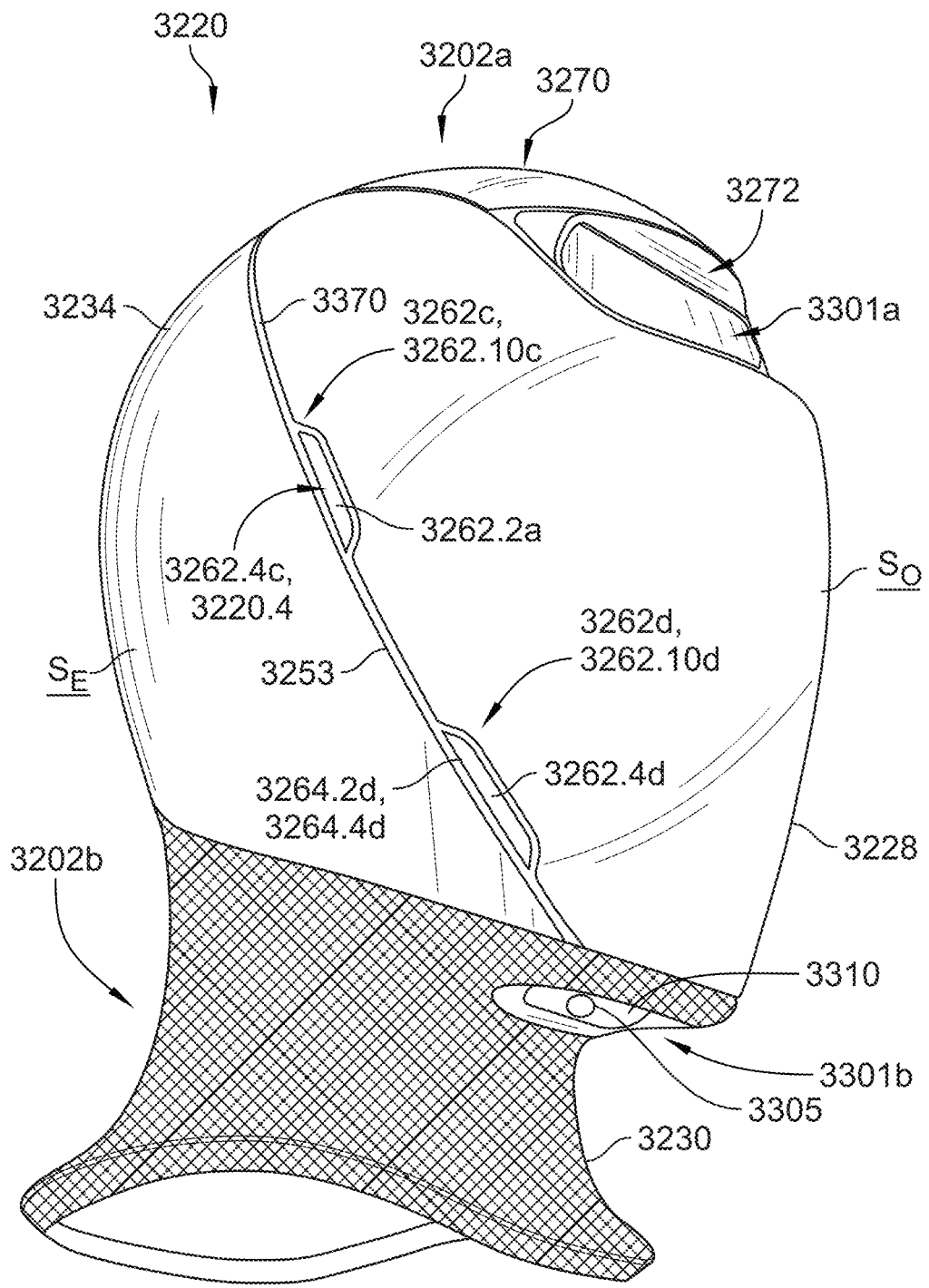
FIG. 33 is a lower perspective view of the third embodiment of the head and neck assembly of FIG. 32, wherein the head and neck assembly includes: (i) a head portion having: (a) a head housing assembly with a frontal shell, a rear shell, and an upper shell with an upper recessed sensor zone, (b) a head electronics assembly with an illumination assembly having at least one light emitter configured to emit light between an extent of the frontal shell and rear shell, and (ii) a neck portion having: (a) a neck housing assembly with a deformable cover and a lower recessed sensor zone, and (b) a neck electronics assembly.
Figure 35:
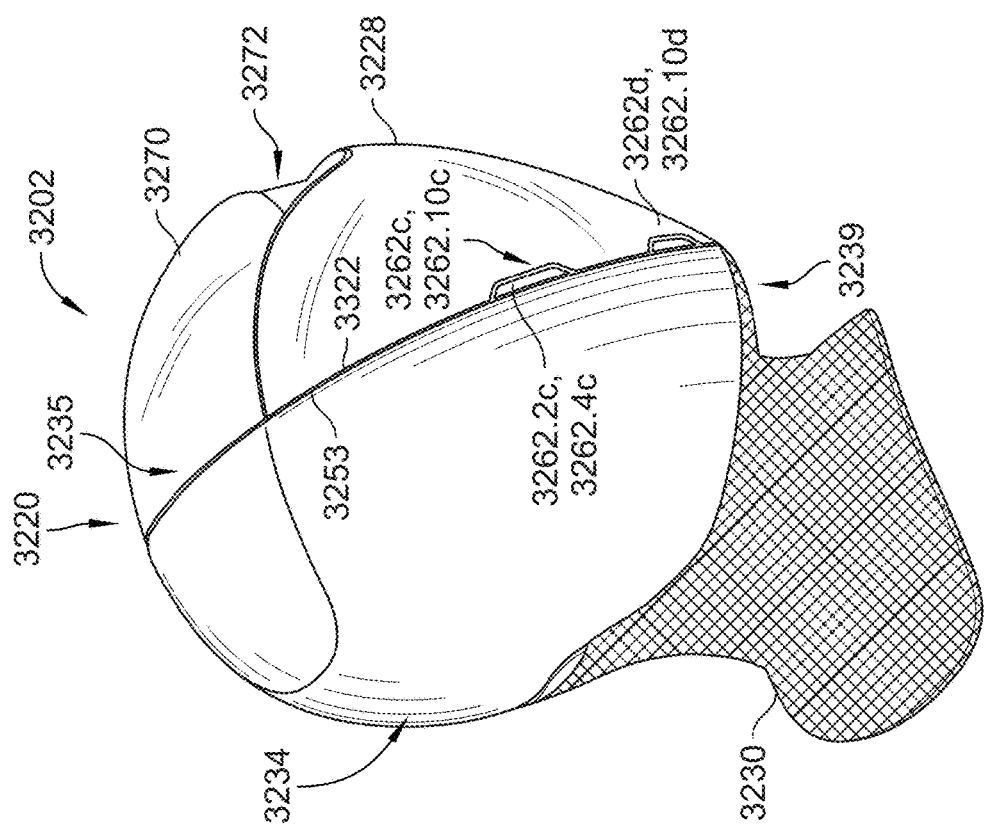
FIG. 35 is a side perspective view of the head and neck assembly of FIG. 32.
Figure 34:
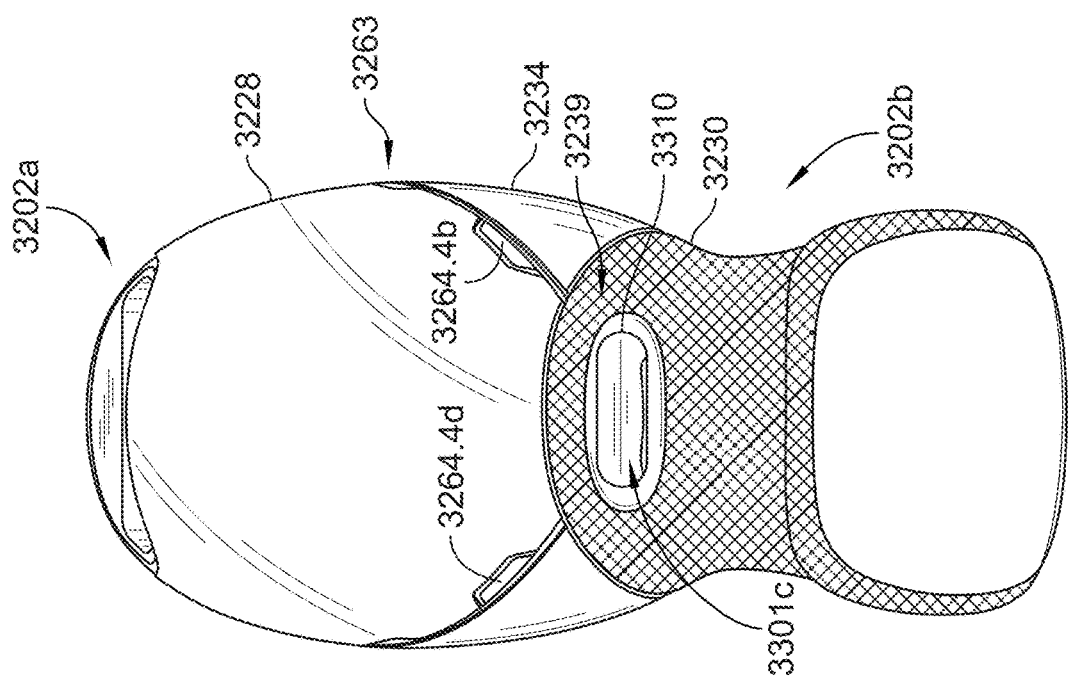
FIG. 34 is a bottom perspective view of the head and neck assembly of FIG. 32.
Figure 36:
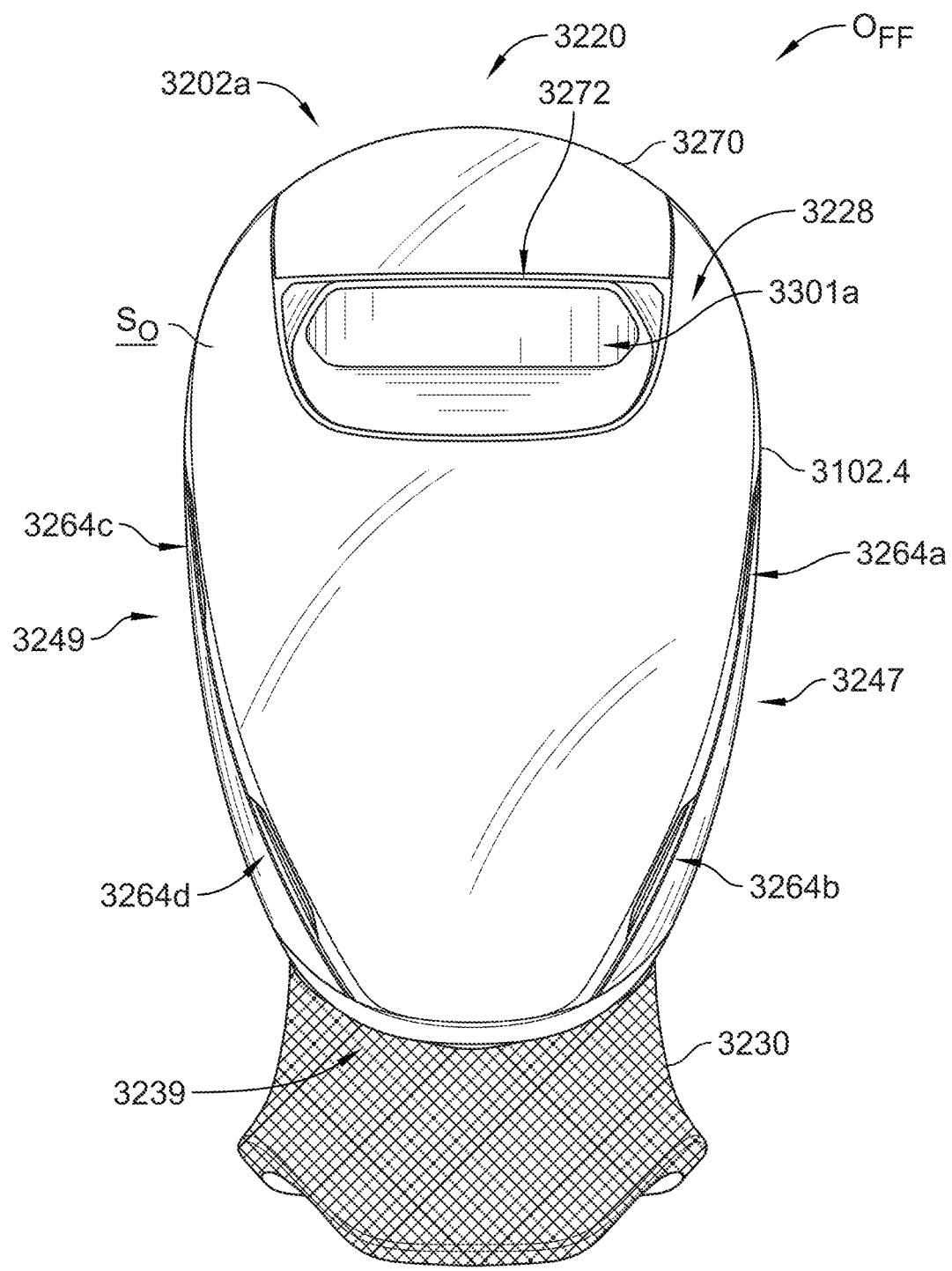
FIG. 36 is a front view of the head and neck assembly of FIG. 32.
Figure 37:
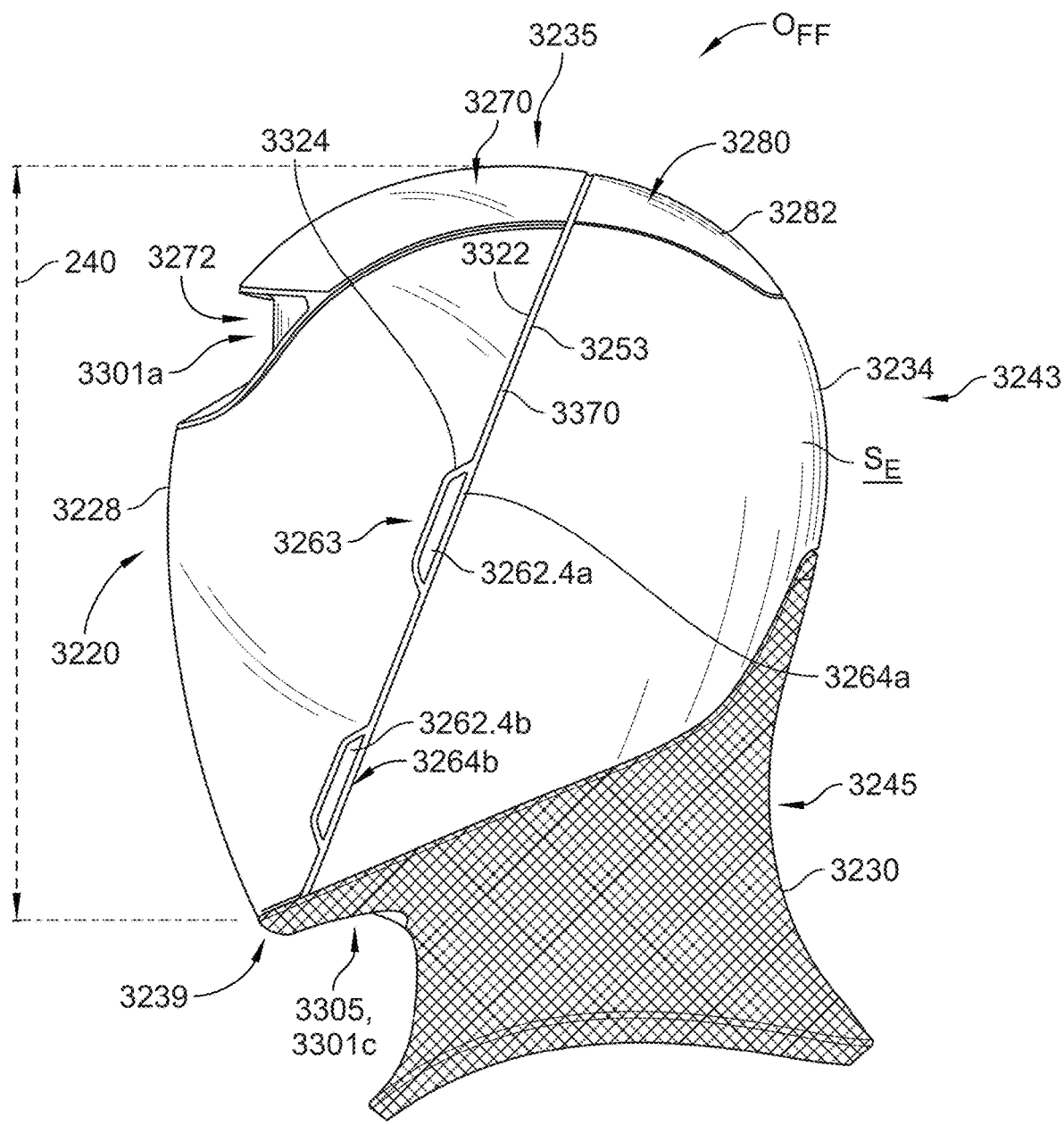
FIG. 37 is a side view of the head and neck assembly of FIG. 32.
Figure 38:
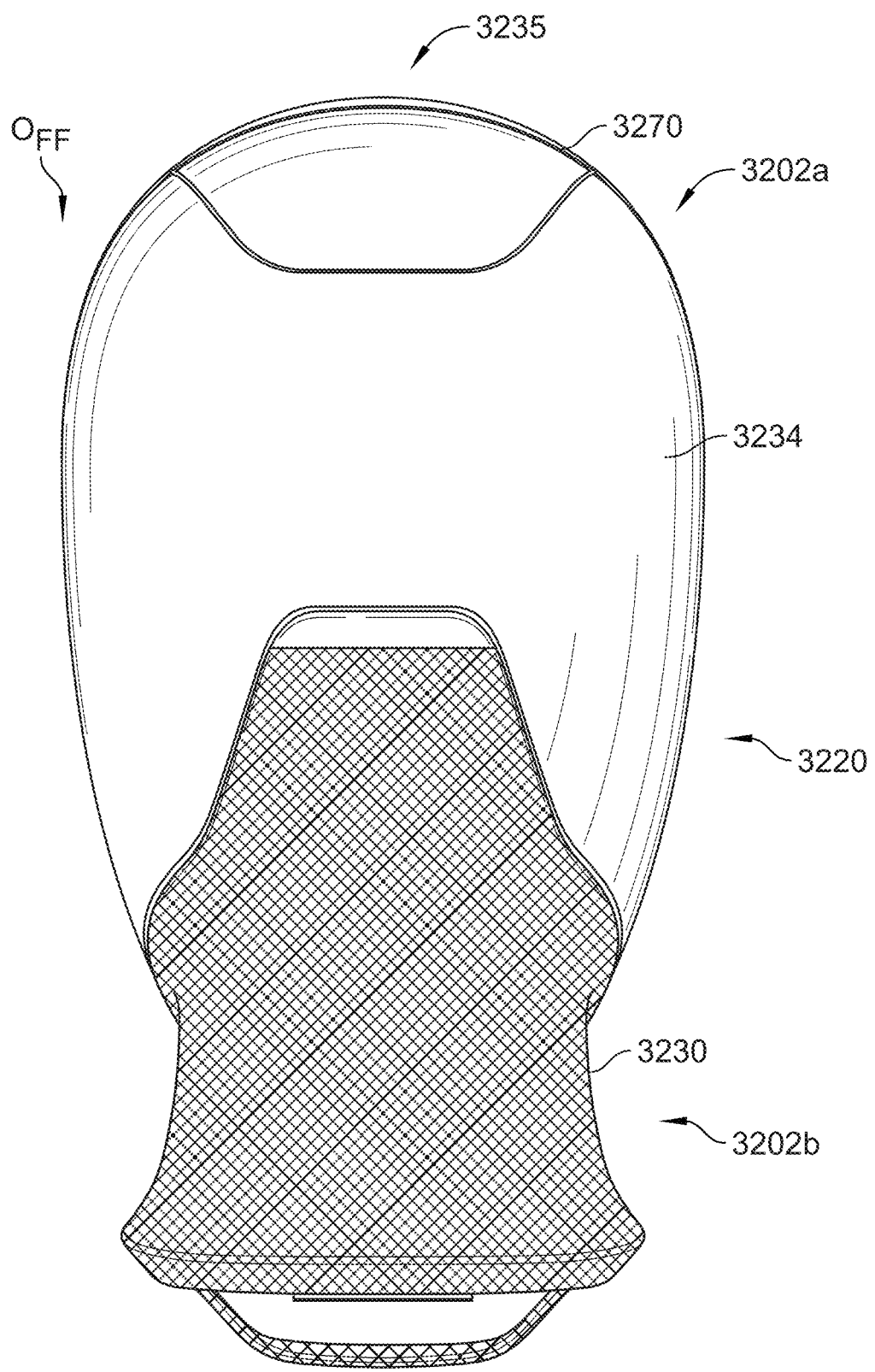
FIG. 38 is a rear view of the head and neck assembly of FIG. 32.
Figure 40:
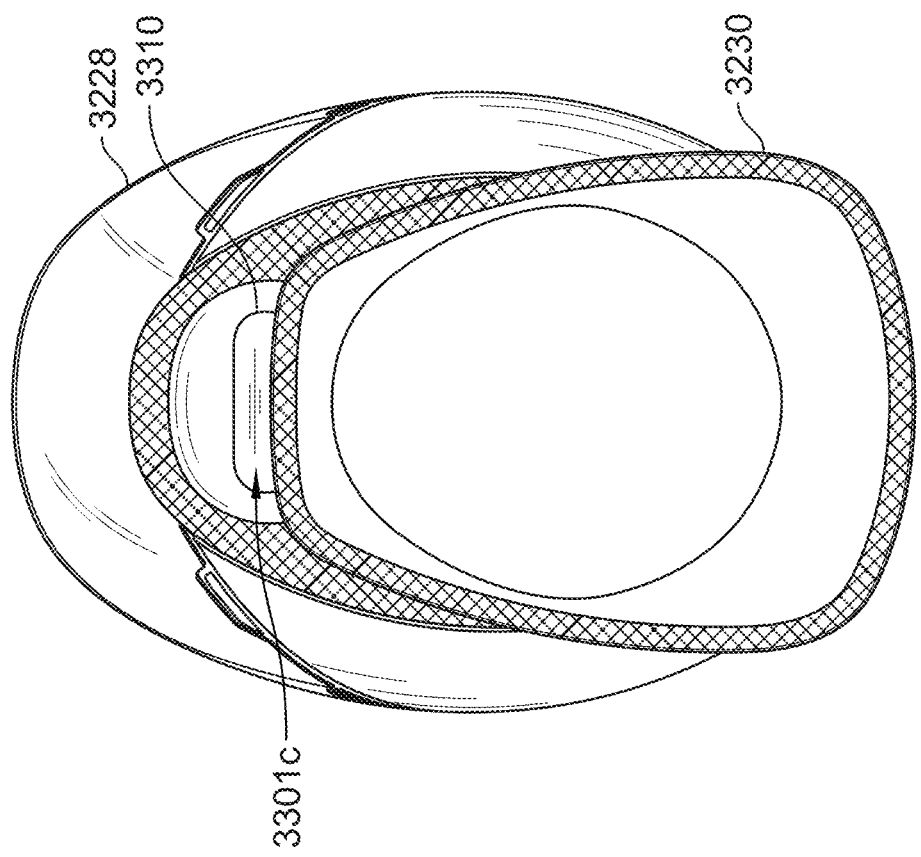
FIG. 40 is a bottom view of the head and neck assembly of FIG. 32.
Figure 39:
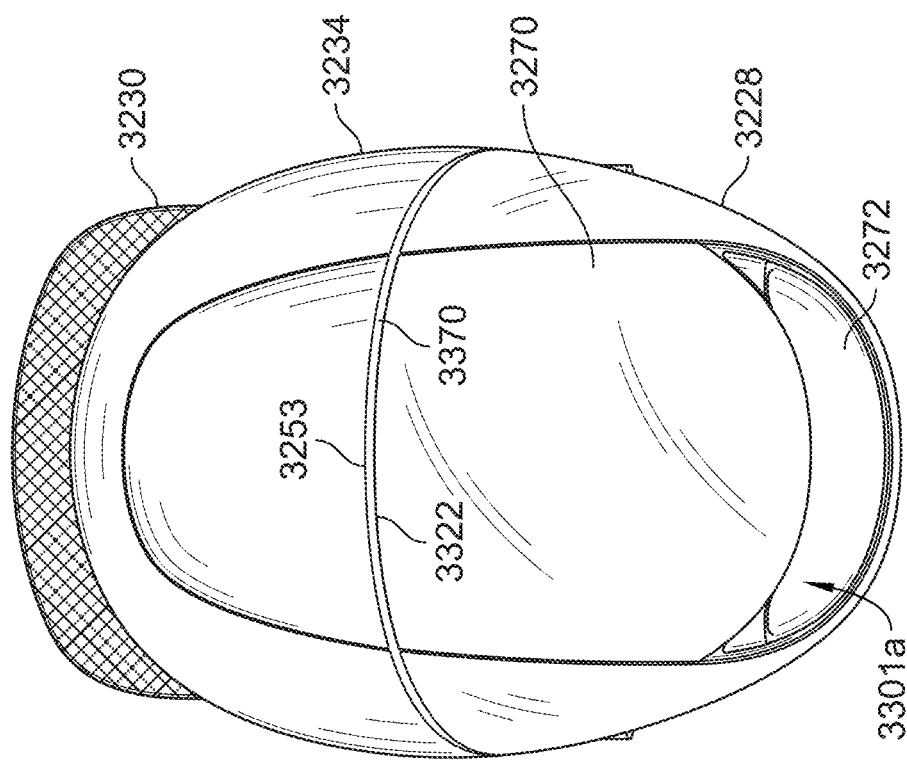
FIG. 39 is a top view of the head and neck assembly of FIG. 32.
Figure 41:
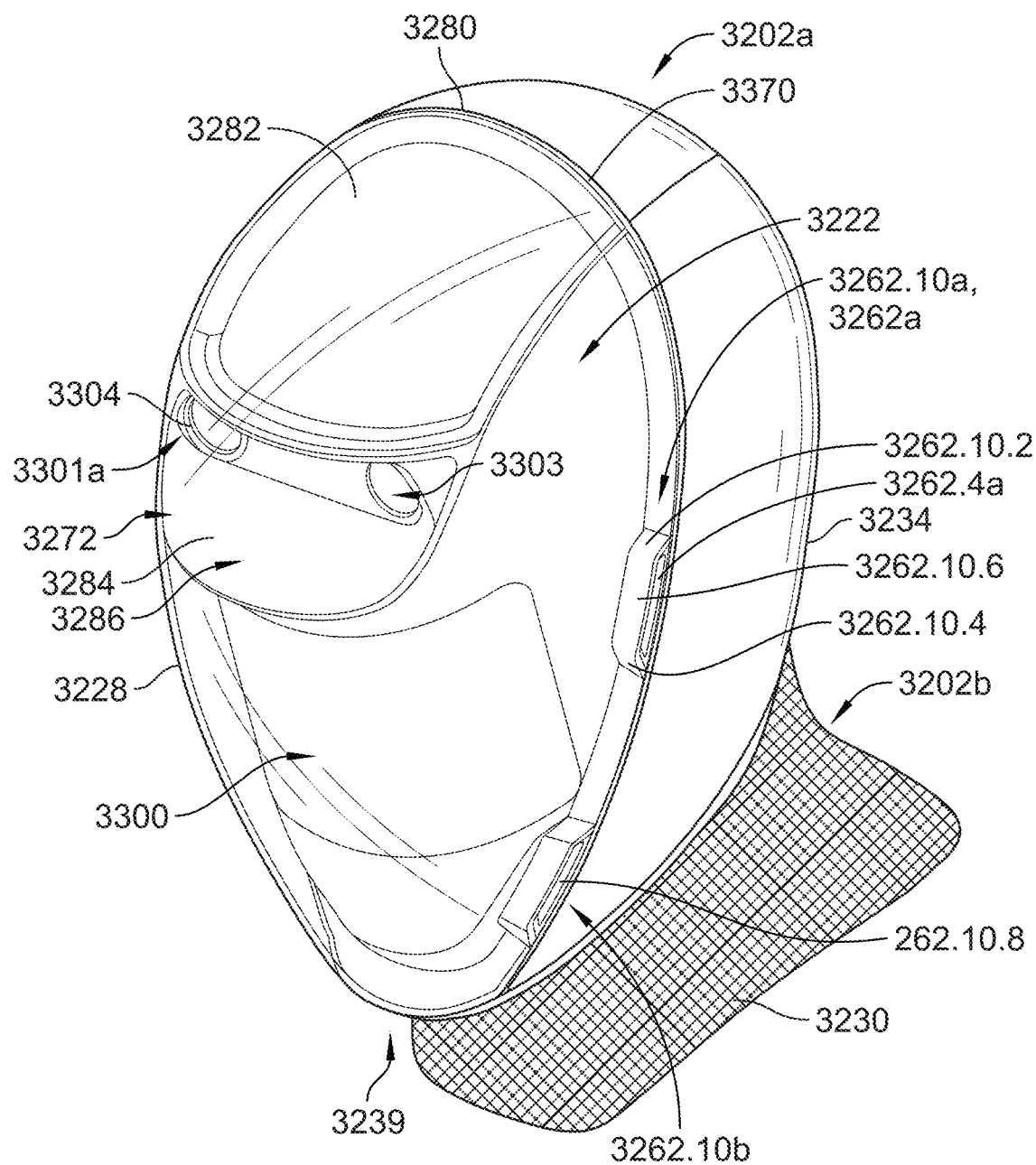
FIG. 41 is a top perspective view of the head and neck assembly of FIG. 32 wherein: (i) the frontal shell is shown as transparent to reveal the display located in an interior space defined between the frontal shell and rear shell, and (ii) an extent of the upper sensor zone is shown as transparent to reveal a pair of cameras located in the interior space and positioned above the display.
Figure 42:
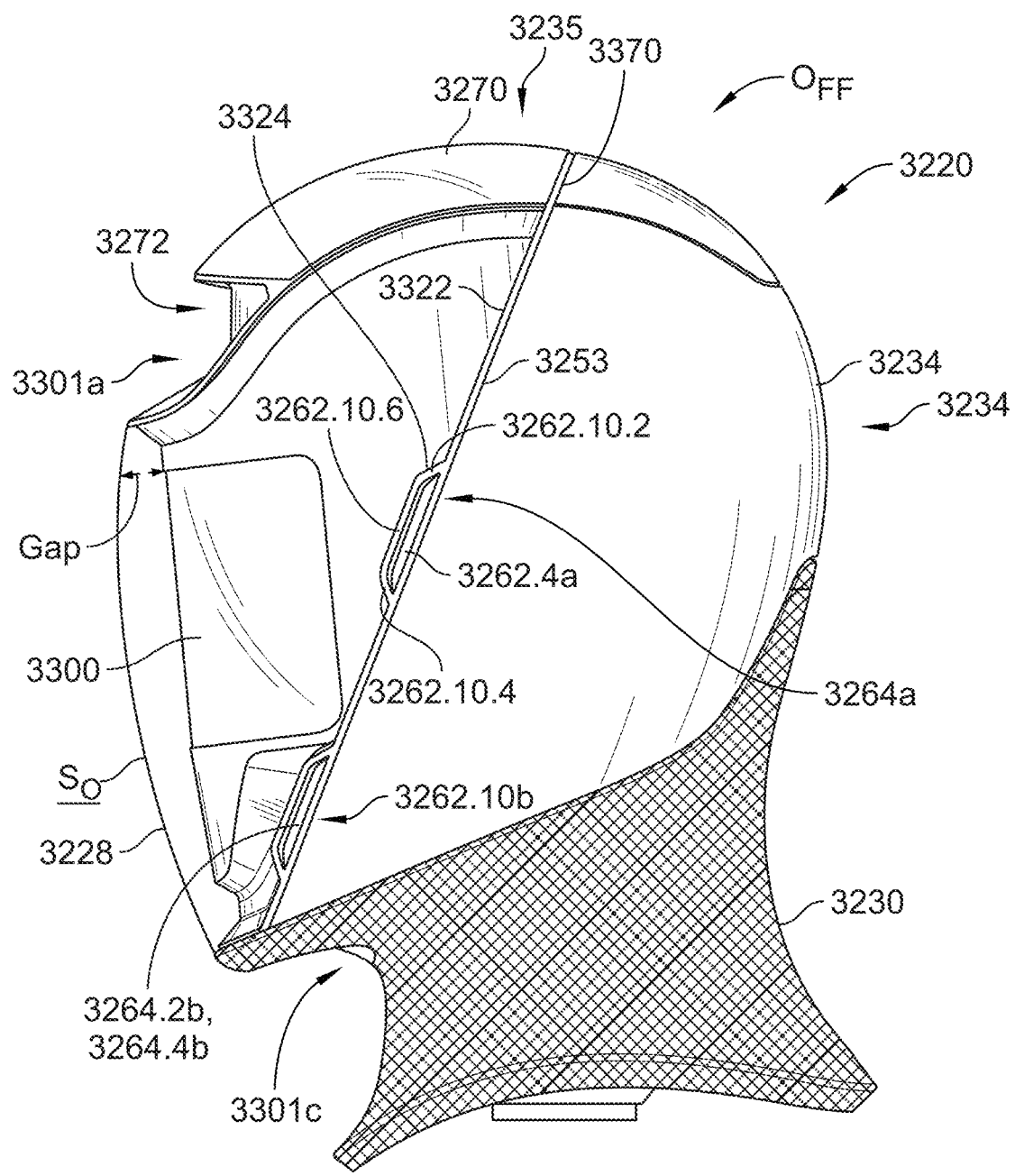
FIG. 42 is a side view of the head and neck assembly of FIG. 41.
Figure 44:
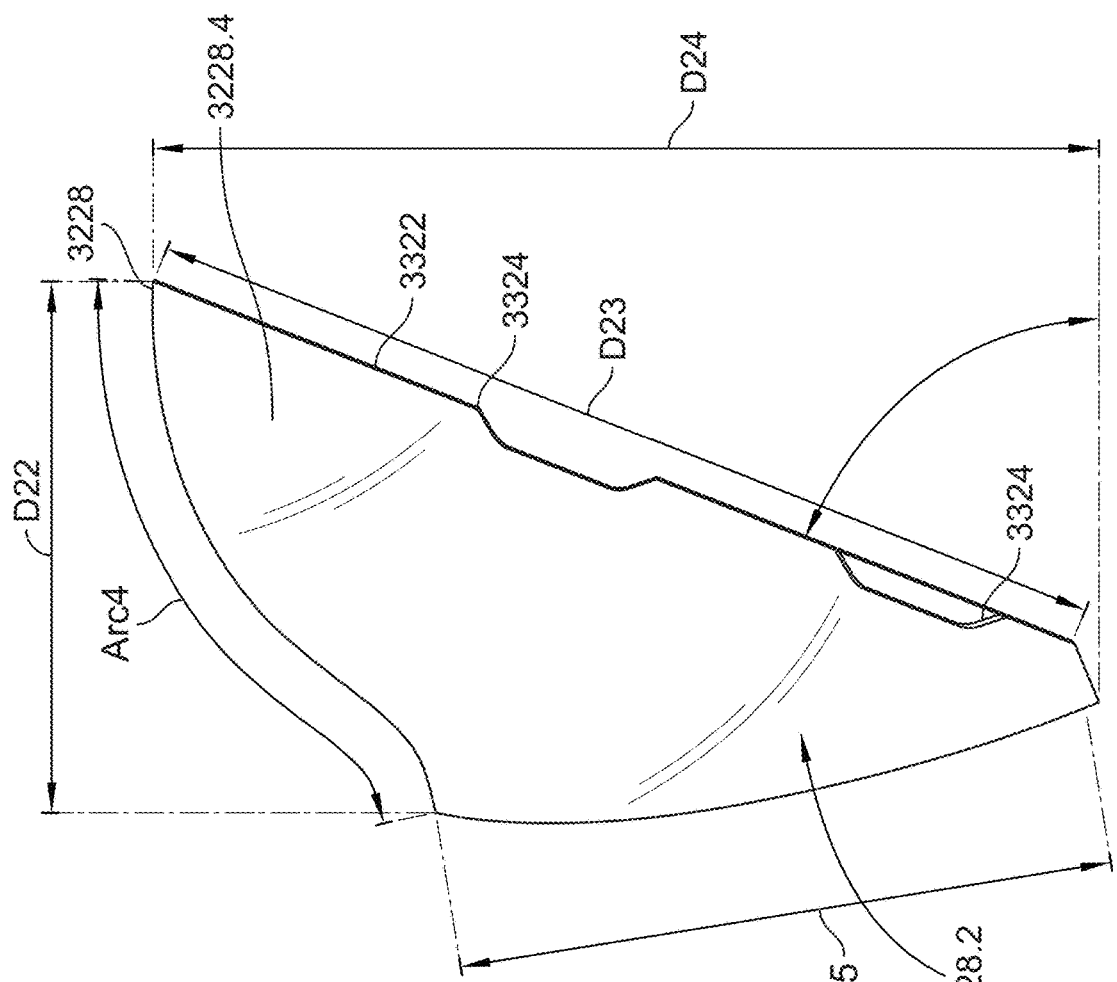
FIG. 44 is a side view of the frontal shell of the head and neck assembly of FIG. 41 showing various dimensions of the frontal shell.
Figure 43:
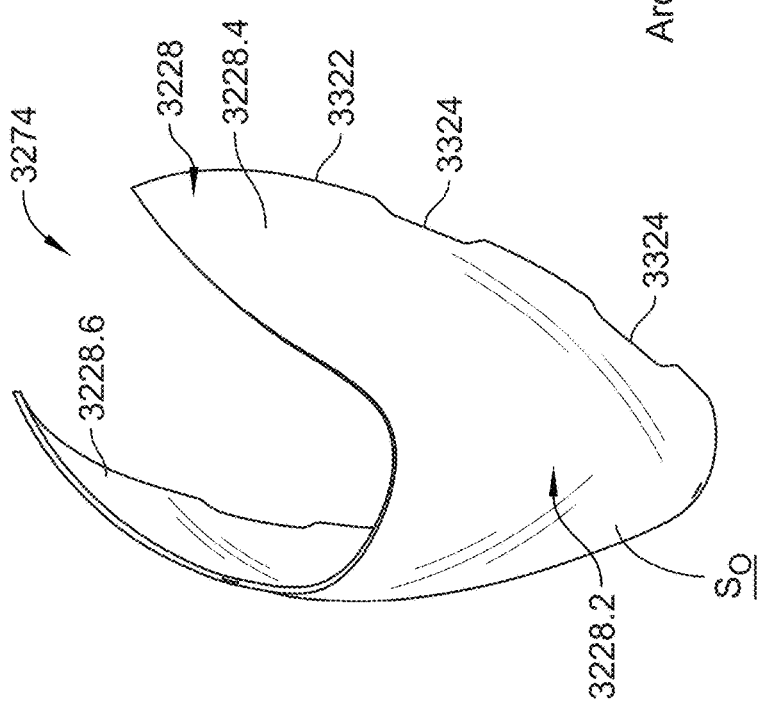
FIG. 43 is a perspective view of the frontal shell of the head and neck assembly of FIG. 41, wherein the frontal shell includes: (i) a main body, (ii) a plurality of wings that extend upward from the main body, (iii) an outer periphery with a rear edge having a plurality of recesses formed therein.
Figure 46:
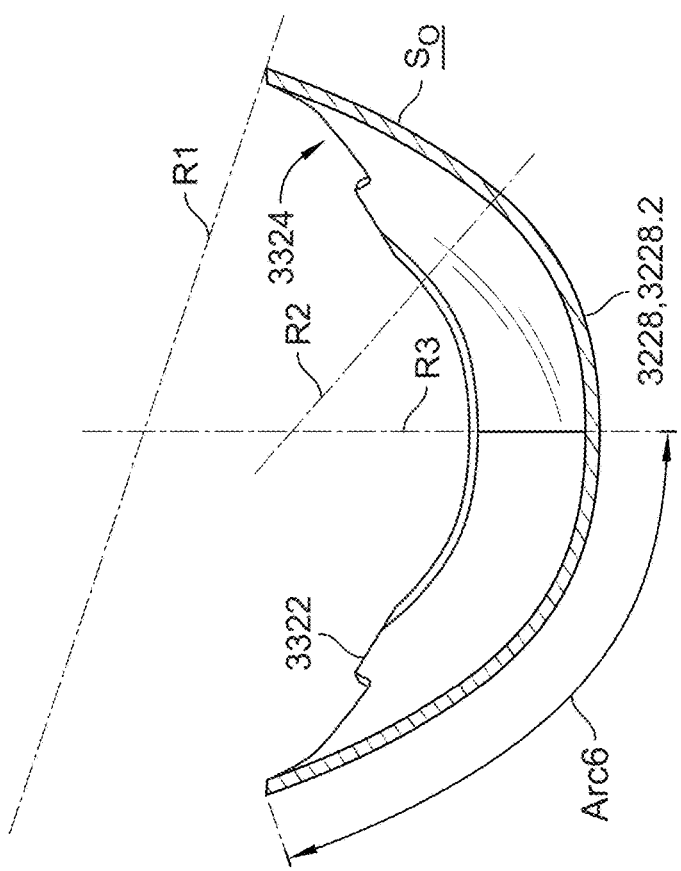
FIG. 46 is a cross-sectional view of the frontal shell of FIG. 41 taken along line 46-46 in FIG. 45 and showing three different radii of curvatures.
Figure 45:
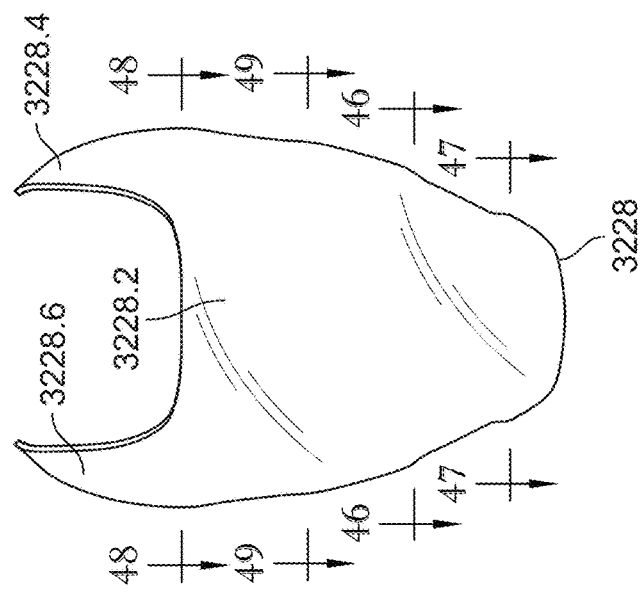
FIG. 45 is a front view of the frontal shell of the head and neck assembly of FIG. 41.
Figure 47:
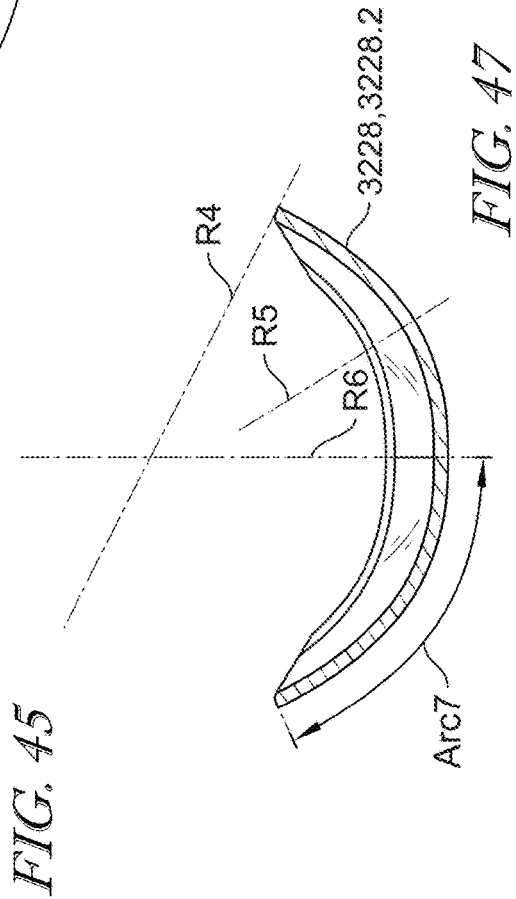
FIG. 47 is a cross-sectional view of the frontal shell of FIG. 41 taken along line 47-47 in FIG. 45 and showing three different radii of curvatures.
Figure 48:
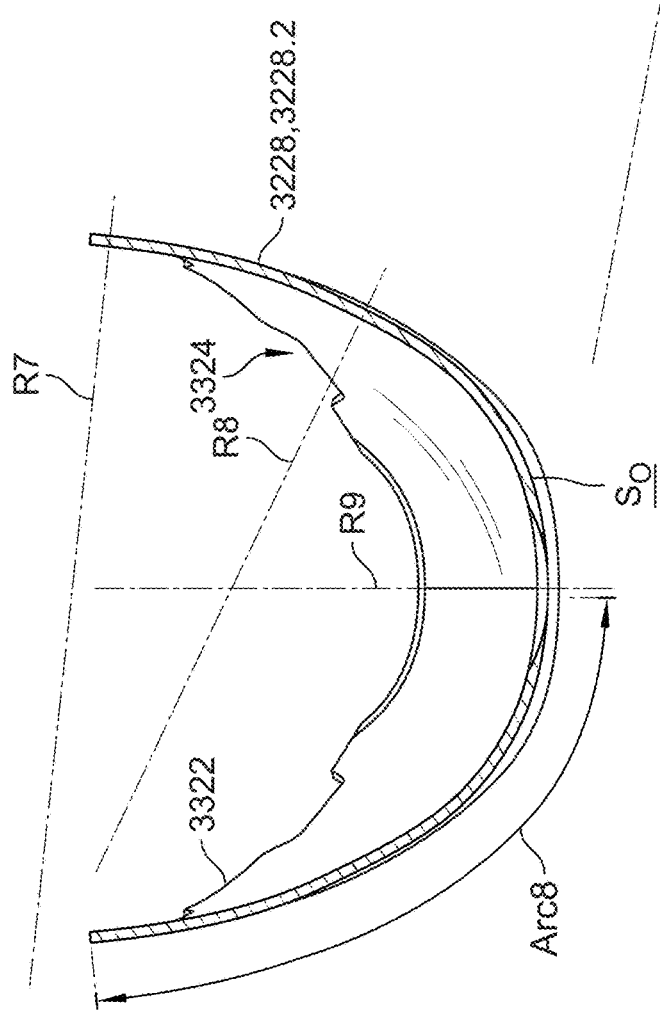
FIG. 48 is a cross-sectional view of the frontal shell of FIG. 41 taken along line 48-48 in FIG. 45 and showing three different radii of curvatures.
Figure 49:
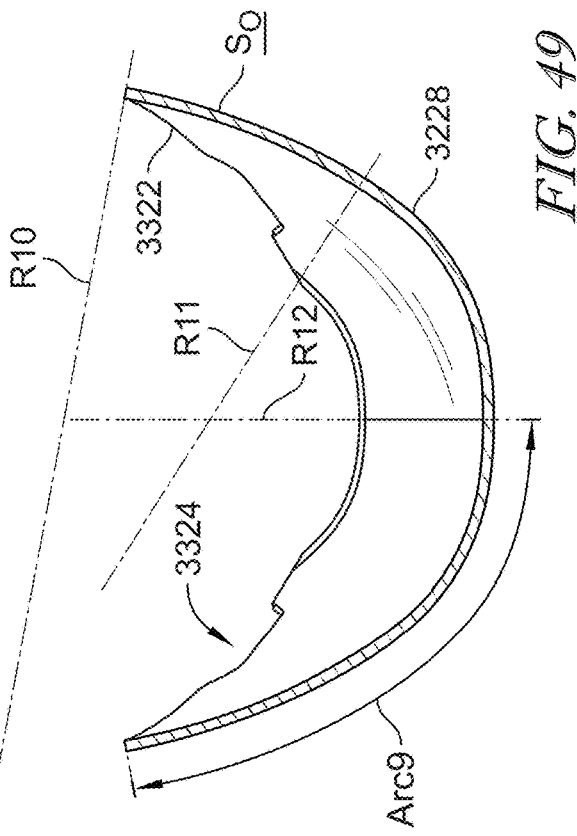
FIG. 49 is a cross-sectional view of the frontal shell of FIG. 41 taken along line 49-49 in FIG. 45 and showing three different radii of curvatures.
Figure 56:
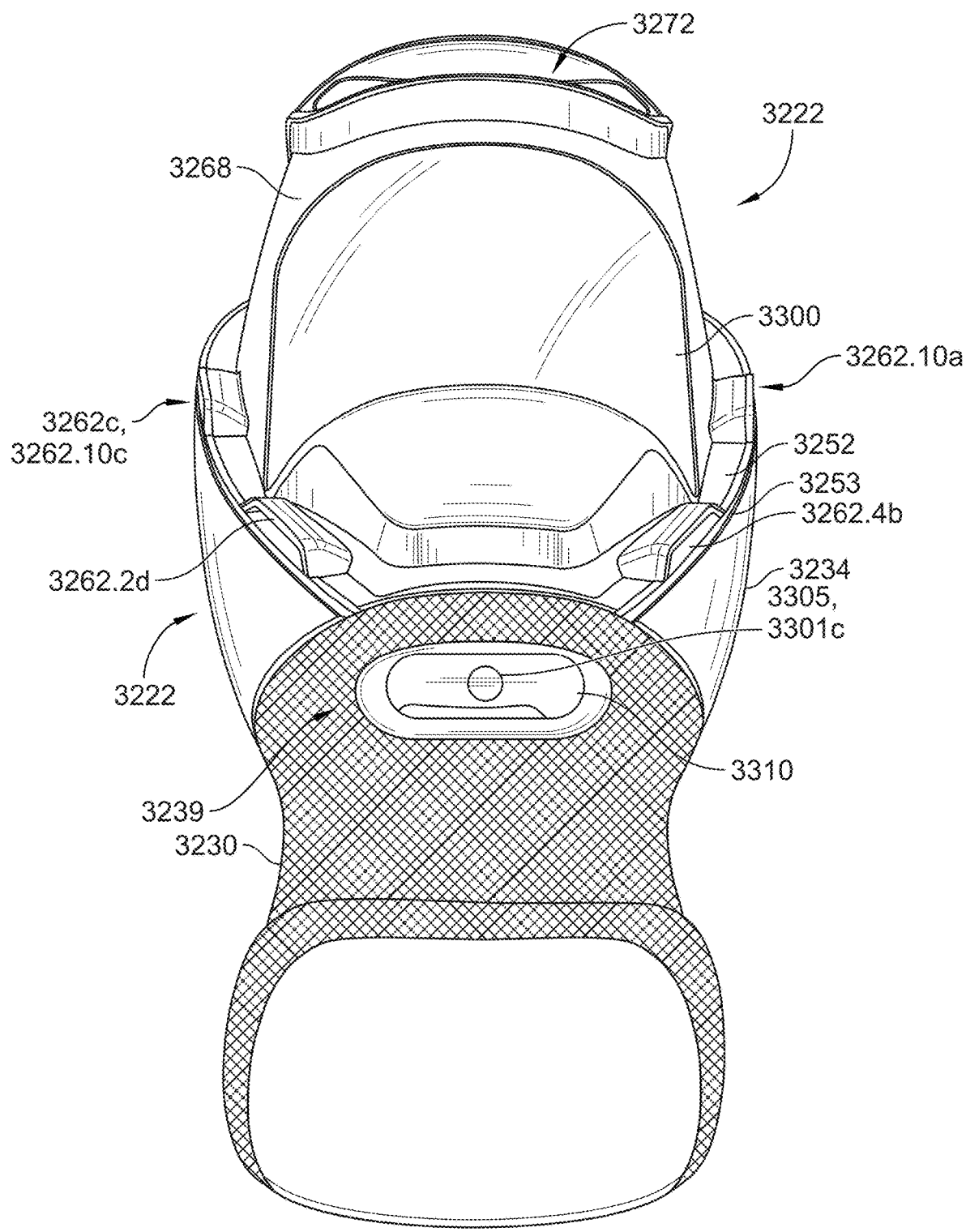
FIG. 56 is a bottom perspective view of the head and neck assembly of FIG. 54.
Figure 57A:
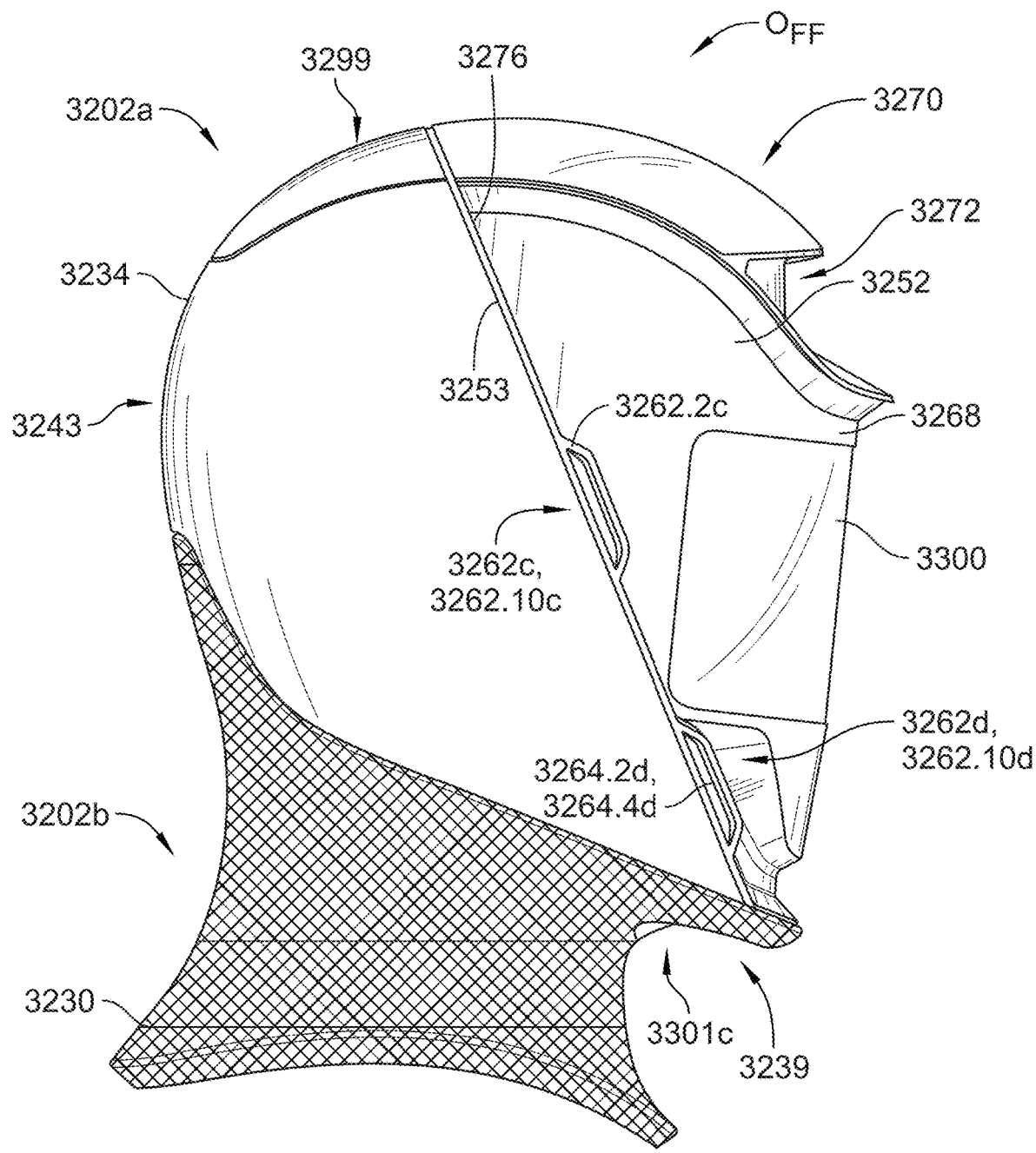
FIG. 57A is a side view of the head and neck assembly of FIG. 54.
Figure 57B:
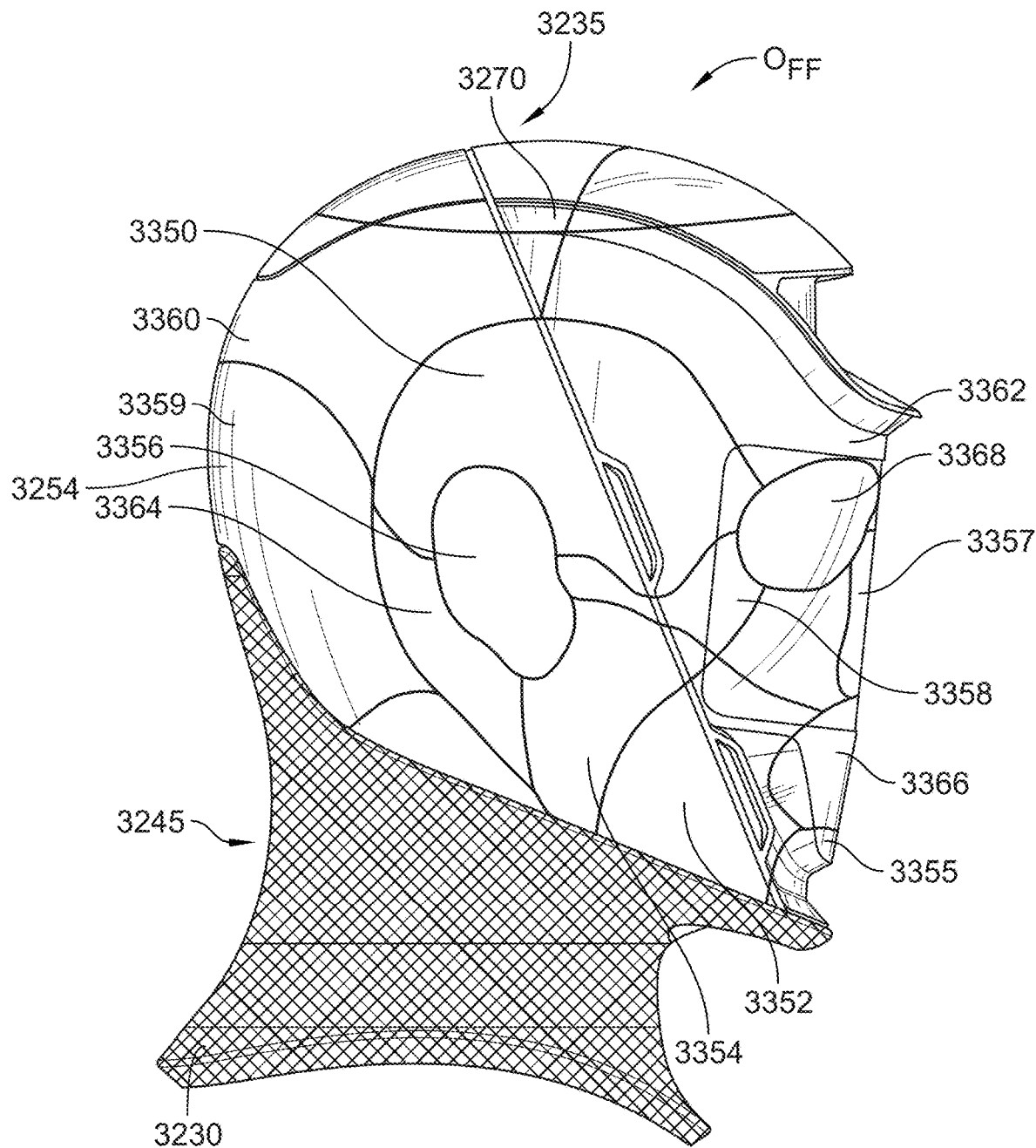
FIG. 57B is a side view of the head and neck assembly of FIG. 57A showing various anatomical regions of the head.

As shown in FIGS. 33, 34, and 56, the head portion 3202a of the third embodiment further includes a lower recess formed in a chin region of this head portion 3202a, which may include a lower sensor cover 3310. The chin region itself projects outward away from the neck portion, thereby providing a lower surface 3311 that generally faces toward the ground when the robot is upright. The lower sensor cover 3310 is coupled to this lower surface 3311 and consequently also faces generally toward the ground. The lower sensor cover 3310 is shaped to couple with the head portion 3202a in a position such that a sensor opening 3312, which is included in the lower sensor cover 3310, corresponds with a sensor 3301b, such as one or more lower camera(s) 3305 that are part of the electronics assembly 3222. The lower camera 3305 is configured to monitor the ground for obstacles and/or to monitor the movement of various parts of the humanoid robot 100. The lower sensor cover 3310 may be made of a material that does not obscure a signal intended to be detected by the sensor housed behind it. For example, the lower sensor cover 3310 may be a planar cover made of a transparent material that allows the lower cameras 3305 to receive images, preferably undistorted images. The lower sensor cover 3310 may be enclosed by the frontal shell 3228 and the neck shell 3230.

iv. Electronics Support Frame

The frontal shell 3228 is shown removed from the head portion 3202a in FIGS. 54-58. Both The frontal shell 3228 and the display 3300 are mounted to an electronics support frame, also referred to as a shielded portion 3288; this electronics support frame 3288 is essentially a combination of the intermediate cover and the electronics support of the first embodiment, now integrated into a single component. The shielded portion 3288 may include a substantial surface that extends from a curvilinear border 3290 (which surrounds an extent of the upper shell 3270 and the sensor recess 3272) down to a rim 3292. This shielded portion 3288 may include a display opening 3294 that is positioned and sized to receive the display 3300 when mounted. The display 3300 may be rectangular in overall shape but possess a curvature. The shielded portion 3288 may be shaped with contours around this display opening 3294 to properly receive the curved shape of the display 3300 without obstructing the view of the active display area. The shielded portion 3288 may also have a taper and/or include additional contours in the region between the display opening 3294 and the rim 3292. The rim 3292 may include lighting recesses or peripheral protrusions 3262a, 3262b, 3262c, 3262d, which are formed within this rim 3292 to receive the light emitting assemblies 3264a, 3264b, 3264c, 3264d of the electronics assembly 3222. Although the illustrative embodiment shown in FIGS. 54-58 depicts the frontal shell 3228 as being sized to fit within the shielded portion 3288, it should be understood that the frontal shell 3228 may occupy any portion or ratio of the robot's head portion 3202a, may have any suitable configuration, or in some cases, may even be omitted. In some embodiments, therefore, the frontal shell 3228 is an optional component.

3. Fourth Embodiment

Figure 58:
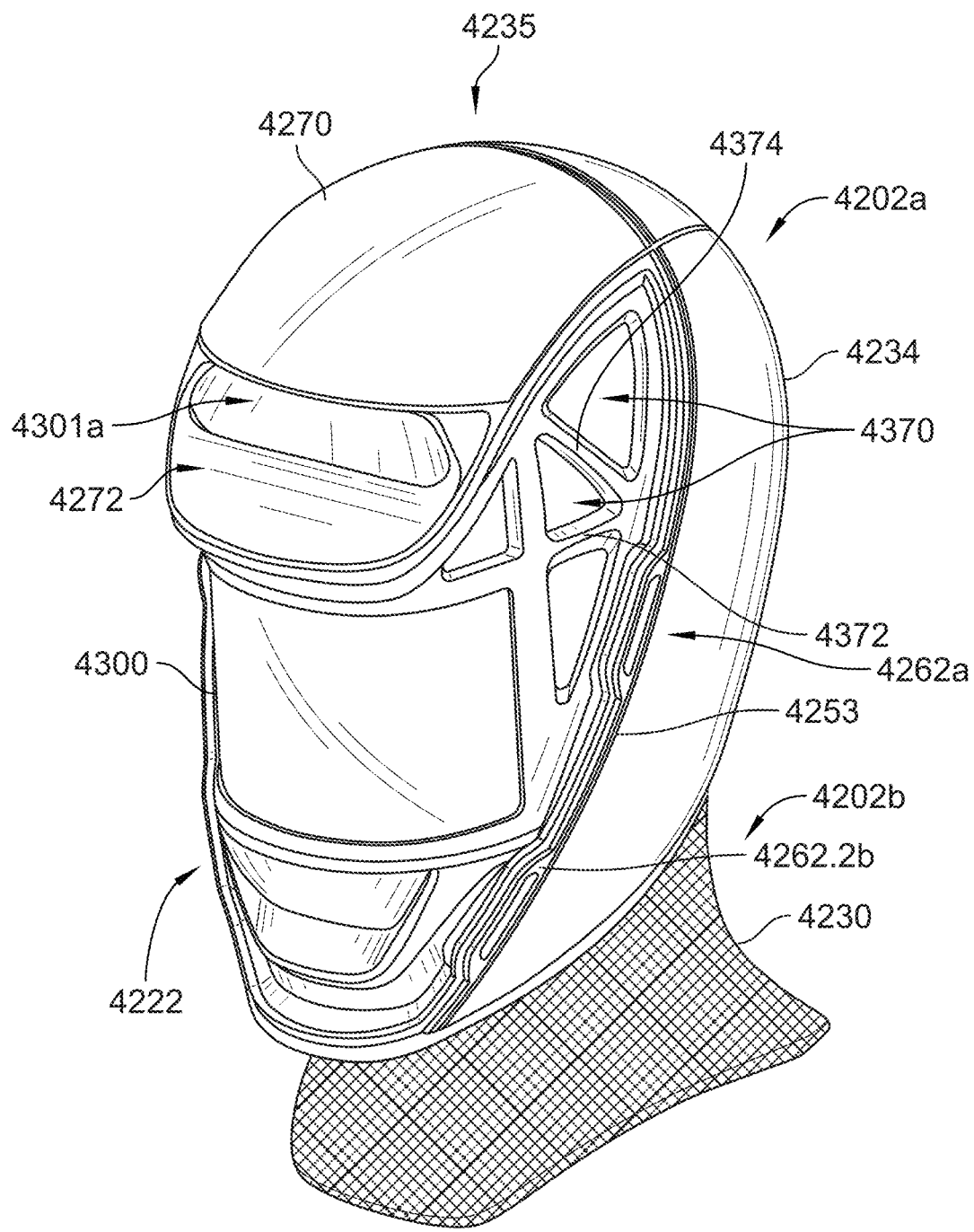
FIG. 58 is a perspective view of a fourth embodiment of a head and neck assembly, wherein the frontal shell is omitted from the housing assembly, the electronics frame further includes a plurality of support ribs, and the electronics assembly further includes a plurality of side displays coupled to the electronics frame.
Figure 59:
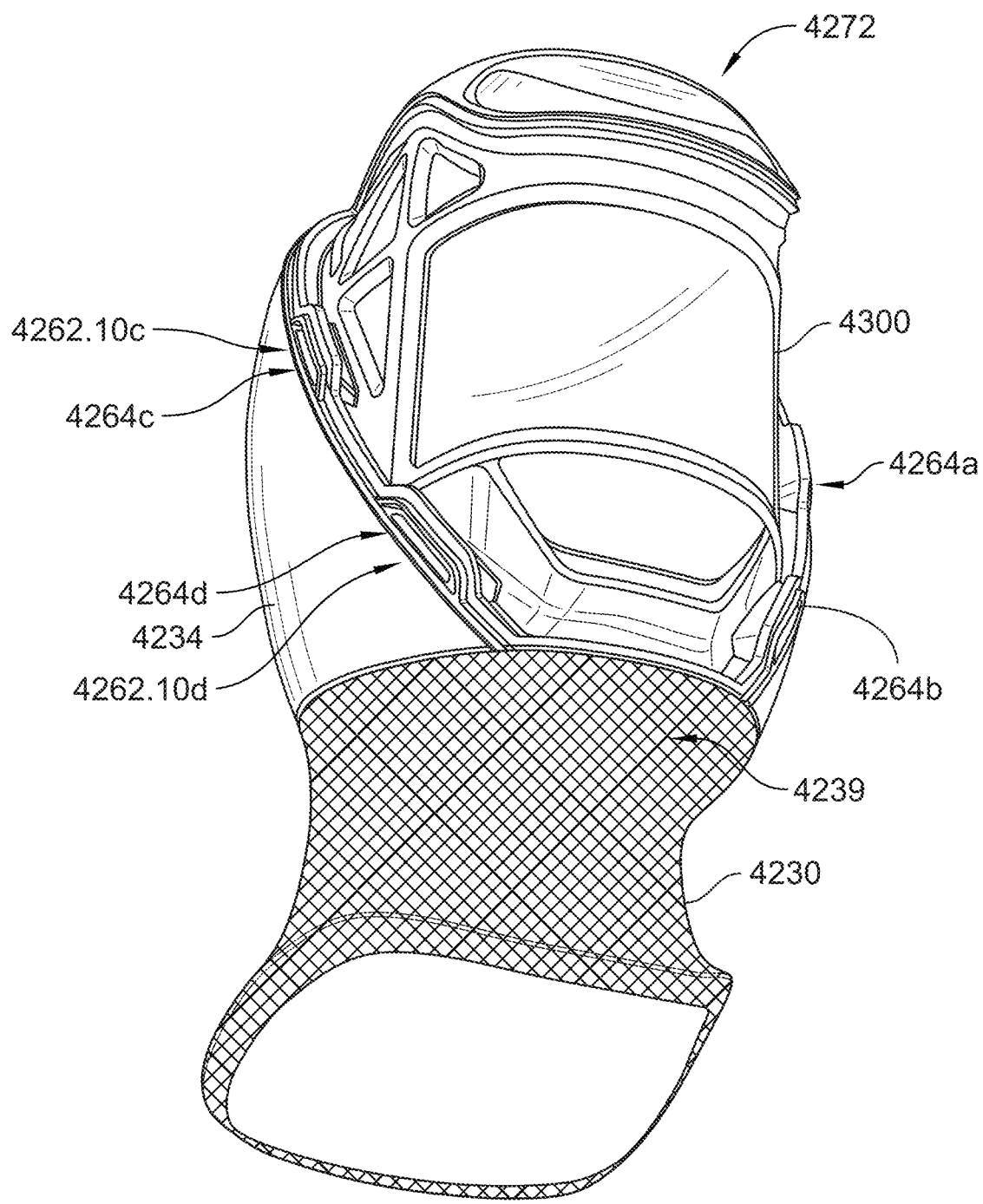
FIG. 59 is a bottom perspective view of the head and neck assembly of FIG. 58.

Similar to the head and neck assemblies 202, 2202, and 3202 described above in connection with FIGS. 1-27, FIGS. 28-31B, and FIGS. 32-57B respectively, FIGS. 58-59 illustrate a fourth embodiment of a head and neck assembly, designated as 4202. For the sake of brevity, the detailed disclosure provided above in connection with the head and neck assemblies 202, 2202, and 3202 will not be fully repeated below, but it should be understood that like numerals generally represent generally similar or like structures in the various embodiments. For example, the disclosure regarding the display 300 applies equally to the display 4300 of this fourth embodiment. Further, it should be understood that the functionality and operation of the head and neck assembly 4202 are similar or identical to the features and functionality disclosed with respect to the head and neck assemblies 202, 2202, and 3202. It should also be understood that any one or more features of the head and neck assemblies 202, 2202, 3202 may be used in combination with those disclosed with respect to the head and neck assembly 4202, and, conversely, that any one or more features of the head and neck assembly 4202 may be used in combination with those disclosed with respect to the head and neck assemblies 202, 2202, 3202.

The primary difference between the head and neck assembly 3202 (third embodiment) and the head and neck assembly 4202 (fourth embodiment) is the fact that the shielded portion 4288 of the fourth embodiment is ribbed, and the head portion 4202*a* of this fourth embodiment lacks a lower recessed sensor region in the chin area (which was present as 3310 in the third embodiment). As shown in FIGS. 58 and 59, the shielded portion 4288 can include a plurality of ribs 4372, 4374 that define one or more recessed areas 4370 between them. These ribs 4372, 4374 can provide additional structural reinforcement to areas adjacent to the electronics assembly 4222. The recessed areas 4370 can simply be part of the structural shielded portion 4288 or, alternatively, can themselves house additional displays and/or lights that are used to convey information and indications to users. Although not explicitly shown in FIGS. 58 and 59, the head portion 4202*a* of this fourth embodiment can either include or omit a frontal shell.

4. Fifth Embodiment

Figure 60:
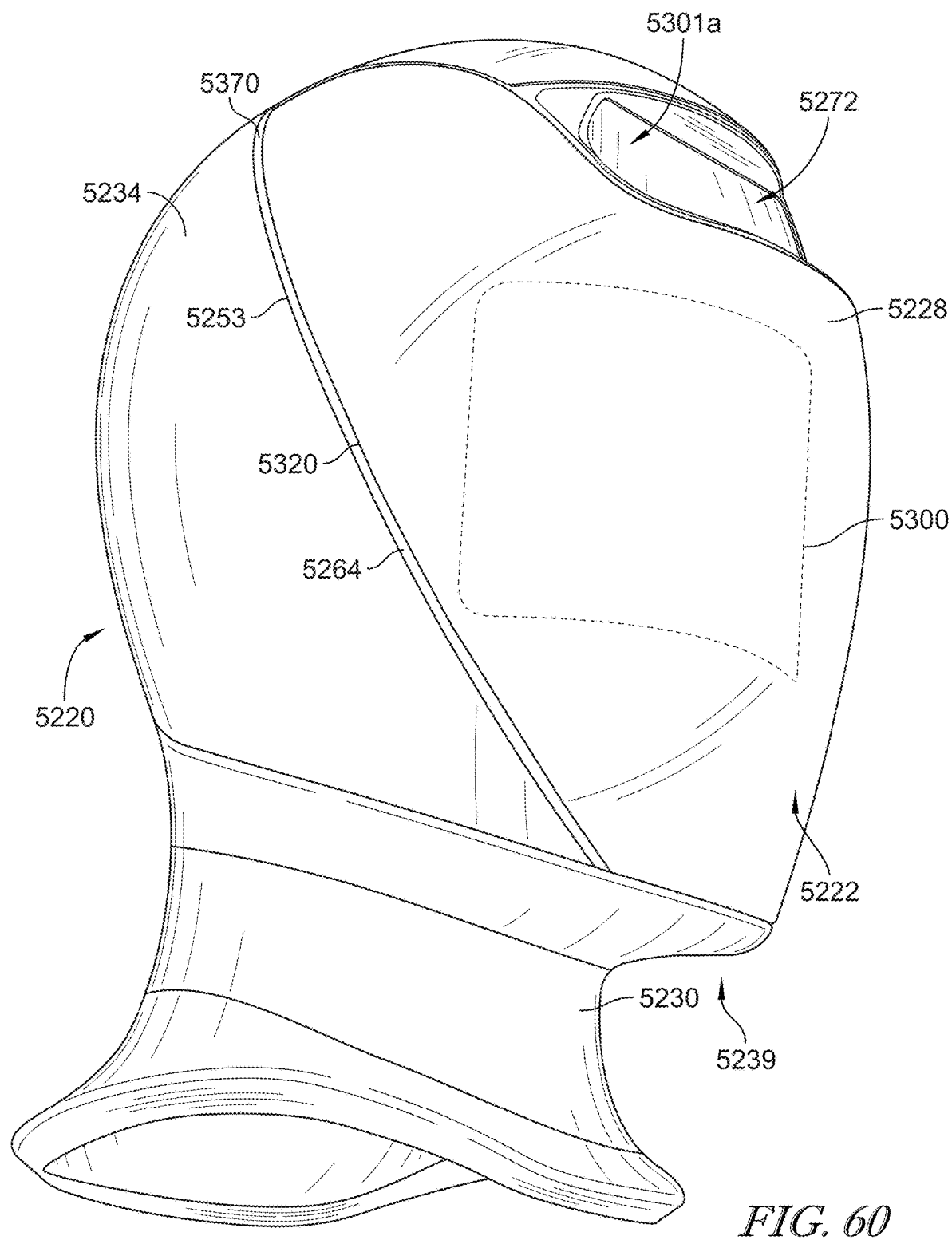
FIG. 60 is a perspective view of a fifth embodiment of a head and neck assembly, wherein the illumination assembly includes a plurality of light emitters that are positioned adjacent to a majority of the rear edge of said frontal shell.

Similar to the head and neck assemblies 202, 2202, 3202, and 4202 described above in connection with FIGS. 1-27, FIGS. 28-31B, FIGS. 32-57B, and FIGS. 58-59 respectively, FIG. 60 illustrates a fifth embodiment of a head and neck assembly, designated as 5202. For the sake of brevity, the detailed disclosure provided above in connection with the head and neck assemblies 202, 2202, 3202, and 4202 will not be fully repeated below, but it should be understood that like numerals generally represent generally similar or like structures in the various embodiments. For example, the disclosure regarding the display 300 applies equally to the display 5300 of this fifth embodiment. Further, it should be understood that the functionality and operation of the head and neck assembly 5202 are similar or identical to the features and functionality disclosed with respect to the head and neck assemblies 202, 2202, 3202, and 4202. It should also be understood that any one or more features of the head and neck assemblies 202, 2202, 3202, 4202 may be used in combination with those disclosed with respect to the head and neck assembly 5202, and, conversely, that any one or more features of the head and neck assembly 5202 may be used in combination with those disclosed with respect to the head and neck assemblies 202, 2202, 3202, 4202.

The primary difference between the head and neck assembly 3202 and the head and neck assembly 5202 (fifth embodiment) is the fact that the head portion 5202*a* of the fifth embodiment includes only one continuous light emitting assembly 5264, and this head portion 5202*a* also lacks a lower recessed sensor region in the chin area. As shown in FIG. 60, the light emitting assembly 5264 in this fifth embodiment is in the form of a band and extends along the interface 5320 between the frontal shell 5228 and the rear shell 5234. The light emitting assembly 5264 extends along the entire interface 5320 in the illustrative embodiment shown, but it may extend only partway along this interface 5320 in some alternative embodiments. In other words, the light emitting assembly 5264 may extend completely around the periphery of the frontal shell 5228. The outer surface of this light emitting assembly 5264 may be flush with the outer surfaces of the frontal shell 5228 and rear shell 5234, or it may be recessed relative to one or both of these front and/or rear shells 5228, 5234.

5. Sixth Embodiment

Figure 61:
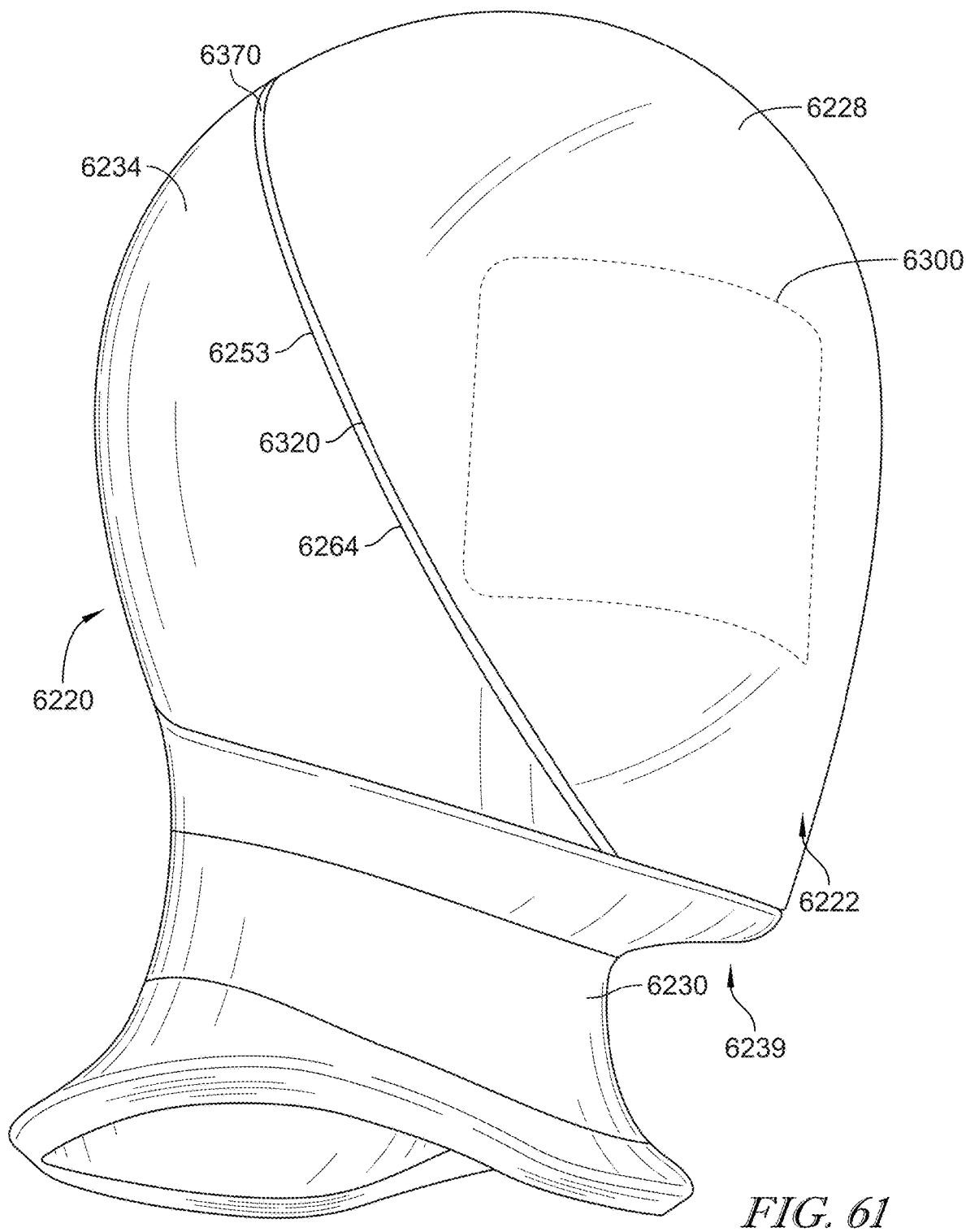
FIG. 61 is a perspective view of a sixth embodiment of a head and neck assembly, wherein the upper recessed sensor zone of the fifth embodiment has been omitted.

Similar to the head and neck assemblies 202, 2202, 3202, 4202, and 5202 described above in connection with FIGS. 1-27, FIGS. 28-31B, FIGS. 32-57B, FIGS. 58-59, and FIG. 60 respectively, FIG. 61 illustrates a sixth embodiment of a head and neck assembly, designated as 6202. For the sake of brevity, the detailed disclosure provided above in connection with the head and neck assemblies 202, 2202, 3202, 4202, and 5202 will not be fully repeated below, but it should be understood that like numerals generally represent generally similar or like structures in the various embodiments. For example, the disclosure regarding the display 300 applies equally to the display 6300 of this sixth embodiment. Further, it should be understood that the functionality and operation of the head and neck assembly 6202 are similar or identical to the features and functionality disclosed with respect to the head and neck assemblies 202, 2202, 3202, 4202, and 5202. It should also be understood that any one or more features of the head and neck assemblies 202, 2202, 3202, 4202, 5202 may be used in combination with those disclosed with respect to the head and neck assembly 6202, and, conversely, that any one or more features of the head and neck assembly 6202 may be used in combination with those disclosed with respect to the head and neck assemblies 202, 2202, 3202, 4202, 5202. The primary difference noted for this sixth embodiment (head and neck assembly 6202) compared to some earlier embodiments is the fact that the head portion 6202*a* of the sixth embodiment lacks a front recessed sensor region. Like the fifth embodiment, the head portion 6202*a* of the sixth embodiment includes only one continuous light emitting assembly 6264 that extends along the interface 6320 between the frontal shell 6228 and the rear shell 6234.

6. Seventh Embodiment

Figure 62:
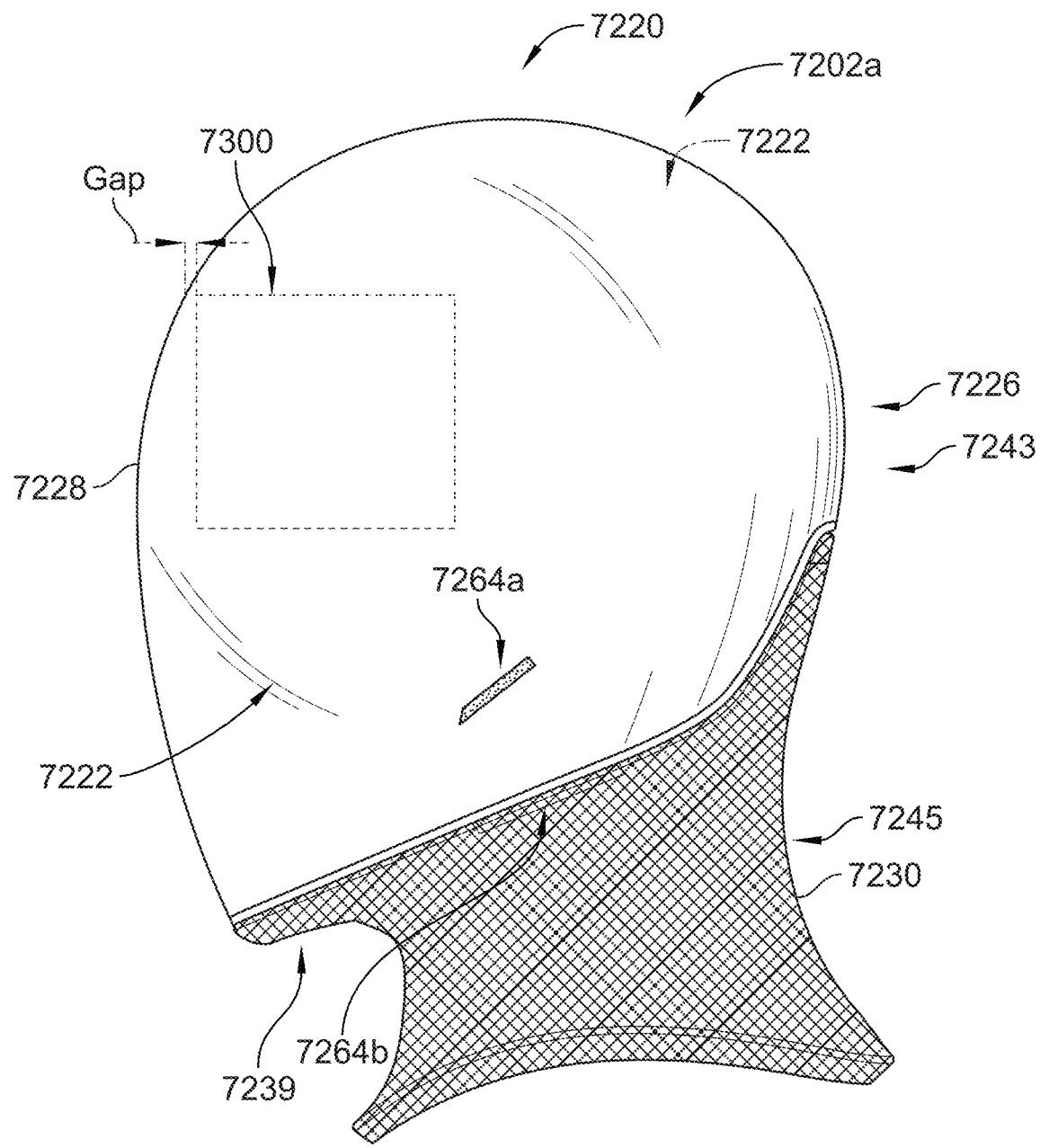
FIG. 62 is a side view of a seventh embodiment of a head and neck assembly wherein the rear shell has been omitted and the frontal shell encases a majority of the head.

Similar to the head and neck assemblies 202, 2202, 3202, 4202, 5202, and 6202 described above in connection with FIGS. 1-27, FIGS. 28-31B, FIGS. 32-57B, FIGS. 58-59, FIG. 60, and FIG. 61 respectively, FIG. 62 illustrates a seventh embodiment of a head and neck assembly, designated as 7202. For the sake of brevity, the detailed disclosure provided above in connection with the head and neck assemblies 202, 2202, 3202, 4202, 5202, and 6202 will not be fully repeated below, but it should be understood that like numerals generally represent generally similar or like structures in the various embodiments. For example, the disclosure regarding the display 300 applies equally to the display 7300 of this seventh embodiment. Further, it should be understood that the functionality and operation of the head and neck assembly 7202 are similar or identical to the features and functionality disclosed with respect to the head and neck assemblies 202, 2202, 3202, 4202, 5202, and 6202. It should also be understood that any one or more features of the head and neck assemblies 202, 2202, 3202, 4202, 5202, 6202 may be used in combination with those disclosed with respect to the head and neck assembly 7202, and, conversely, that any one or more features of the head and neck assembly 7202 may be used in combination with those disclosed with respect to the head and neck assemblies 202, 2202, 3202, 4202, 5202, 6202. The primary difference between the head and neck assembly 6202 (sixth embodiment) and the head and neck assembly 7202 (seventh embodiment) is the fact that the frontal shell 7228 of the seventh embodiment provides substantially all of the exterior surface of the head portion 7202*a*. As shown in FIG. 62, the head portion 7202*a* of this seventh embodiment further includes a light emitting assembly 7264*a* that is coupled to this prominent frontal shell 7228. The neck shell 7230 (associated with neck portion 7202*b*) can also include a second light emitting assembly 7264*b* located adjacent to an edge of the frontal shell 7228.

G. Body Illumination Assembly

As previously described in detail, the head portion 202*a* (and its variants) includes a head illumination assembly, exemplified by light emitting assembly 264*a*-264*d* (and its variants 2264, 3264, etc.) located at the shield interface 320 (and its variants). The humanoid robot 100 can further include additional illumination assemblies located in other areas of the robot 100, such as a torso illumination assembly (with emitters 330), a thigh illumination assembly (with emitters 332), a neck illumination assembly (with emitters 334), a shoulder illumination assembly (with emitters 336), a hand/wrist illumination assembly (with emitters 338), a knee illumination assembly (with emitters 340), and a hip illumination assembly (with emitters 342). The illumination assemblies disclosed herein are intended to meet the standards described in FDA CFR Title 21 part 1040.10, titled "Performance standards for Light-Emitting Products," and ANSI LIA Z136.1, titled "Safe Use of Lasers," at the time of filing this application and are fully incorporated herein by reference.

1. Torso Illumination Assembly

Figure 63A:
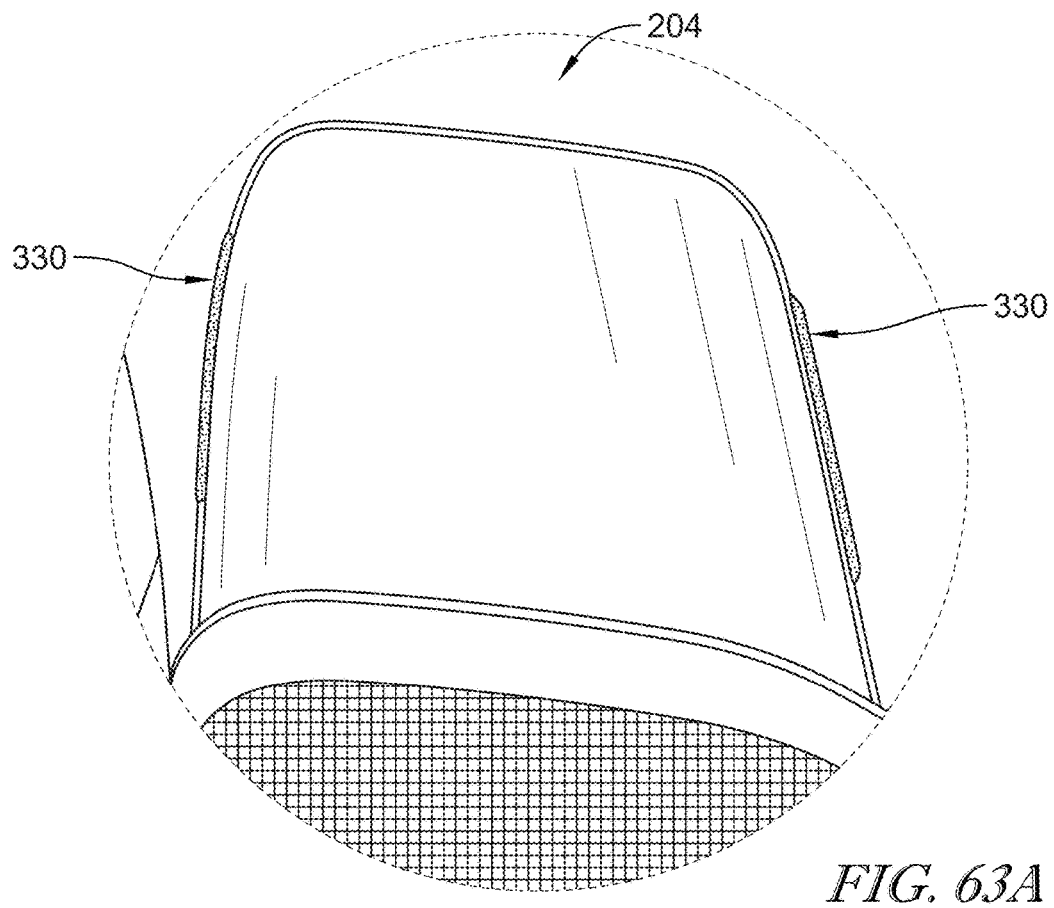
FIG. 63A is an enlarged view of a portion of a torso region of the humanoid robot of FIG. 1, wherein said torso includes a plurality of light emitters.

The torso illumination assembly includes at least one, and preferably a plurality of, light emitters 330 that are located along a front surface of the torso 204, generally corresponding to a chest region of the humanoid robot 100, as shown in FIG. 63A. These torso light emitters 330 are illustratively embodied as elongated light strips; however, the light emitters 330 can have any suitable shape or structure as dictated by design requirements. The torso light emitters 330 can be operated in the same way as the head light emitting assembly 264*a*-264*d* described above. The torso light emitters 330 can utilize one or more of the following light technologies: LCD, LED, OLED, LPD, IMOD, QDLED, mLED, AMOLED, SED, FED, plasma, electronic paper or EPD, MicroLED, quantum dot display, LED backlit LCD, WLCD, OLCD, transparent OLED, PMOLED, capacitive touchdisplay elements, resistive touchdisplay elements, monochrome emitters, color emitters, or any combination of the above, or any other known technology or light-emitting feature.

2. Thigh Illumination Assembly

Figure 63B:
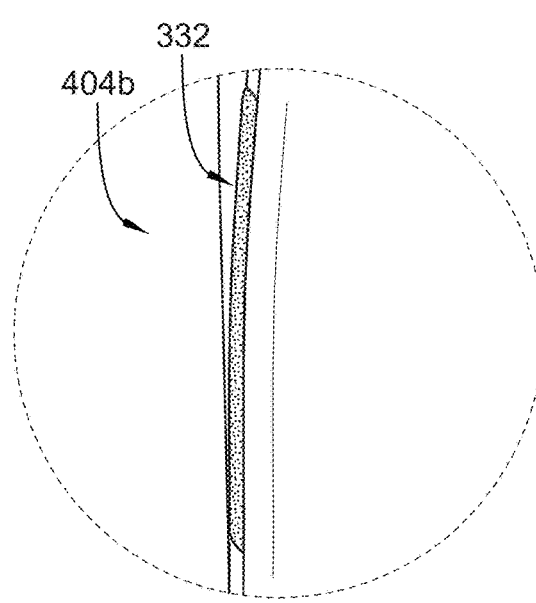
FIG. 63B is an enlarged view of a portion of a right thigh region of the humanoid robot of FIG. 1, wherein said thigh region includes at least one light emitter.
Figure 63C:
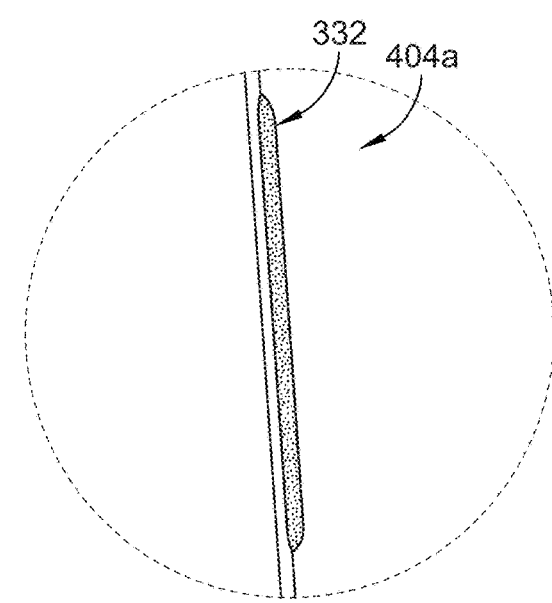
FIG. 63C is an enlarged view of a portion of a left thigh region of the humanoid robot of FIG. 1, wherein said thigh region includes at least one light emitter.
Figure 64:
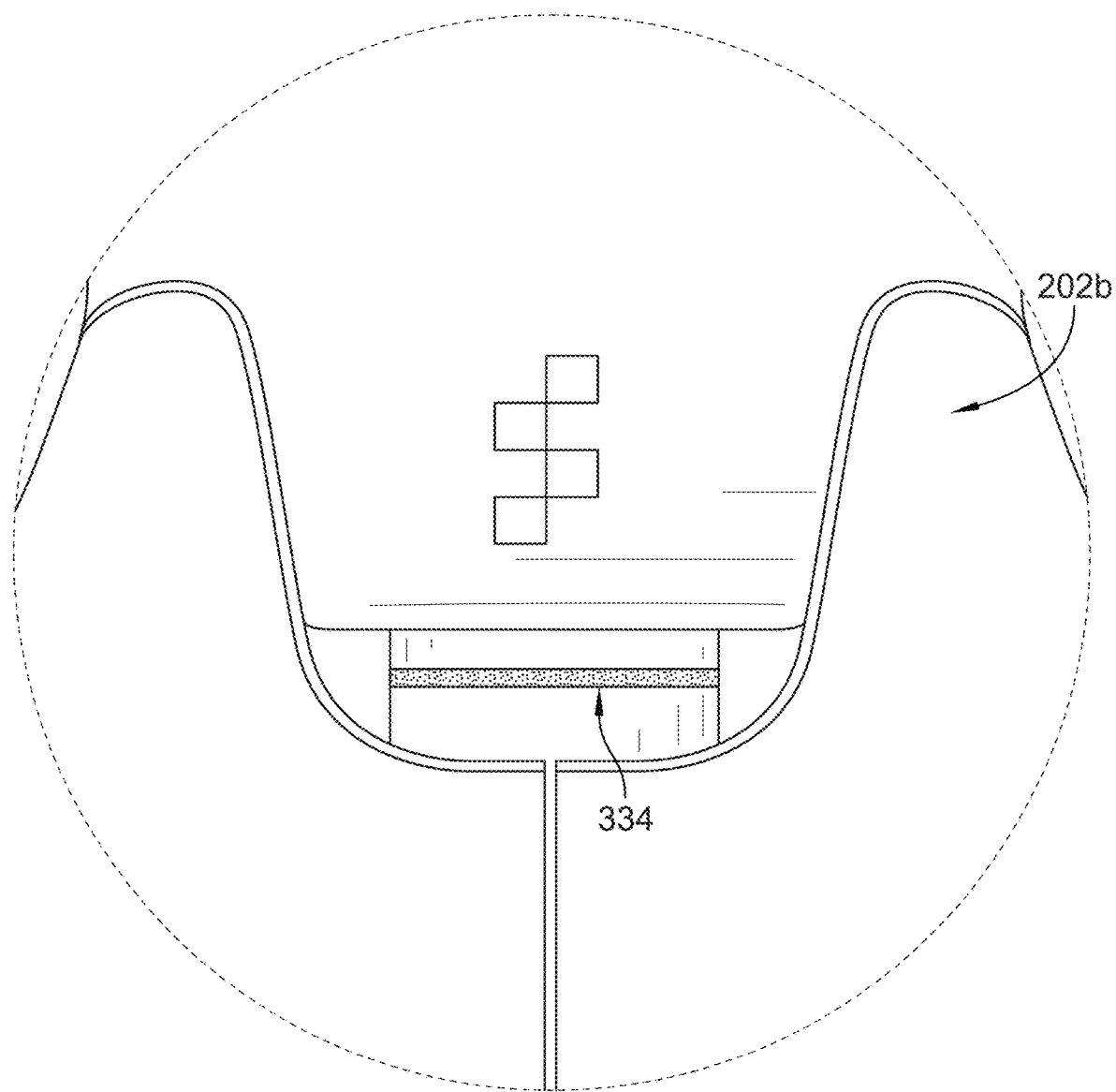
FIG. 64 is an enlarged view of a portion of the head and neck region of the humanoid robot of FIG. 6, wherein said neck includes at least one light emitter.

The thigh illumination assembly includes at least one, and preferably a plurality of, light emitters 332 that are located along a front surface of each thigh 404*a*, 404*b*, generally corresponding to a quadricep region of the humanoid robot 100, as shown in FIGS. 63B and 63C. These thigh light emitters 332 are illustratively embodied as elongated light strips; however, the light emitters 332 can have any suitable shape or structure. The thigh light emitters 332 can be operated in the same way as the head light emitting assembly 264*a*-264*d* described above. The thigh light emitters 332 can utilize one or more of the following light technologies: LCD, LED, OLED, LPD, IMOD, QDLED, mLED, AMOLED, SED, FED, plasma, electronic paper or EPD, MicroLED, quantum dot display, LED backlit LCD, WLCD, OLCD, transparent OLED, PMOLED, capacitive touchdisplay elements, resistive touchdisplay elements, monochrome emitters, color emitters, or any combination of the above, or any other known technology or light-emitting feature.

3. Neck Illumination Assembly

The neck illumination assembly includes at least one, and preferably a plurality of, light emitters 334 that are located along a rear surface of the neck portion 202*b*, specifically at the base of the head portion 202*a*, as shown in FIG. 63A. This neck light emitter (or emitters) 334 is illustratively embodied as an elongated light strip; however, the light emitters 334 can have any suitable shape or structure. The neck light emitters 334 can be operated in the same way as the head light emitting assembly 264*a*-264*d* described above. The neck light emitters 334 can utilize one or more of the following light technologies: LCD, LED, OLED, LPD, IMOD, QDLED, mLED, AMOLED, SED, FED, plasma, electronic paper or EPD, MicroLED, quantum dot display, LED backlit LCD, WLCD, OLCD, transparent OLED, PMOLED, capacitive touchdisplay elements, resistive touchdisplay elements, monochrome emitters, color emitters, or any combination of the above, or any other known technology or light-emitting feature.

4. Shoulder Illumination Assembly

Figure 65A:
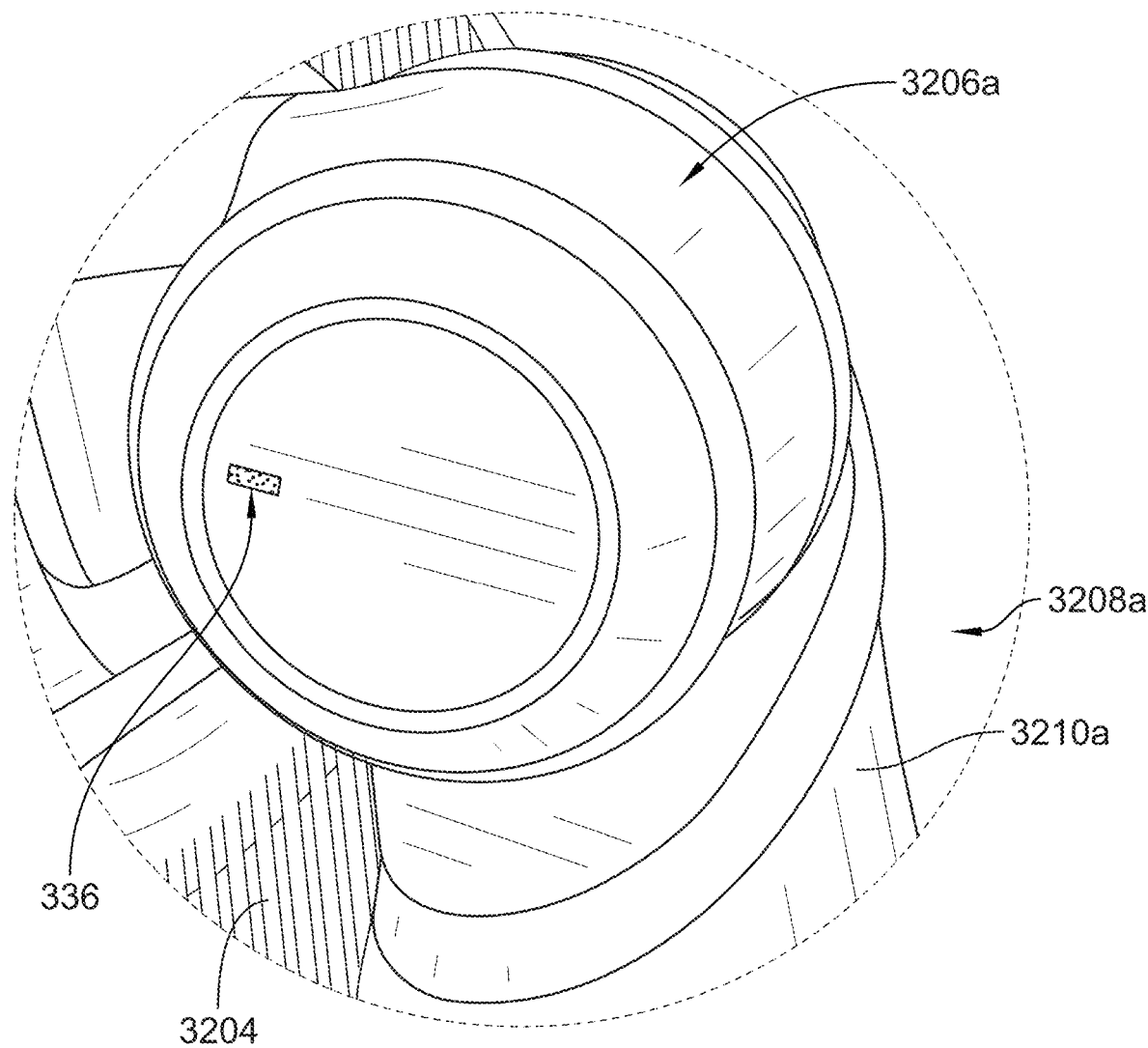
FIG. 65A is an enlarged view of a portion of a shoulder region of the humanoid robot of FIG. 32, wherein said shoulder region includes at least one light emitter.

The shoulder illumination assembly includes at least one, and preferably a plurality of, light emitters 336 that are located along a front surface of each shoulder 206*a*, 206*b*, as shown in FIG. 65A. These shoulder light emitters 336 are illustratively embodied as elongated light strips; however, the light emitters 336 can have any suitable shape or structure. The shoulder light emitters 336 can be operated in the same way as the head light emitting assembly 264*a*-264*d* described above. The shoulder light emitters 336 can utilize one or more of the following light technologies: LCD, LED, OLED, LPD, IMOD, QDLED, mLED, AMOLED, SED, FED, plasma, electronic paper or EPD, MicroLED, quantum dot display, LED backlit LCD, WLCD, OLCD, transparent OLED, PMOLED, capacitive touchdisplay elements, resistive touchdisplay elements, monochrome emitters, color emitters, or any combination of the above, or any other known technology or light-emitting feature.

5. Hip Illumination Assembly

Figure 65B:
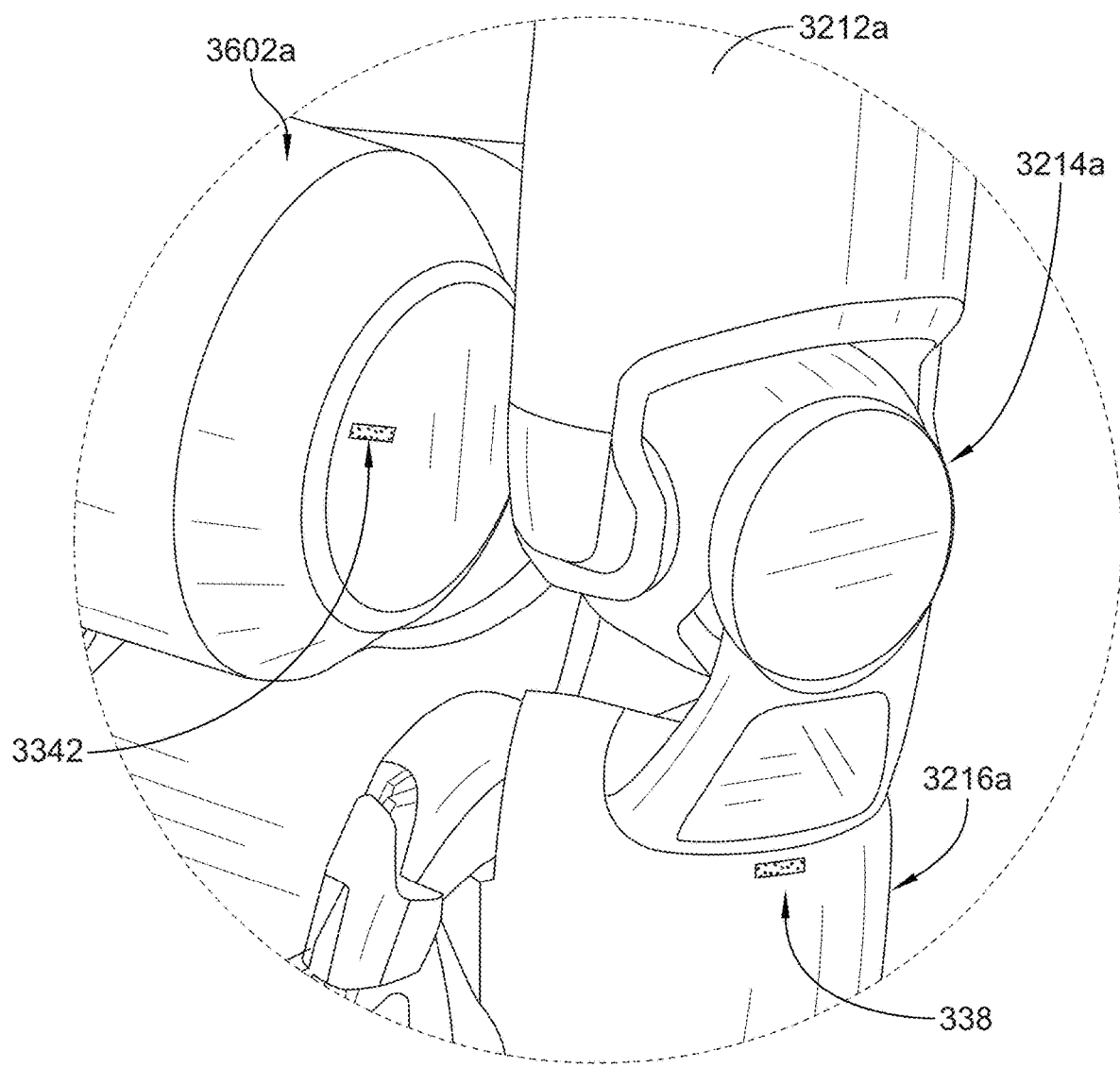
FIG. 65B is an enlarged view of a portion of a wrist region of the humanoid robot of FIG. 32, wherein said wrist region includes at least one light emitter.

The hip illumination assembly includes at least one, and preferably a plurality of, light emitters 342 that are located along a surface of each hip, as shown in FIG. 65B. These hip light emitters 342 are illustratively embodied as elongated light strips; however, the light emitters 342 can have any suitable shape or structure. The hip light emitters 342 can be operated in the same way as the head light emitting assembly 264*a*-264*d* described above. The hip light emitters 342 can utilize one or more of the following light technologies: LCD, LED, OLED, LPD, IMOD, QDLED, mLED, AMOLED, SED, FED, plasma, electronic paper or EPD, MicroLED, quantum dot display, LED backlit LCD, WLCD, OLCD, transparent OLED, PMOLED, capacitive touchdisplay elements, resistive touchdisplay elements, monochrome emitters, color emitters, or any combination of the above, or any other known technology or light-emitting feature.

6. Hand Illumination Assembly

The hand illumination assembly includes at least one, and preferably a plurality of, light emitters 338 that are located along a surface of each hand 216*a*, 216*b*, as shown in FIG. 65B. These hand light emitters 338 are illustratively embodied as elongated light strips; however, the light emitters 338 can have any suitable shape or structure. The hand light emitters 338 can be operated in the same way as the head light emitting assembly 264a-264d described above. The hand light emitters 338 can utilize one or more of the following light technologies: LCD, LED, OLED, LPD, IMOD, QDLED, mLED, AMOLED, SED, FED, plasma, electronic paper or EPD, MicroLED, quantum dot display, LED backlit LCD, WLCD, OLCD, transparent OLED, PMOLED, capacitive touchdisplay elements, resistive touchdisplay elements, monochrome emitters, color emitters, or any combination of the above, or any other known technology or light-emitting feature.

7. Knee Illumination Assembly

Figure 65C:
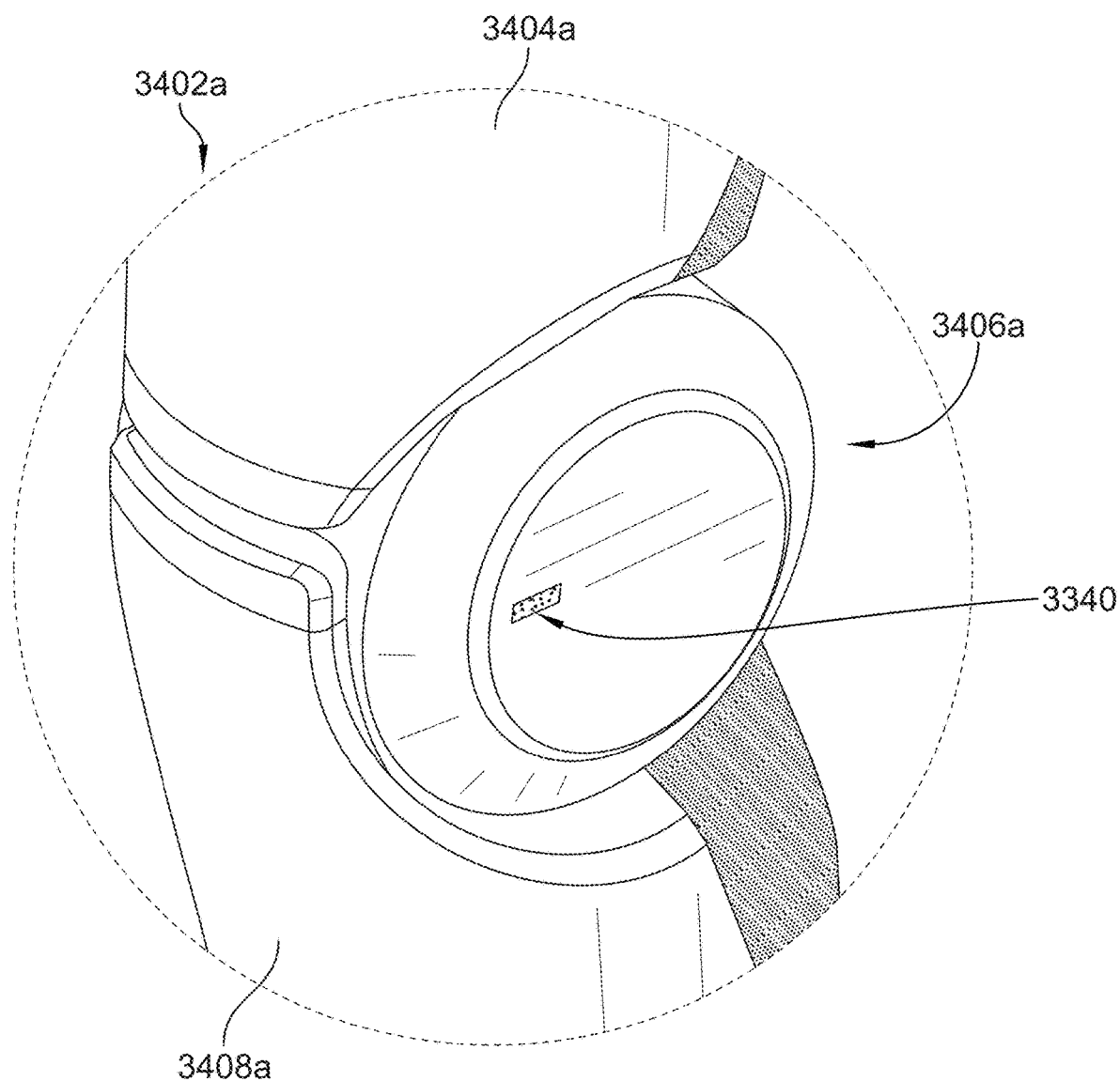
FIG. 65C is an enlarged view of a portion of a knee region of the humanoid robot of FIG. 32, wherein said knee region includes at least one light emitter.

The knee illumination assembly includes at least one, and preferably a plurality of, light emitters 340 that are located along a surface of each knee 406a, 406b, as shown in FIG. 65C. These knee light emitters 340 are illustratively embodied as elongated light strips; however, the light emitters 340 can have any suitable shape or structure. The knee light emitters 340 can be operated in the same way as the head light emitting assembly 264a-264d described above. The knee light emitters 340 can utilize one or more of the following light technologies: LCD, LED, OLED, LPD, IMOD, QDLED, mLED, AMOLED, SED, FED, plasma, electronic paper or EPD, MicroLED, quantum dot display, LED backlit LCD, WLCD, OLCD, transparent OLED, PMOLED, capacitive touchdisplay elements, resistive touchdisplay elements, monochrome emitters, color emitters, or any combination of the above, or any other known technology or light-emitting feature.

H. Other Electronic Components

As described above, the electronic components of the head may also include a directional microphone, speaker, antennas, light emitting assembly 264a-264d, as well as a data storage device and/or computing device comprising a processor and memory. Specifically, the directional microphone is designed to detect sounds and determine a position, which enables the robot to move its head toward the sound. In particular, one or more speakers may be configured to allow the robot to communicate with nearby humans with audible messages or responses. One or more antennas may be configured to transmit and receive data wirelessly for data transfer into and out of the robot. Specifically, the robot may include wireless communication modules (e.g., cellular, Wi-Fi, Bluetooth, WiMAX, HomeRF, Z-Wave, Zigbee, THREAD, RFID, NFC, and/or etc.) that are connected to the antennas. For example, the robot head portion 202a may include a 5G cellular radio coupled to one of the antennas and a Wi-Fi radio (e.g., 5 GHz or 2.4 GHz) coupled to the other antenna.

The data storage device may include a solid-state hard drive designed to capture all of the data generated by the sensors or a subset of the data generated by the sensors. The subset of the data may be time-based (e.g., the pre-defined time surrounding the start up/shut down of the robot), sensor-based (e.g., only encoder data), movement/configuration-based (e.g., when performing a specific task that requires the robot to put its body in a particular position/configuration), environment-based (e.g., when the robot recognizes a specific item or issue in its environment), or configuration based, error based, or a combination thereof. In addition, the data storage device may be used to store data to train other robots or store data for diagnostic purposes or any other purpose. Finally, the indicator lights may be designed to work with the display 300 to indicate a state of the robot 100 (e.g., working, error, moving, etc.) to a nearby human or may illuminate for other reasons.

It is to be understood that the disclosure is not limited to the exact details of construction, operation, exact materials, or embodiments shown and described, as obvious modifications and equivalents will be apparent to one skilled in the art. While the specific embodiments have been illustrated and described, numerous modifications come to mind without significantly departing from the spirit of the disclosure, and the scope of protection is only limited by the scope of the accompanying Claims. It should also be understood that substantially utilized herein means a deviation that is less than 15% and preferably less than 5%. It should also be understood that other configuration or arrangements of the above described components is contemplated by this Application.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

It is to be understood that the disclosure is not limited to the exact details of construction, operation, exact materials, or embodiments shown and described, as obvious modifications and equivalents will be apparent to one skilled in the art; for example, the photographs may be digital photographs or paper based photographs that may then be scanned into digital form. While the specific embodiments have been illustrated and described, numerous modifications come to mind without significantly departing from the spirit of the disclosure.

As used herein, the terms "component," "system" and the like in relation to discussions about computer-related processes and systems are intended to refer to a computer-related entity, either hardware, a combination of hardware and software, software, or software in execution. For example, a component may be, but is not limited to being, a process running on a processor, a processor, an object, an instance, an executable, a thread of execution, a program, a computer, or both. By way of illustration, both an application running on a computer and the computer can be a component. One or more components may reside within a process, a thread of execution, or both, and a component may be localized on one computer and/or distributed between two or more computers.

Furthermore, all or portions of the computer-related processes and systems can be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips), optical disks (e.g., compact disk (CD), digital versatile disk (DVD)), smart cards, and flash memory devices (e.g., card, stick, key drive). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Where the above examples, embodiments and implementations reference examples, it should be understood by those of ordinary skill in the art that other helmet and manufacturing devices and examples could be intermixed or substituted with those provided. In places where the description above refers to particular embodiments of helmets and customization methods, it should be readily apparent that a number of modifications may be made without departing from the spirit thereof and that these embodiments and implementations may be applied to other to helmet customization technologies as well. Accordingly, the disclosed subject matter is intended to embrace all such alterations, modifications and variations that fall within the spirit and scope of the disclosure and the knowledge of one of ordinary skill in the art.

The invention claimed is:

1. A humanoid robot comprising:
an upper region including: (i) a torso, (ii) a pair of arm assemblies coupled to the torso, and (iii) a head and neck assembly coupled to the torso and having a neck portion and a head portion coupled to the neck portion, and wherein the head portion includes:
a head housing assembly having: (i) a geometric center, (ii) a first shell with a first point located on an outer surface of the first shell, and (iii) a second shell with a second point located on the outer surface of the second shell,
a recess formed in the head housing assembly, and wherein the recess includes a third point that is positioned closer to the geometric center of the head housing assembly in comparison to both the first and second points, and
a light emitter configured to emit light to illuminate a portion of the recess.

2. The humanoid robot of claim 1, wherein the first shell has a first shell edge and the second shell has a second shell edge, and wherein the second shell edge includes a portion that does not abut the first shell edge.

3. The humanoid robot of claim 1, wherein the neck portion includes a deformable material, and wherein an extent of the deformable material is coupled to the head portion.

4. The humanoid robot of claim 1, wherein the portion of the recess is visible from a frontal view of the head and neck assembly, when the head and neck assembly are in a forward facing orientation.

5. The humanoid robot of claim 1, further comprising a horizontal plane, and wherein when the head and neck assembly is in a forward facing orientation, an obtuse angle is formed between an extent of a first shell edge of the first shell and the horizontal plane.

6. The humanoid robot of claim 1, further comprising: (i) a camera positioned within in the head housing assembly, and (ii) a display enclosed in the head housing assembly and positioned below the camera.

7. The humanoid robot of claim 1, further comprising a camera, and wherein the first shell that includes:
a first arc length at a first location below the camera,
a second arc length at a second location aligned with the recess, and wherein said second arc length is greater than the first arc length, and
a third arc length at a third location above the camera, and wherein said third arc length is less than the first arc length.

8. A humanoid robot comprising:
an upper region including: (i) a torso, (ii) a pair of arm assemblies coupled to the torso, and (iii) a head and neck assembly coupled to the torso and having a head housing assembly;
a central region coupled to the upper region;
a lower region coupled to the central region and spaced apart from the upper region, the lower region including a pair of legs;
a light emitter positioned adjacent to an extent of the head housing assembly and configured to indicates a state or an operating status of the humanoid robot.

9. The humanoid robot of claim 8, wherein the humanoid robot includes an end effector and a second light emitter configured to illuminate an extent of said end effector.

10. The humanoid robot of claim 8, wherein the head and neck assembly includes a microphone, speaker, and antennas.

11. The humanoid robot of claim 8, wherein the light emitter meets at least one aspect of the standards described in FDA CFR Title 21 part 1040.10, titled "Performance standards for Light-Emitting Products".

12. The humanoid robot of claim 8, further comprising a display that is not configured to display human facial features.

13. The humanoid robot of claim 12, wherein the display is positioned within the head housing assembly and is spaced apart from the internal surfaces of the head housing assembly.

14. The humanoid robot of claim 8, further comprising a camera, and wherein the light emitter is positioned above the camera.

15. The humanoid robot of claim 14, wherein the head housing assembly includes a first shell, and wherein the first shell includes:
a first arc length at a first location below the camera,
a second arc length at a second location aligned with the light emitter, and wherein said second arc length is greater than the first arc length, and
a third arc length at a third location above the camera, and wherein said third arc length is less than the first arc length.

16. The humanoid robot of claim 8, wherein the emitted light is configured to illuminate a region that is recessed relative to both: (i) a first location on the outer surface of the head housing assembly that is positioned forward of and adjacent to the extent of the region, and (ii) a second location on the outer surface of the head housing assembly that is positioned behind and adjacent to said extent of the region.

17. The humanoid robot of claim 8, wherein the head and neck assembly include an outer surface with: (i) a nasal region, and (ii) an orbital region that is not recessed in comparison to said nasal region.

18. A humanoid robot comprising:
an upper region including: (i) a torso, (ii) a pair of arm assemblies coupled to the torso, and (iii) a head and neck assembly coupled to the torso and having a neck portion and a head portion coupled to the neck portion, and wherein the head portion includes:
a head housing assembly having a first shell with a first shell edge;
a camera positioned within the head housing assembly;
a first region positioned adjacent to an extent of the first shell edge of the first shell and below the camera;

a first light emitter configured to illuminate an extent of the first region.

19. The humanoid robot of claim 18, wherein the extent of the first region that is illuminated by the first light emitter is recessed relative to a first location on the outer surface of the first shell that is positioned adjacent to the extent of the first region.

20. The humanoid robot of claim 18, wherein when the head and neck assembly are in a forward facing orientation, the extent of the first region is visible from a frontal view of the head and neck assembly.

21. The humanoid robot of claim 18, wherein, when the head and neck assembly are in a forward facing orientation, an angle greater than 15 degrees is formed between an extent of the first shell edge and a vertical plane that is parallel to a coronal plane of the humanoid robot.

22. The humanoid robot of claim 18, further comprising a horizontal plane, and wherein when the head and neck assembly are in a forward facing orientation, an obtuse angle is formed between an extent of the first shell edge and the horizontal plane.

23. The humanoid robot of claim 18, further comprising a display, and wherein a gap is formed between a portion of the display and an inner surface of the first shell.

24. The humanoid robot of claim 18, wherein the first shell includes:
   a first arc length at a first location below the camera,
   a second arc length at a second location aligned with the first region, and wherein said second arc length is greater than the first arc length, and
   a third arc length at a third location above the camera, and wherein said third arc length is less than the first arc length.

25. The humanoid robot of claim 18, wherein the first shell does not extend rearward of an auricular region of the head portion.

* * * * *